United States Patent [19]

Steiner

[11] 4,161,277

[45] Jul. 17, 1979

[54] IMPROPER COPY RUN PROGRAM ENTRY CHECK FOR ELECTROSTATIC TYPE REPRODUCTION OR COPYING MACHINES

[75] Inventor: Edward L. Steiner, Macedon, N.Y.

[73] Assignee: Xerox Corporation, Stamford, Conn.

[21] Appl. No.: 829,021

[22] Filed: Aug. 30, 1977

[51] Int. Cl.[2] .................... G06F 11/00

[52] U.S. Cl. .................... 235/304; 355/14

[58] Field of Search .................... 235/304, 304.1, 302; 364/200, 900, 518; 355/14

[56] References Cited

U.S. PATENT DOCUMENTS

| | | | |
|---|---|---|---|
| 3,707,703 | 12/1972 | Sakai | 364/200 |
| 3,936,182 | 2/1976 | Seikh | 355/14 |
| 4,035,072 | 7/1977 | Deetz et al. | 355/14 |
| 4,062,061 | 12/1977 | Batchelor et al. | 364/900 |
| 4,107,779 | 8/1978 | Fisk et al. | 364/518 |
| 4,109,313 | 8/1978 | Donohue et al. | 364/518 |
| 4,120,034 | 10/1978 | Fisk et al. | 364/518 |

*Primary Examiner*—Charles E. Atkinson

*Attorney, Agent, or Firm*—Frederick E. McMullen; Clarence A. Green; Ronald F. Chapuran

[57] ABSTRACT

An electrostatic type reproduction machine incorporating optionally active document handler for automatically advancing originals to be copied into copying position together with a sorter for sorting copies. On inputting a copy run, a check is automatically made to determine if the program is legal, i.e. if the machine can perform the copy run selected. In this context, checks are run to determine whether or not the document handler has been selected and if not, the operating status of the sorter and machine.

4 Claims, 51 Drawing Figures

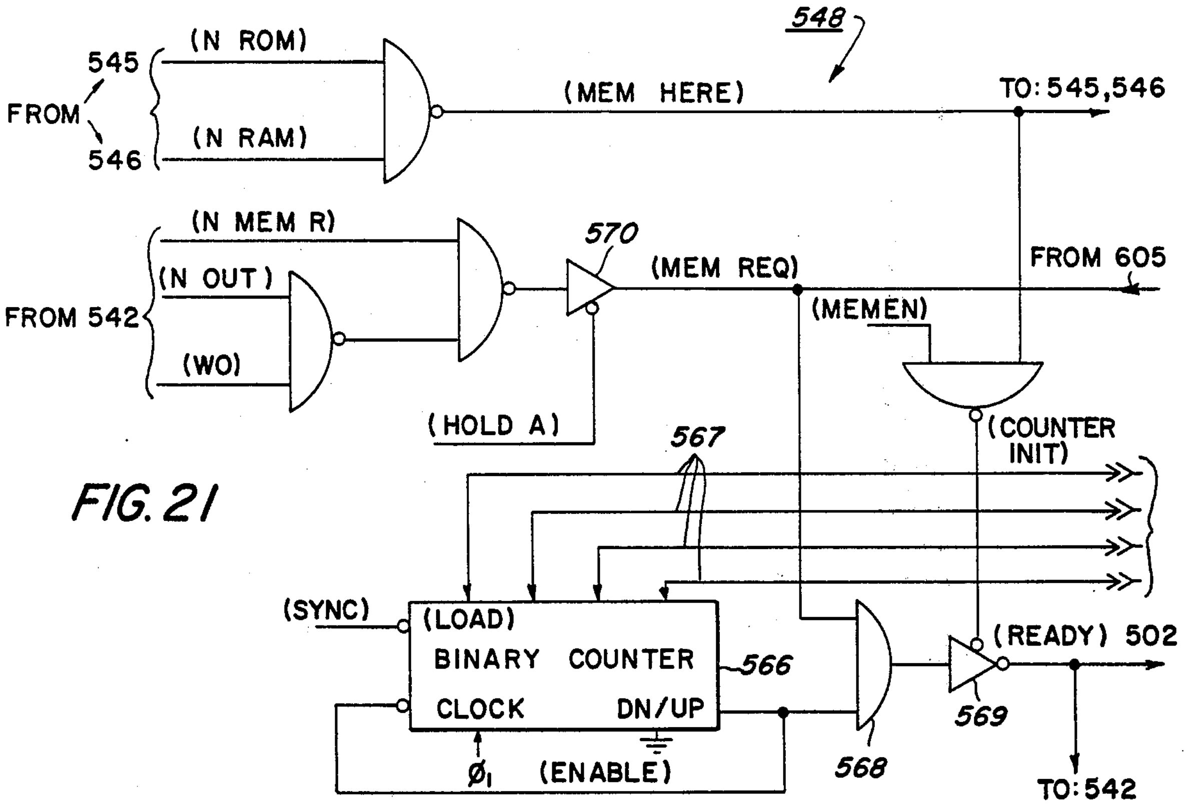
FIG. 21
MEMORY READY
FIG. 24
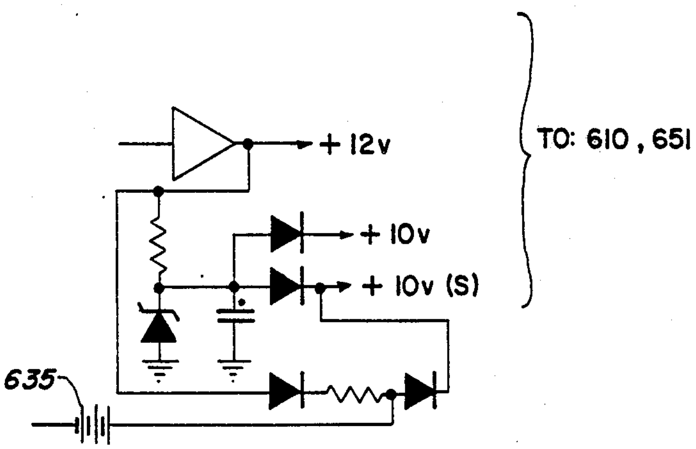

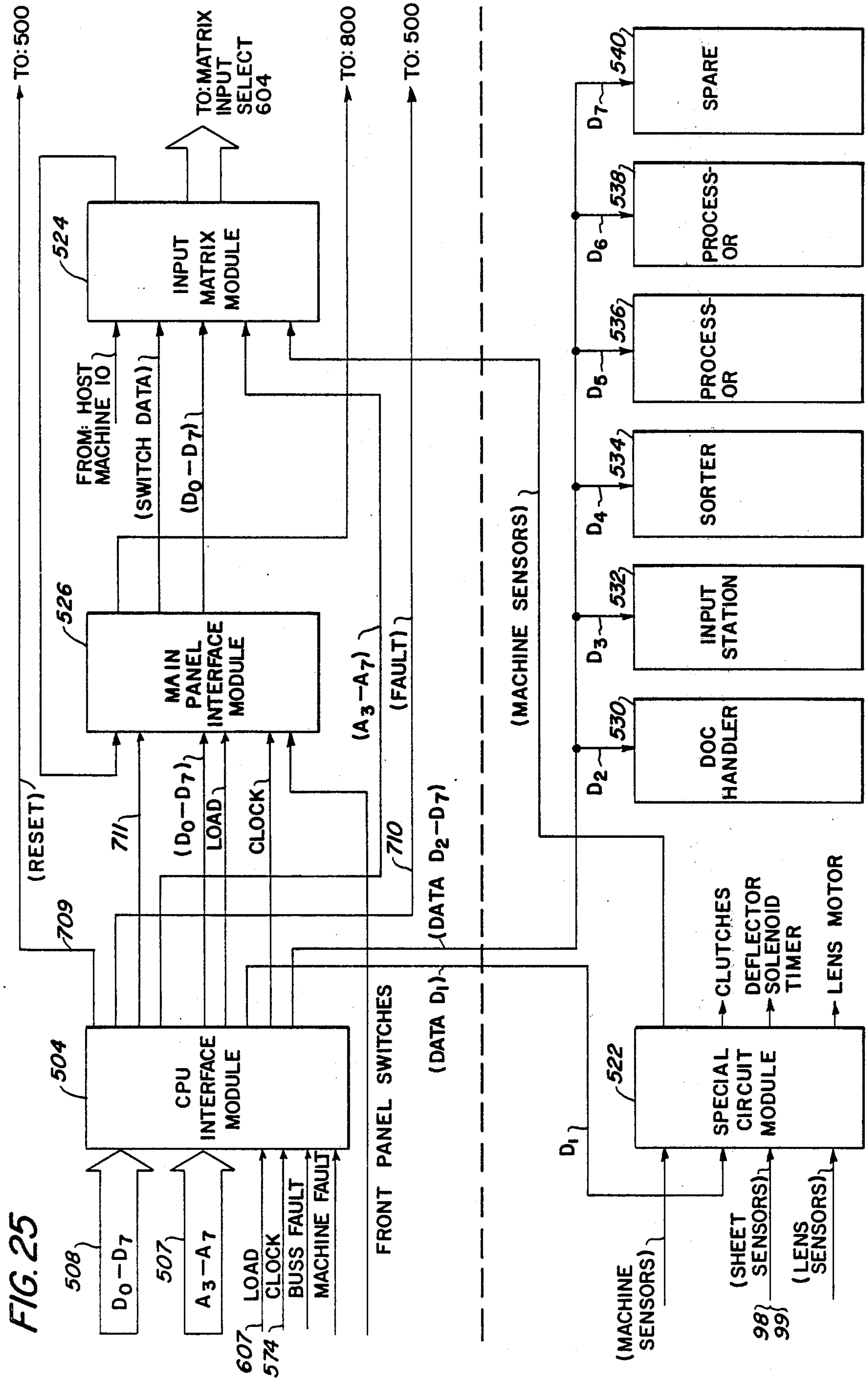
FIG. 25
508
$D_0-D_7$
507
$A_3-A_7$
607
574
LOAD
CLOCK
BUSS FAULT
MACHINE FAULT
504
CPU INTERFACE MODULE
FRONT PANEL SWITCHES
(DATA $D_1$)
709
(RESET)
711
($D_0-D_7$)
LOAD
CLOCK
710
(DATA $D_2-D_7$)
526
MAIN PANEL INTERFACE MODULE
($A_3-A_7$)
(FAULT)
524
INPUT MATRIX MODULE
FROM: HOST MACHINE IO
(SWITCH DATA)
($D_0-D_7$)
TO: 500
TO: MATRIX INPUT SELECT 604
TO: 800
TO: 500
(MACHINE SENSORS)
$D_2$
530
DOC HANDLER
$D_3$
532
INPUT STATION
$D_4$
534
SORTER
$D_5$
536
PROCESS-OR
$D_6$
538
PROCESS-OR
$D_7$
540
SPARE
522
SPECIAL CIRCUIT MODULE
$D_1$
CLUTCHES
DEFLECTOR SOLENOID TIMER
LENS MOTOR
(MACHINE SENSORS)
98
99
(SHEET SENSORS)
(LENS SENSORS)

LEGEND:
CF- CONTROLLER FAULT
BF- BUS FAULT
RF- REMOTE FAULT

STATE CHECKER ROUTINE (TABLE I)

PITCH RESET INTERRUPT ROUTINE

LEGEND:

SR-SHIFT REGISTER
SR@PTR-SHIFT REGISTER POINTER
EV-EVENT
EV@PTR-EVENT POINTER
CNTR-COUNTER
INCRM-INCREMENT

MACHINE INTERRUPT ROUTINE

LEGEND:

PNTR- POINTER
INCRM- INCREMENT
REL- RELATIVE
ADDR- ADDRESS
SR - SHIFT REGISTER
REG - REGISTER
SUBR- SUBROUTINE

REAL TIME INTERRUPT

LEGEND:

PNTR - POINTER
RTC - REAL TIME COUNTER
CNTR - COUNTER
REG - REGISTER

READY TEST
(RDY. TEST)

IMPROPER COPY RUN PROGRAM ENTRY CHECK FOR ELECTROSTATIC TYPE REPRODUCTION OR COPYING MACHINES

This invention relates to electrostatographic xerographic type reproduction machines, and more particularly, to an improved control system for such machines.

The advent of higher speed and more complex copiers and reproduction machines has brought with it a corresponding increase in the complexity in the selection and type of jobs the machine may do. To effectuate job selection on machines of this type, a somewhat sophisticated control console or programmer is provided for the operator's use. Obviously, design and implementation of the control console is closely attuned to the abilities of the machine, the theme normally pursued being to match the control console programming capability with that of the machine. In some instances however, often deliberate, the programmer capabilities exceed that of the machine with the result that, in the case of copiers and reproduction machines, copy runs may be programmed which the machine, if permitted to start, cannot finish.

Additionally, the abilities of these sophisticated multi-faceted machines to do certain jobs may be limited from time to time by the existing machine state. For example, if the machine is equipped with a multi-bin sorter for sorting the copies produced, the capability of the machine to handle a new sorting chore may be restricted or even prohibited by a pre-existing sorter condition. A common example would be the existance of copy sheets from a previous job in one or more bins of the sorter.

It is therefore a principal object of the present invention to provide a new and improved reproduction apparatus and method.

It is a further object of the present invention to provide a process for checking the copy run program instructions for a copy reproducing machine to determine if the machine is capable of carrying out the copy run programmed.

It is an object of the present invention to provide a system for monitoring copy run instructions inputted to a copier effective in the event the copier is then incapable of carrying the copy run programmed to completion to intervene and prevent startup of the copier.

It is an object of the present invention to provide a method for tailoring the capability of a copy run programmmer for a xerographic type reproduction machine to the capabilities of the machine.

This invention relates to the method of controlling an electrostatic type reproduction machine for making copies, the steps which comprise; inputting instructions to the machine for a copy run; checking the copy run instructions to determine if the copy run defined by the instructions can be carried out by the machine; and inhibiting operation of the machine when the copy run defined by the instructions cannot be performed.

BRIEF DESCRIPTION OF THE DRAWINGS

Other objects and advantages will be apparent from the ensuing description and drawings in which:

FIG. 21 is a logic schematic of the CPU memory ready;

FIG. 24 is a logic schematic of the nonvolatile memory power supply;

FIG. 25 is a block diagram of the apparatus interface and remote output connections;

DETAILED DESCRIPTION OF THE PREFERRED EMBODIMENT OF THE INVENTION

Figure 1:
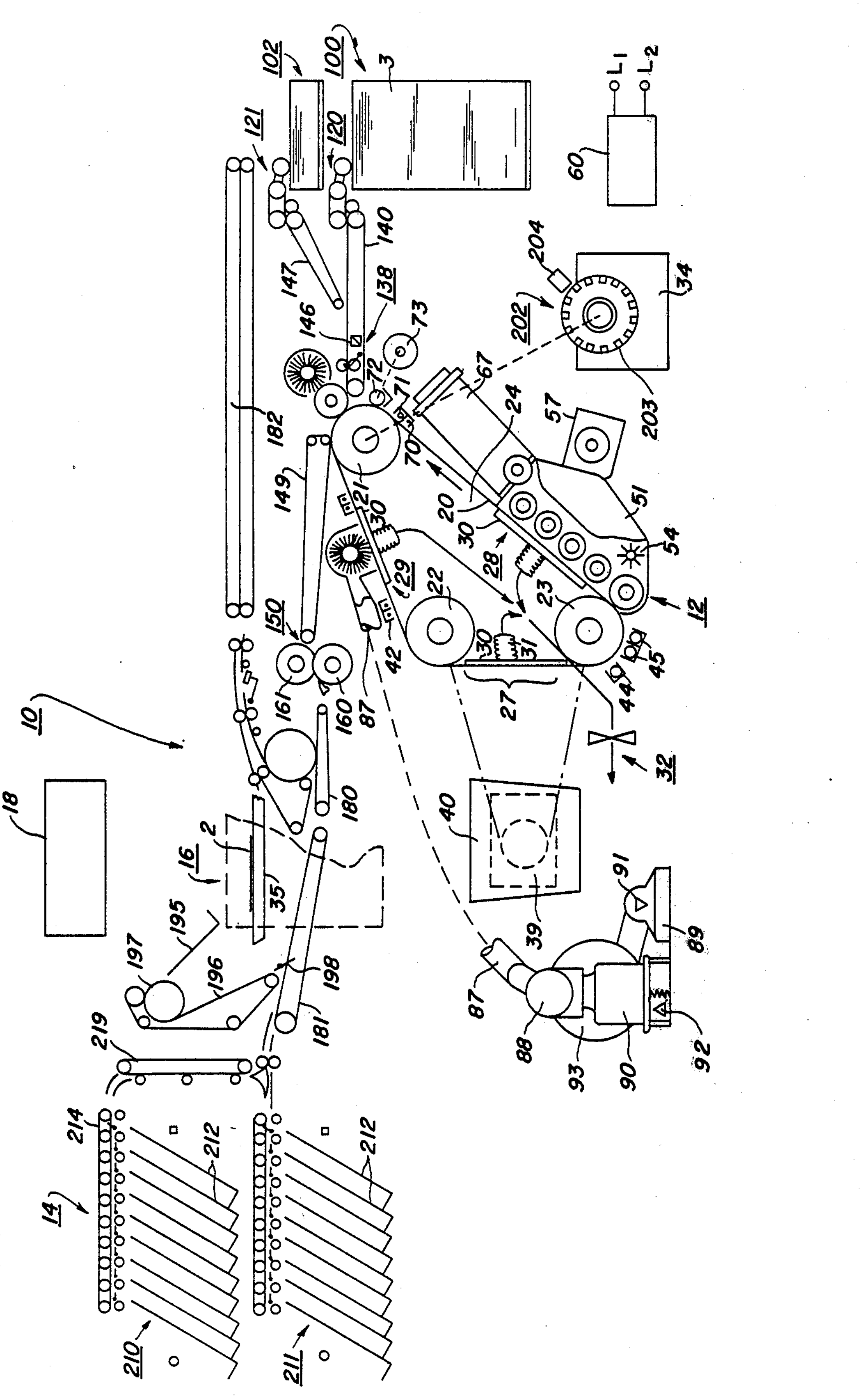
FIG. 1 is a schematic representation of an exemplary reproduction apparatus incorporating the control system of the present invention.
Figure 2:
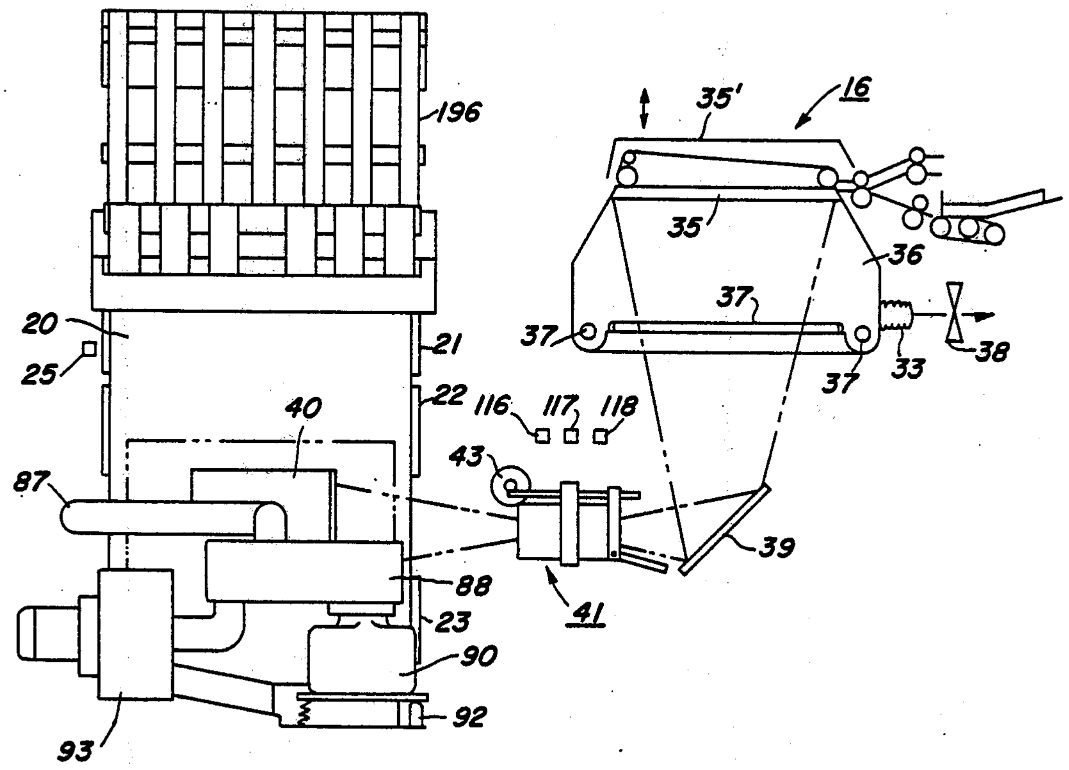
FIG. 2 is a vertical sectional view of the apparatus shown in FIG. 1 along the image plane.
Figure 3:
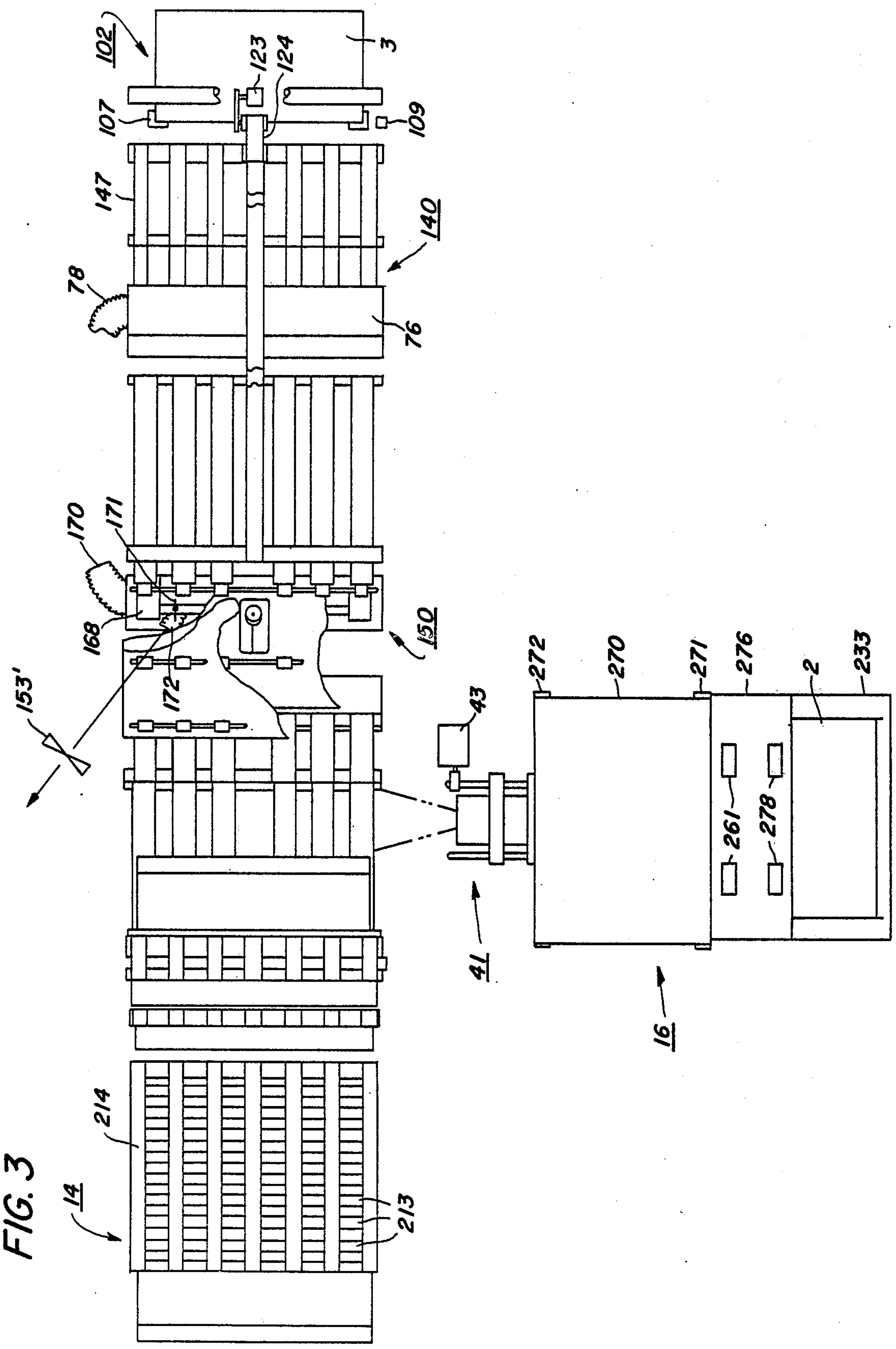
FIG. 3 is a top plane view of the apparatus shown in FIG. 1.

Referring particularly to FIGS. 1-3 of the drawings, there is shown, in schematic outline, an electrostatic reproduction system or host machine, identified by numeral 10, incorporating the control arrangement of the present invention. To facilitate description, the reproduction system 10 is divided into a main electrostatic xerographic processor 12, sorter 14, document handler 16, and controller 18. Other processor, sorter and/or document handler types and constructions, and different combinations thereof may instead by envisioned.

PROCESSOR

Processor 12 utilizes a photoreceptor in the form of an endless photoconductive belt 20 supported in generally triangular configuration by rolls 21, 22, 23. Belt supporting rolls 21, 22, 23 are in turn rotatably journaled on subframe 24.

In the exemplary processor illustrated, belt 20 comprises a photoconductive layer of selenium, which is the light receiving surface and imaging medium, on a conductive substrate. Other photoreceptor types and forms, such as comprising organic materials or of multilayers or a drum may instead be envisioned. Still other forms may comprise scroll type arrangements wherein webs of photoconductive material may be played in and out of the interior of supporting cylinders.

Figure 4:
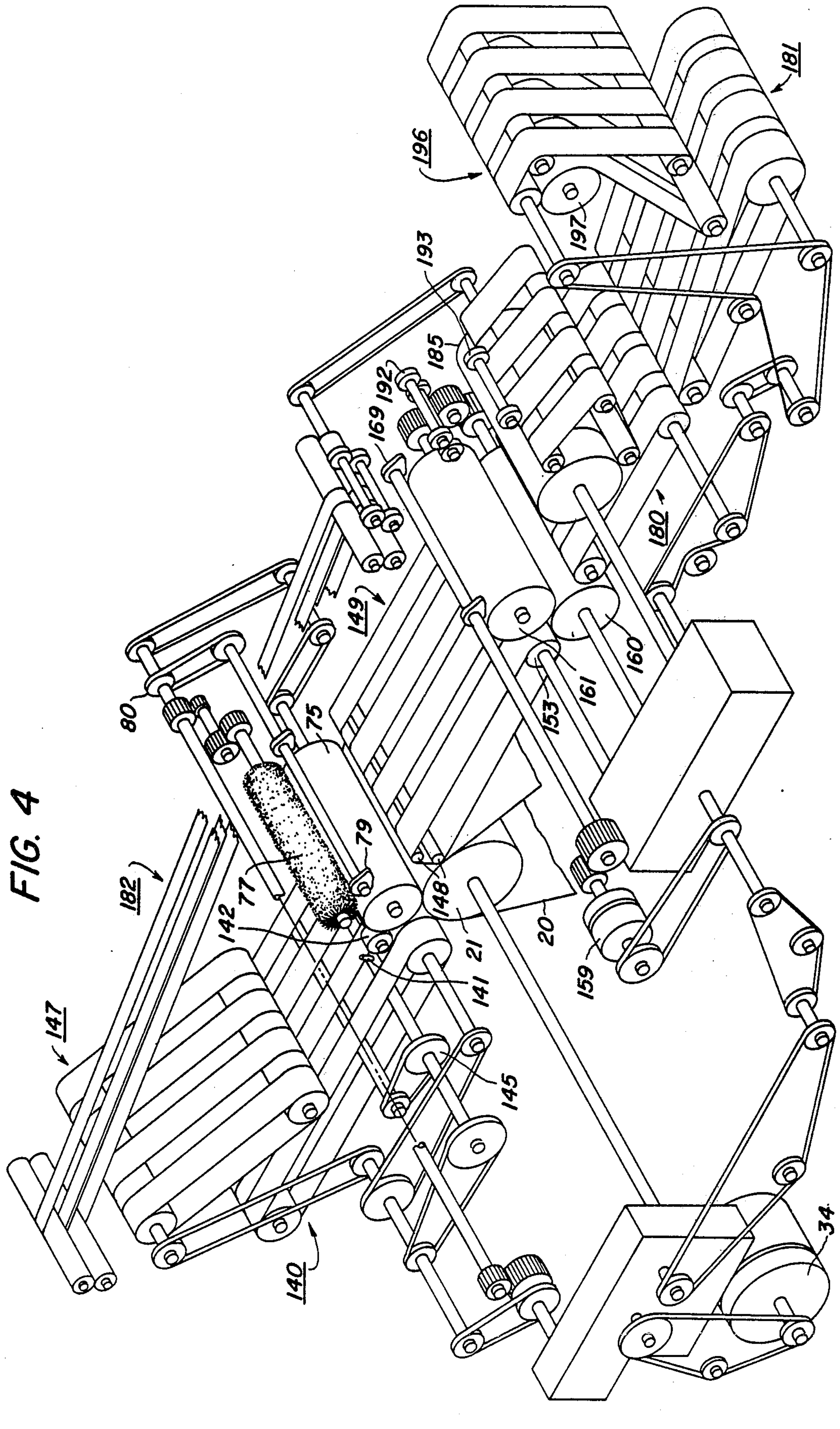
FIG. 4 is an isometric view showing the drive train for the apparatus shown in FIG. 1.

Suitable biasing means (not shown) are provided on subframe 24 to tension the photoreceptor belt 20 and insure movement of belt 20 along a prescribed operating path. Belt tracking switch 25 (shown in FIG. 2) monitors movement of belt 20 from side to side. Belt 20 is supported so as to provide a trio of substantially flat belt runs opposite exposure, developing, and cleaning stations 27, 28, 29 respectfully. To enhance belt flatness at these stations, vacuum platens 30 are provided under belt 20 at each belt run. Conduits 31 communicate vacuum platens 30 with a vacuum pump 32. Photoconductive belt 20 moves in the direction indicated by the solid line arrow, drive thereto being effected through roll 21, which in turn is driven by main drive motor 34, as seen in FIG. 4.

Processor 12 includes a generally rectangular, horizontal transparent platen 35 on which each original 2 to be copied is disposed. A two or four sided illumination assembly, consisting of internal reflectors 36 and flash lamps 37 (shown in FIG. 2) disposed below and along at least two sides of platen 35, is provided for illuminating the original 2 on platen 35. To control temperatures within the illumination space, the assembly is coupled through conduit 33 with a vacuum pump 38 which is adapted to withdraw overly heated air from the space. To retain the original 2 in place on platen 35 and prevent escape of extraneous light from the illumination assembly, a platen cover 35' may be provided.

The light image generated by the illumination system is projected via mirrors 39, 40 and a variable magnification lens assembly 41 onto the photoreceptive belt 20 at the exposure station 27. Reversible motor 43 is provided to move the main lens and add on lens elements that comprise the lens assembly 41 to different predetermined positions and combinations to provide the preselected image sizes corresponding to push button selectors 818, 819, 820 on operator module 800. (See FIG. 32) Sensors 116, 117, 118 signal the present disposition of lens assembly 41. Exposure of the previously charged belt 20 selectively discharges the photoconductive belt to produce on belt 20 an electrostatic latent image of the original 2. To prepare belt 20 for imaging, belt 20 is uniformly charged to a preselected level by charge corotron 42 upstream of the exposure station 27.

Figure 5:
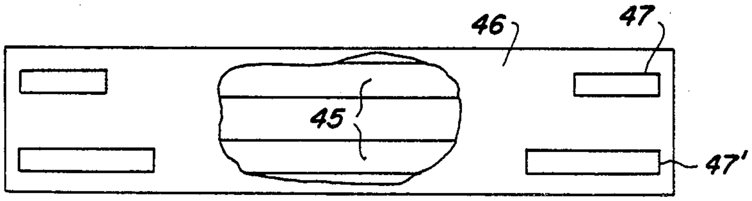
FIG. 5 is an enlarged view showing details of the photoreceptor edge fade-out mechanism for the apparatus shown in FIG. 1.

To prevent development of charge by unwanted image areas, erase lamps 44, 45 are provided. Lamp 44, which is referred to herein as the pitch fadeout lamp, is supported in transverse relationship to belt 20, lamp 44 extending across substantially the entire width of belt 20 to erase (i.e. discharge) areas of belt 20 before the first image, between successive images, and after the last image. Lamps 45, which are referred to herein as edge fadeout lamps, serve to erase areas bordering each side of the images. Referring particularly to FIG. 5, edge fadeout lamps 45, which extend transversely to belt 20, are disposed within a housing 46 having a pair of transversely extending openings 47, 47' of differing length adjacent each edge of belt 20. By selectively actuating one or the other of the lamps 45, the width of the area bordering the sides of the image that is erased can be controlled.

Figure 6:
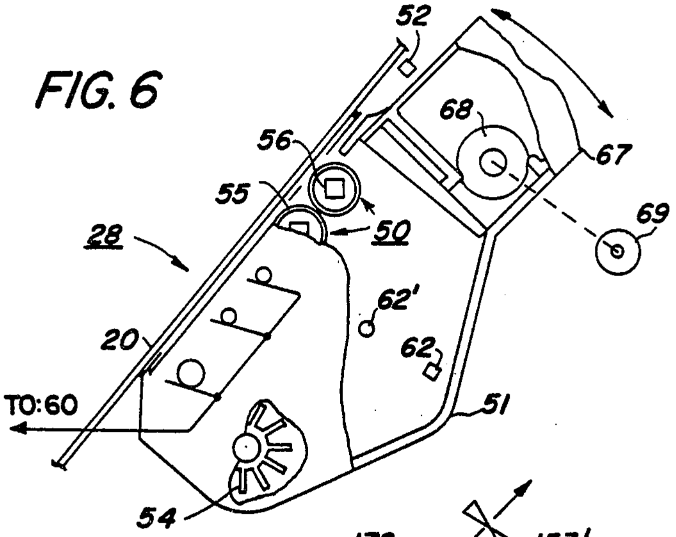
FIG. 6 is an enlarged view showing details of the developing mechanism for the apparatus shown in FIG. 1.
Figure 7:
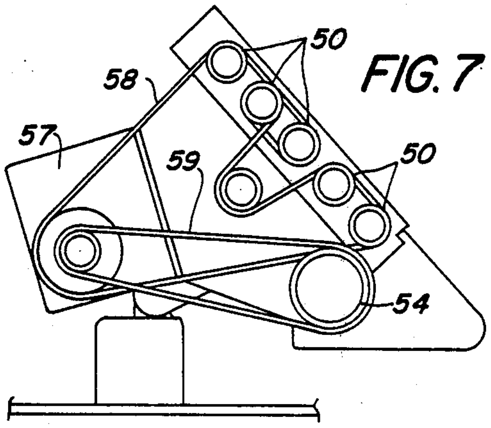
FIG. 7 is an enlarged view showing details of the developing mechanism drive.

Referring to FIGS. 1, 6 and 7, magnetic brush rolls 50 are provided in a developer housing 51 at developing station 28. Housing 51 is pivotally supported adjacent the lower end thereof with interlock switch 52 to sense disposition of housing 51 in operative position adjacent belt 20. The bottom of housing 51 forms a sump within which a supply of developing material is contained. A rotatable auger 54 in the sump area serves to mix the developing material and bring the material into operative relationship with the lowermost of the magnetic brush rolls 50.

As will be understood by those skilled in the art, the electrostatically attractable developing material commonly used in magnetic brush developing apparatus of the type shown comprises a pigmented resinous powder, referred to as toner, and larger granular beads referred to as carrier. To provide the necessary magnetic properties, the carrier is comprised of a magnetizable material such as steel. By virtue of the magnetic fields established by developing rolls 50 and the interrelationship therebetween, a blanket of developing material is formed along the surfaces of developing rolls 50 adjacent the belt 20 and extending from one roll to another. Toner is attracted to the electrostatic latent image from the carrier bristles to produce a visible powder image on the surface of belt 20.

Magnetic brush rolls 50 each comprise a rotatable exterior sleeve 55 with relatively stationary magnet 56 inside. Sleeves 55 are rotated in unison and at substantially the same speed as belt 20 by a developer drive motor 57 through a belt and pulley arrangement 58. A second belt and pulley arrangement 59 drive auger 54.

To regulate development of the latent electrostatic images on belt 20, magnetic brush sleeves 55 are electrically biased. A suitable power supply 60 is provided for this purpose with the amount of bias being regulated by controller 18.

Figure 8:
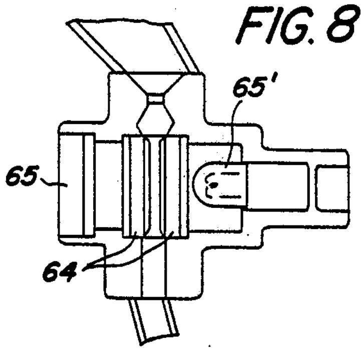
FIG. 8 is an enlarged view showing details of the developability control for the apparatus shown in FIG. 1.
Figure 11:
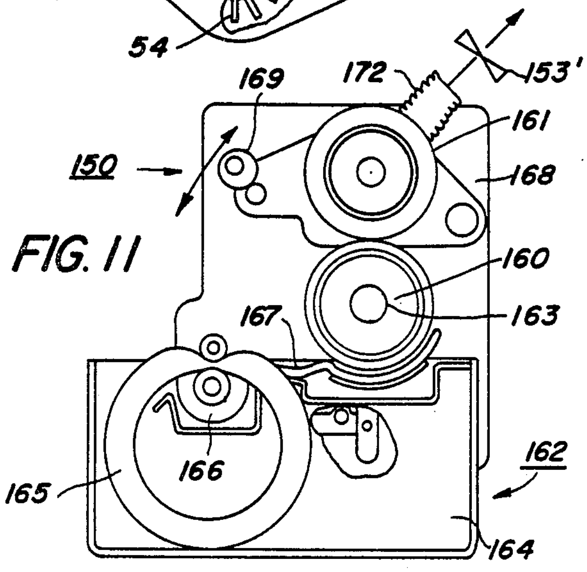
FIG. 11 is an enlarged view showing details of the fuser for the apparatus shown in FIG. 1.

Developing material is returned to the upper portion of developer housing 51 for reuse. A photocell 62 monitors the level of developing material in housing 51 with lamp 62' therefor spaced opposite to the photocell 62. The disclosed machine is also provided with automatic developability control which maintains an optimum proportion of toner-to-carrier material by sensing toner concentration and replenishing toner, as needed. As shown in FIG. 8, the automatic developability control comprises a pair of transparent plates 64 mounted in spaced, parallel arrangement in developer housing 51 such that a portion of the returning developing material passes therebetween. A suitable circuit, not shown, alternately places a charge on the plates 64 to attract toner thereto. Photocell 65 on one side of the plate pair senses the developer material as the material passes therebetween. Lamp 65' on the opposite side of plate pair 64 provides reference illumination. In this arrangement, the returning developing material is alternately attracted and repelled to and from plates 64. The accumulation of toner, i.e. density determines the amount of light transmitted from lamp 65' to photocell 65. Photocell 65 monitors the density of the returning developing material with the signal output therefrom being used by controller 18 to control the amount of fresh or make-up toner to be added to developer housing 51 from toner supply container 67.

To discharge toner from container 67, rotatable dispensing roll 68 is provided in the inlet to developer housing 51. Motor 69 drives roll 68. When fresh toner is required, as determined by the signal from photocell 65, controller 18 actuates motor 69 to turn roll 68 for a timed interval. The rotating roll 68, which is comprised of a relatively porous sponge-like material, carries toner particles thereon into developer housing 51 where it is discharged. Pre-transfer corotron 70 and lamp 71 are provided downstream of magnetic brush rolls 50 to regulate developed image charges before transfer.

A magnetic pick-off roll 72 is rotatably supported opposite belt 20 downstream of pre-transfer lamp 71, roll 72 serving to scavenge leftover carrier from belt 20 preparatory to transfer of the developed image to the copy sheet 3. Motor 73 turns roll 72 in the same direction and at substantially the same speed as belt 20 to prevent scoring or scratching of belt 20. One type of magnetic pick-off roll is shown in U.S. Pat. No. 3,834,804, issued October 10, 1974 to Bhagat et al.

Figure 9:
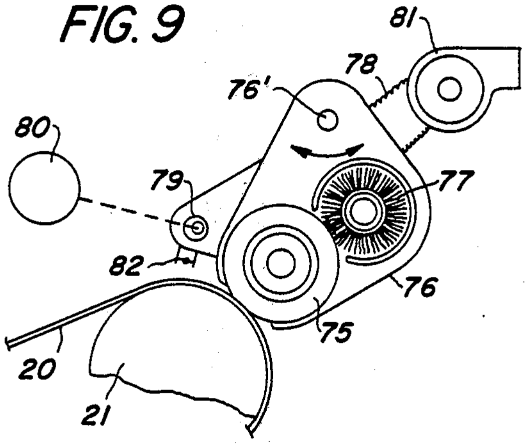
FIG. 9 is an enlarged view showing details of the transfer roll support mechanism for the apparatus shown in FIG. 1.
Figure 12:
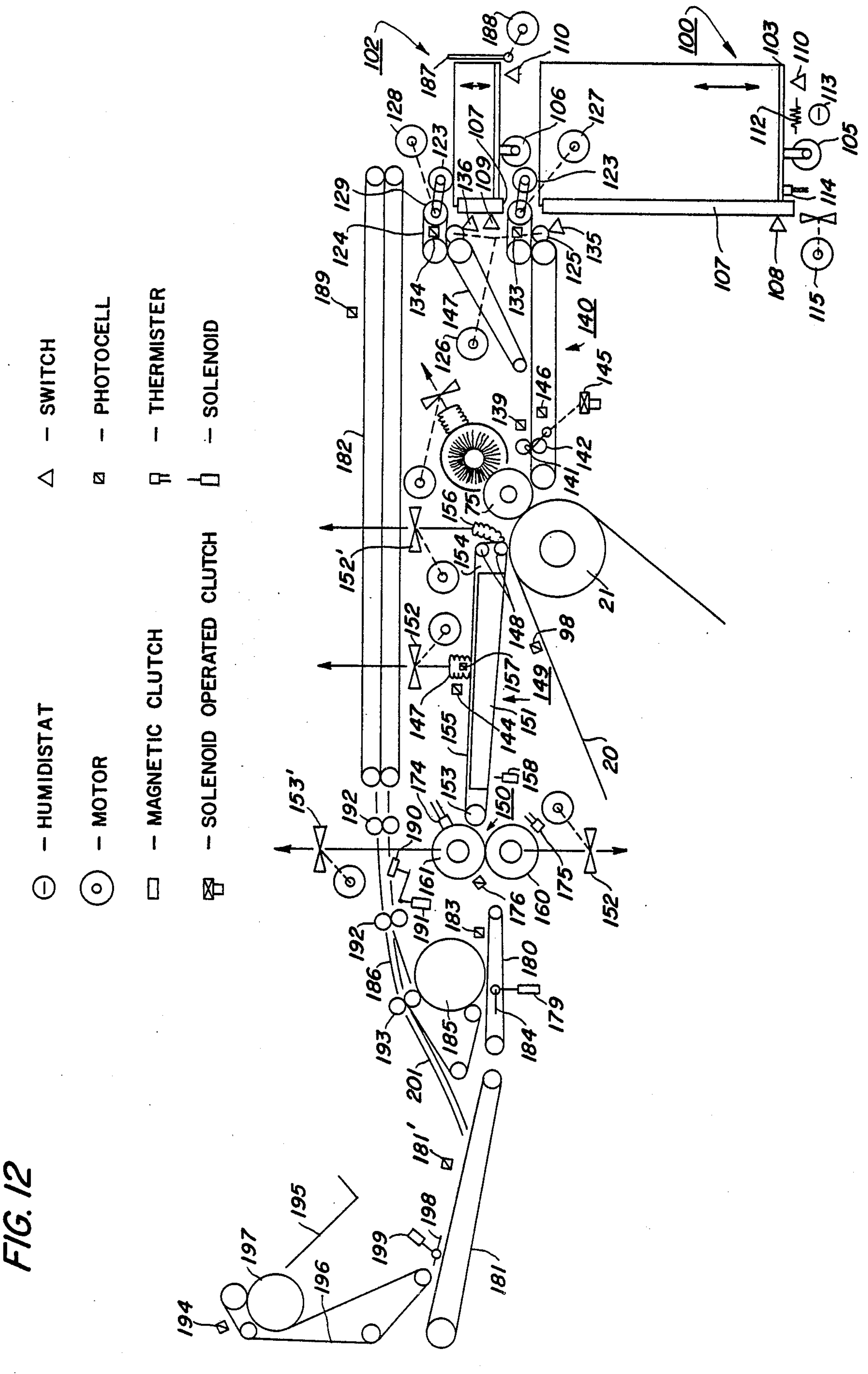
FIG. 12 is a schematic view showing the paper path and sensors of the apparatus shown in FIG. 1.

Referring to FIGS. 4, 9 and 12, to transfer developed images from belt 20 to the copy sheets 3, a transfer roll 75 is provided. Transfer roll 75, which forms part of the copy sheet feed path, is rotatably supported within a transfer roll housing 76 opposite belt support roll 21. Housing 76 is pivotally mounted for swinging movement about axis at 76' to permit the transfer roll assembly to be moved into and out of operative relationship with belt 20. A transfer roll cleaning brush 77 is rotatably journalled in transfer roll housing 76 with the brush periphery in contact with transfer roll 75. Transfer roll 75 is driven through contact with belt 20 while cleaning brush 77 is coupled to main drive motor 34. To remove toner, housing 76 is connected through conduit 78 with vacuum pump 81. To facilitate and control transfer of the developed images from belt 20 to the copy sheets 3, a suitable electrical bias is applied to transfer roll 75.

To permit transfer roll 75 to be moved into and out of operative relationship with belt 20, cam 79 is provided in driving contact with transfer roll housing 76. Cam 79 is driven from motor 34 through an electromagnetically operated one revolution clutch 80. Spring means (not shown) serves to maintain housing 76 in driving engagement with cam 79.

To facilitate separation of the copy sheets 3 from belt 20 following transfer of developed images, a detack corotron 82 is provided. Corotron 82 generates a charge designed to neutralize or reduce the charges tending to retain the copy sheet on belt 20. Corotron 82 is supported on transfer roll housing 76 opposite belt 20 and downstream of transfer roll 75.

Figure 10:
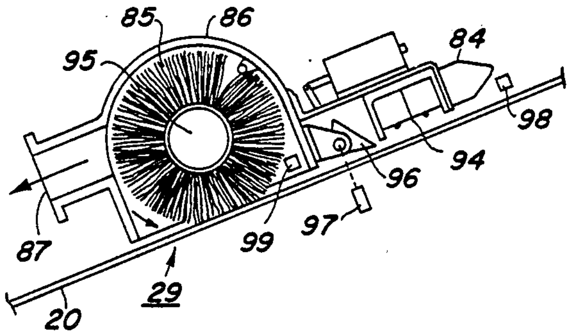
FIG. 10 is an enlarged view showing details of the photoreceptor cleaning mechanism for the apparatus shown in FIG. 1.

Referring to FIGS. 1, 2 and 10, to prepare belt 20 for cleaning, residual charges on belt 20 are removed by discharge lamp 84 and preclean corotron 94. A cleaning brush 85, rotatably supported within an evacuated semicircular shaped brush housing 86 at cleaning station 29, serves to remove residual developer from belt 20. Motor 95 drives brush 85, brush 85 turning in a direction opposite that of belt 20.

Vacuum conduit 87 couples brush housing 86 through a centrifugal type separator 88 with the suction side of vacuum pump 93. A final filter 89 on the outlet of pump 93 traps particles that pass through separator 88. The heavier toner particles separated by separator 88 drop into and are collected in one or more collecting bottles 90. Pressure sensor 91 monitors the condition of final filter 89 while a sensor 92 monitors the amount of toner particles in collecting bottles 90.

To obviate the danger of copy sheets remaining on belt 20 and becoming entangled with the belt cleaning mechanism, a deflector 96 is provided upstream of cleaning brush 85. Deflector 96, which is pivotally supported on the brush housing 86, is operated by solenoid 97. In the normal or off position, deflector 96 is spaced from belt 20 (the solid line position shown in the drawings). Energization of solenoid 97 pivots deflector 96 downwardly to bring the deflector leading edge into close proximity to belt 20.

Sensors 98, 99 are provided on each side of deflector 96 for sensing the presence of copy material on belt 20. A signal output from upstream sensor 98 triggers solenoid 97 to pivot deflector 96 into position to intercept the copy sheet on belt 20. The signal from sensor 98 also initiates a system shutdown cycle (mis-strip jam) wherein the various operating components are, within a prescribed interval, brought to a stop. The interval permits any copy sheet present in fuser 150 to be removed, sheet trap solenoid 158 (FIG. 12) having been actuated to prevent the next copy sheet from entering fuser 150 and becoming trapped therein. The signal from sensor 99, indicating failure of deflector 96 to intercept or remove the copy sheet from belt 20, triggers an immediate or hard stop (sheet on selenium jam) of the processor. In such instances the poower to drive motor 34 is interrupted to bring belt 20 and the other components driven therefrom to an immediate stop.

Referring particularly to FIGS. 1 and 12, copy sheets 3 comprise precut paper sheets supplied from either main or auxiliary paper trays 100, 102. Each paper tray has a platform or base 103 for supporting in stack-like fashion a quantity of sheets. The tray platforms 103 are supported for vertical up and down movement by motors 105, 106 being provided to raise and lower the platform. Side guide pairs 107, in each tray 100, 102 delimit the tray side boundaries, the guide pairs being adjustable toward and away from one another in accommodation of different size sheets. Sensors 108, 109 respond to the position of each side guide pair 107, the output of sensors 108, 109 serving to regulate operation of edge fadeout lamps 45 and fuser cooling valve 171 (FIG. 3). Lower limit switches 110 on each tray prevent overtravel of the tray platform in a downward direction.

A heater 112 is provided below the platform 103 of main tray 100 to warm the tray area and enhance feeding of sheets therefrom. Humidstat 113 and thermostat 114 control operation of heater 112 in response to the temperature/humidity conditions of main tray 100. Fan 115 is provided to circulate air within tray 100.

To advance the sheets 3 from either main or auxiliary tray 100, 102, main and auxiliary sheet feeders 120, 121 are provided. Feeders 120, 121 each include a nudger roll 123 to engage and advance the topmost sheet in the paper tray forward into the nip formed by a feed belt 124 and retard roll 125. Retard rolls 125, which are driven at an extremely low speed by motor 126, cooperate with feed belts 124 to restrict feeding of sheets from trays 100, 102 to one sheet at a time.

Feed belts 124 are driven by main and auxiliary sheet feed motors 127, 128 respectively. Nudger rolls 123 are supported for pivotal movement about the axis of feed belt drive shaft 129 with drive to the nudger rolls taken from drive shaft 129. Stack height sensors 133, 134 are provided for the main and auxiliary trays, the pivoting nudger rolls 123 serving to operate sensors 133, 134, in response to the sheet stack height. Main and auxiliary tray misfeed sensors 135, 136 are provided at the tray outlets.

Main transport 140 extends from main paper tray 100 to a point slightly upstream of the nip formed by photoconductive belt 20 and transfer roll 75. Transport 140 is driven from main motor 34. To register sheets 3 with the images developed on belt 20, sheet register fingers 141 are provided, fingers 141 being arranged to move into and out of the path of the sheets on transport 140 once each revolution (see also FIG. 4). Registration fingers 141 are driven from main motor 34 through electromagnetic clutch 145 (seen in FIG. 4). A timing or reset switch 146 is set once on each revolution of sheet register fingers 141. Sensor 139 monitors transport 140 for jams. Further amplification of sheet register system may be found in U.S. Pat. No. 3,781,004, issued Dec. 25, 1973 to Buddendeck et al.

Pinch roll pair 142 is interspaced between transport belts that comprise main transport 140 on the downstream side of register fingers 141. Pinch roll pair 142 are driven from main motor 34.

Auxiliary transport 147 extends from auxiliary tray 102 to main transport 140 at a point upstream of sheet register fingers 141. Transport 147 is driven from motor 34.

To maintain the sheets in driving contact with the belts of transports 140, 147, suitable guides or retainers (not shown) may be provided along the belt runs.

The image bearing sheets leaving the nip formed by photoconductive belt 20 and transfer roll 75 are picked off by belts 155 of the leading edge of vacuum transport 149. Belts 155, which are perforated for the admission of vacuum therethrough, ride on forward roller pair 148 and rear roll 153. A pair of internal vacuum plenums 151, 154 are provided, the leading plenum 154 cooperating with belts 155 to pick up the sheets leaving the belt/transfer roll nip. Transport 149 conveys the image bearing sheets to fuser 150. Vacuum conduits 147, 156 communicate plenums 151, 154 with vacuum pumps 152, 152'. A pressure sensor 157 monitors operation of vacuum pump 152. Sensor 144 monitors transport 149 for jams.

To prevent the sheet on transport 149 from being carried into fuser 150 in the event of a jam or malfunction, a trap solenoid 158 is provided below transport 149. Energization of solenoid 158 raises the armature thereof into contact with the lower face of plenum 154 to intercept and stop the sheet moving therepast.

Referring particularly to FIGS. 3, 4, 11 and 12, fuser 150 comprises a lower heated fusing roll 160 and upper pressure roll 161. Rolls 160, 161 are supported for rotation in fuser housing 162. The core of fusing roll 160 is hollow for receipt of heating rod 163 therewithin.

Housing 162 includes a sump 164 for holding a quantity of liquid release agent, herein termed oil. Dispensing belt 165, moves through sump 164 to pick up the oil, belt 165 being driven by motor 166. A blanket-like wick 167 carries the oil from belt 165 to the surface of fusing roll 160.

Pressure roll 161 is supported within an upper pivotal section 168 of housing 162. This enables pressure roll 161 to be moved into and out of operative contact fusing roll 160. Cam shaft 169 in fuser housing 162 serves to move housing section 168 and pressure roll 161 into operative relationship with fusing roll 160 against a suitable bias (not shown). Cam shaft 169 is coupled to main motor 34 through an electromagnetically operated one revolution clutch 159.

Fuser housing section 168 is evacuated. For this purpose a conduit 170 couples housing section 168 with vacuum pump 153. The ends of housing section 168 are separated into vacuum compartments opposite the ends of pressure roll 161 thereunder to cool the roll ends where smaller size copy sheets 3 are being processed. Vacuum valve 171 (FIG. 3) in conduit 172 regulates communication of the vacuum compartments with vacuum pump 153' in response to the size sheets as sensed by side guide sensors 108, 109 in paper trays 100, 102.

Fuser roll 160 is driven from main motor 34. Pressure roll 161 is drivingly coupled to fuser roll 160 for rotation therewith.

Thermostat 174 (FIG. 12) in fuser housing 162 controls operation of heating rod 163 in response to temperature. Temperature sensor 175 protects against fuser over-temperature. To protect against trapping of a sheet in fuser 150 in the event of a jam, sensor 176 is provided.

Following fuser 150, the sheet is carried by post fuser transport 180 to either discharge transport 181 or, where duplex or two sided copies are desired, to return transport 182. Sheet sensor 183 monitors passage of the sheets from fuser 150. Transports 180, 181 are driven from main motor 34. Sensor 181' monitors transport 181 for jams. Suitable retaining means may be provided to retain the sheets on transports 180, 181.

A deflector 184, when extended, directs sheets on transport 180 onto conveyor roll 185 and into chute 186 leading to return transport 182. Solenoid 179, when energized raises deflector 184 into the sheet path. Return transport 182 carries the sheets back to auxiliary tray 102. Sensor 189 monitors transport 182 for jams. Paper stops 187 of tray 102 is supported for oscillating movement. Motor 188 drives stops 187 back and forth tap sheets returned to auxiliary tray 102 into alignment for refeeding.

To invert duplex copy sheets following fusing of the second or duplex image, a displaceable sheet stop 190 is provided adjacent the discharge end of chute 186. Stop 190 is pivotally supported for swinging movement into and out of chute 186. Solenoid 191 is provided to move stop 190 selectively into or out of chute 186. The sheet trapped in chute 186 by stop 190 is removed by pinch roll pairs 192, 193 and fed out through chute 201 onto discharge transport 181. Further description of the inverter mechanism may be found in U.S. Pat. No. 3,856,295, issued Dec. 24, 1974, to John H. Looney.

Output tray 195 receives unsorted copies. Transport 196 a portion of which is wrapped around a turn around roll 197, serves to carry the finished copies to tray 195. Sensor 194 monitors transport 196 for jams. To route copies into output tray 195, a deflector 198 is provided. Deflector solenoid 199, when energized, turns deflector 198 to intercept sheets on conveyor 181 and route the sheets onto conveyor 196.

When output tray 195 is not used, the sheets are carried by conveyor 181 to sorter 14.

SORTER

Figure 13:
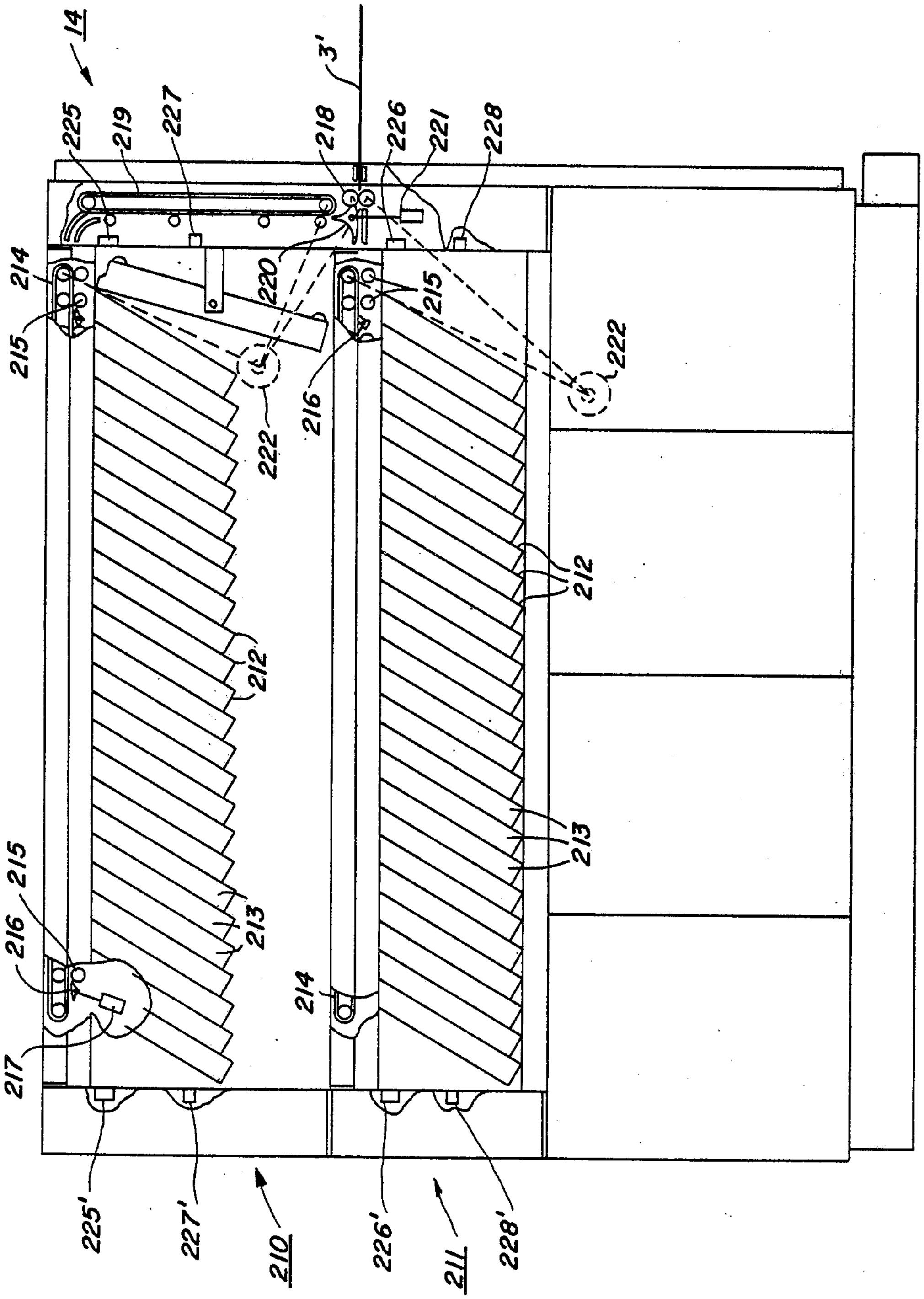
FIG. 13 is an enlarged view showing details of the copy sorter for the apparatus shown in FIG. 1.

Referring particularly to FIG. 13, sorter 14 comprises upper and lower bin arrays 210, 211. Each bin array 210, 211. Each bin array 210, 211 consists of series of spaced downwardly inclined trays 212, forming a series of individual bins 213 for receipt of finished copies 3'. Conveyors 214 along the top of each bin array, cooperate with idler rolls 215 adjacent the inlet to each bin to transport the copies into juxtaposition with the bins. Individual deflectors 216 at each bin cooperate, when depressed, with the adjoining idler roll 215 to turn the copies into the bin associated therewith. An operating solenoid 217 is provided for each deflector.

A driven roll pair 218 is provided at the inlet to sorter 14. A generally vertical conveyor 219 serves to bring copies 3' to the upper bin array 210. Entrance deflector 220 routes the copies selectively to either the upper or lower bin array 210. Entrance deflector 220 routes the copies selectively to either the upper or lower bin array 210, 211 respectively. Solenoid 221 operates deflector 220.

Motor 222 is provided to drive the conveyors 214 and 219 of upper bin array 210 and conveyor 214 of lower bin array 211. Roll pair 218 is drivingly coupled to motor 222.

To detect entry of copies 3' in the individual bins 213, a photoelectric type sensor 225, 226 is provided at one end of each bin array 210, 211 respectively. Sensor lamps 225', 226' are disposed adjacent the other end of the bin array. To detect the presence of copies in the bins 213, a second set of photoelectric type sensors 227, 228 is provided for each bin array, on a level with a tray cutout (not shown). Sensor lamps 227', 228' are disposed opposite sensors 227, 228.

DOCUMENT HANDLER

Figure 14:
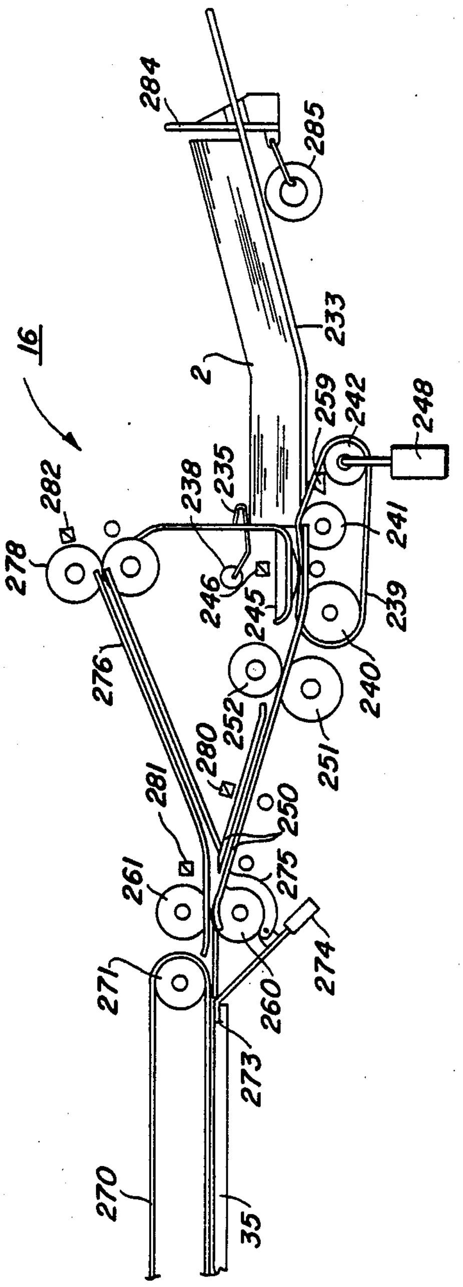
FIG. 14 is a schematic view showing details of the document handler for the apparatus shown in FIG. 1.
Figure 15:
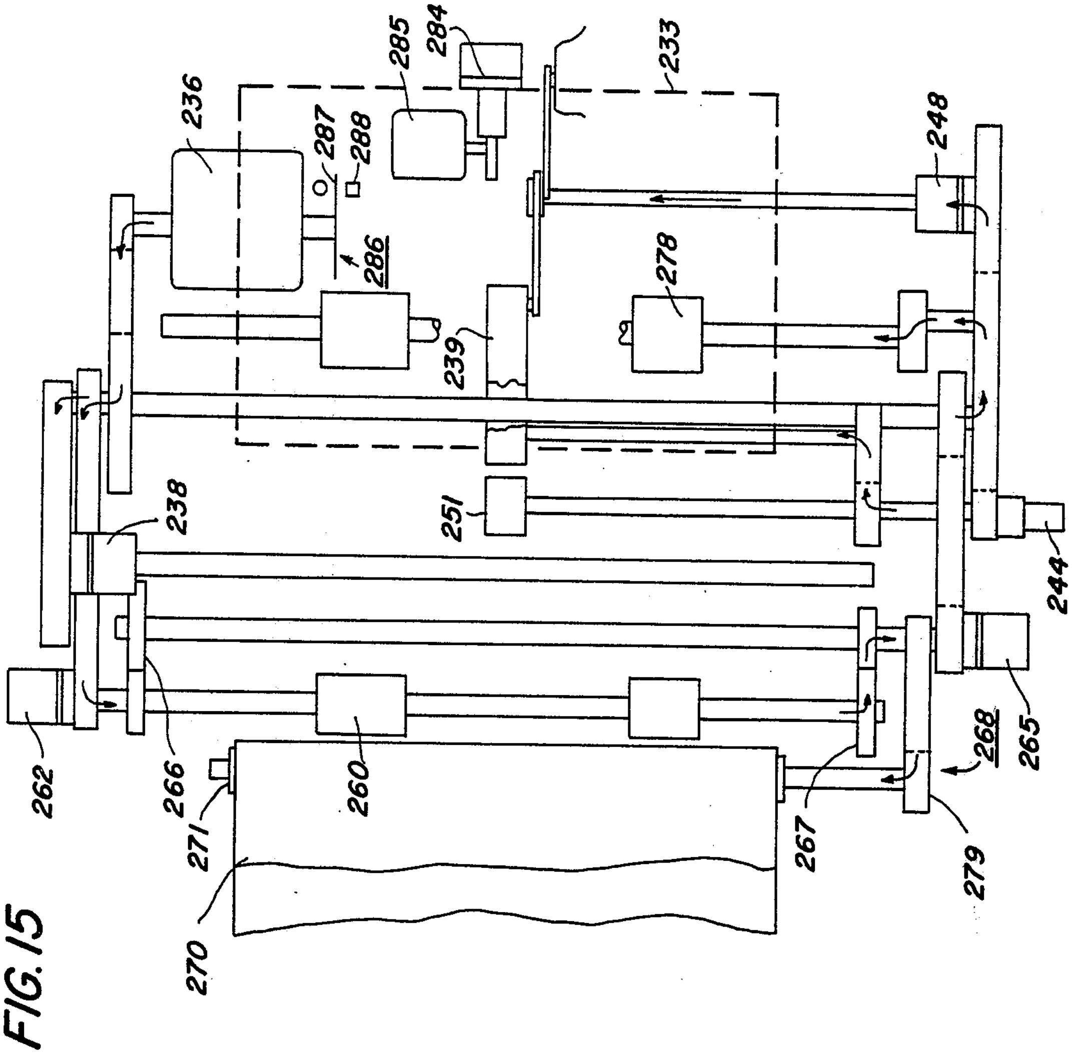
FIG. 15 is a view showing details of the drive mechanism for the document handler shown in FIG. 14.

Referring particularly to FIGS. 14 and 15, document handler 16 includes a tray 233 into which originals or documents 2 to be copied are placed by the operator following which a cover (not shown) is closed. A movable bail or separator 235, driven in an oscillatory path from motor 236 through a solenoid operated one revolution clutch 238, is provided to maintain document separation.

A document feed belt 239 is supported on drive and idler rolls 240, 241 and kicker roll 242 under tray 233, tray 233 being suitably apertured to permit the belt surface to project therewithin. Feed belt 239 is driven by motor 236 through electromagnetic clutch 244. Guide 245, disposed near the discharge end of feed belt 239, cooperates with belt 239 to form a nip between which the documents pass.

A photoelectric type sensor 246 is disposed adjacent the discharge end of belt 239. Sensor 246 responds on failure of a document to feed within a predetermined interval to actuate solenoid 248 raise kicker roll 242 and increases the surface area of feed belt 239 in contact with the documents. Another sensor 259 located underneath tray 233 provides an output signal when the last document 2 of each set has left the tray 233.

Document guides 250 route the document feed from tray 233 via roll pair 251, 252 to platen 35. Roll 251 is drivingly coupled to motor 236 through electromagnetic clutch 244. Contact of roll 251 with roll 252 turns roll 252.

Roll pair 260, 261 at the entrance to platen 35 advance the document onto platen 35, roll 260 being driven through electromagnetic clutch 262 in the forward direction. Contact of roll 260 with roll 261 turns roll 261 in the document feeding direction. Roll 260 is selectively coupled through gearset 268 with motor 236 through electromagnetic clutch 265 so that on engagement of clutch 265 and disengagement of clutch 262, roll 260 and roll 261 therewith turn in the reverse direction to carry the document back to tray 233 via return chute 276. One way clutches 266, 267 permit free wheeling of the roll drive shafts.

The document leaving roll pair 260, 261 is carried by platen feed belt 270 onto platen 35, belt 270 being comprised of a suitable flexible material having an exterior surface of xerographic white. Belt 270 is carried about drive and idler rolls 271, 272. Roll 271 is drivingly coupled to motor 236 for rotation in either a forward or reverse direction through clutches 262, 265. Engagement of clutch 262 operates through belt and pulley drive 279 to drive belt in the forward direction, engagement of clutch 265 operates through drive 279 to drive belt 270 in the reverse direction.

To locate the document in predetermined position on platen 35, a register 273 is provided at the platen inlet for engagement with the document trailing edge. For this purpose, control of platen belt 270 is such that following transporting of the document onto platen 35 and beyond register 273, belt 270 is reversed to carry the document backwards against register 273.

To remove the document from platen 35 following copying, register 273 is retracted to an inoperative position. Solenoid 274 is provided for moving register 273.

A document deflector 275, is provided to route the document leaving platen 35 into return chute 276, deflector 275 being raised by solenoid 274 when withdrawing register 273. For this purpose, platen belt 270 and pinch roll pair 260, 261 are reversed through engagement of clutch 265. Discharge roll pair 278, driven by motor 236, carry the returning document into tray 233.

To monitor movement of the documents in document handler 16 and detect jams and other malfunctions, photoelectric type sensors 246 and 280, 281 and 282 are disposed along the document routes.

To align documents 2 returned to tray 233, a document patter 284 is provided adjacent one end of tray 233. Patter 284 is oscillated by motor 285.

TIMING

To provide the requisite operational synchronization between host machine 10 and controller 18 as will appear, processor or machine clock 202 is provided. Referring particularly to FIG. 1, clock 202 comprises a toothed disc 203 drivingly supported on the output shaft of main drive motor 34. A photoelectric type signal generator 204 is disposed astride the path followed by the toothed rim of disc 203, generator 204 producing, whenever drive motor 34 is energized, a pulse like signal output at a frequency correlated with the speed of motor 34, and the machine components driven therefrom.

As described, a second machine clock, termed a pitch reset clock 138 herein, and comprising timing switch 146 is provided. Switch 146 cooperates with sheet register fingers 141 to generate an output pulse once each revolution of fingers 141. As will appear, the pulse like output of the pitch reset clock is used to reset or resynchronize controller 18 with host machine 10.

Figure 17:
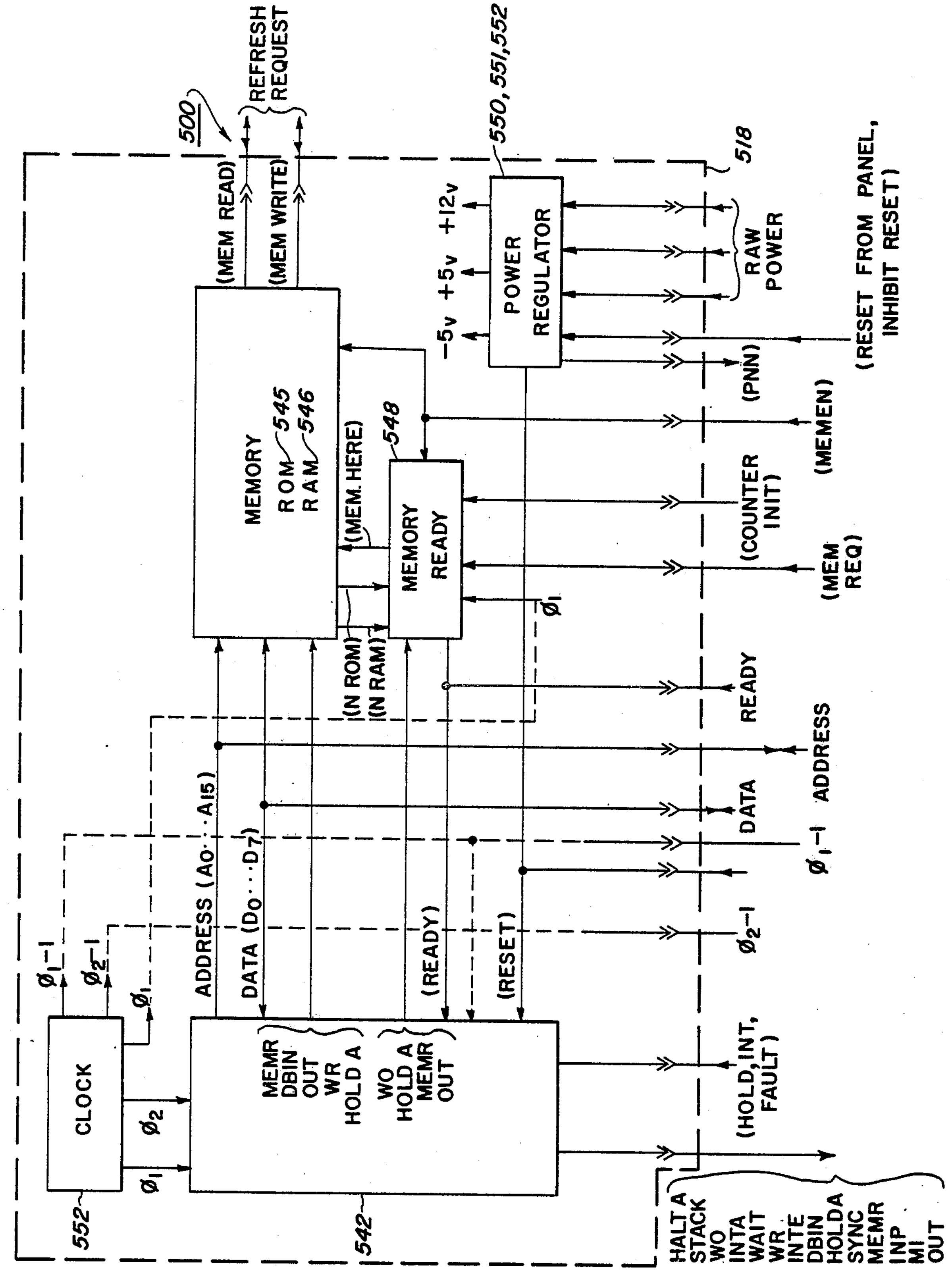
FIG. 17 is a block diagram of the controller CPU.

Referring to FIG. 15, a document handler clock 286 consisting of apertured disc 287 on the output shaft of document handler drive motor 236 and cooperating photoelectric type signal generator 288 is provided. As in the case of machine clock 202, document handler clock 286 produces an output pulse train from which components of the document handler may be synchronized. A real time clock such as clock 552 of FIG. 17, is utilized to control internal operations of the controller 18 as is known in the art.

CONTROLLER

Figure 16:
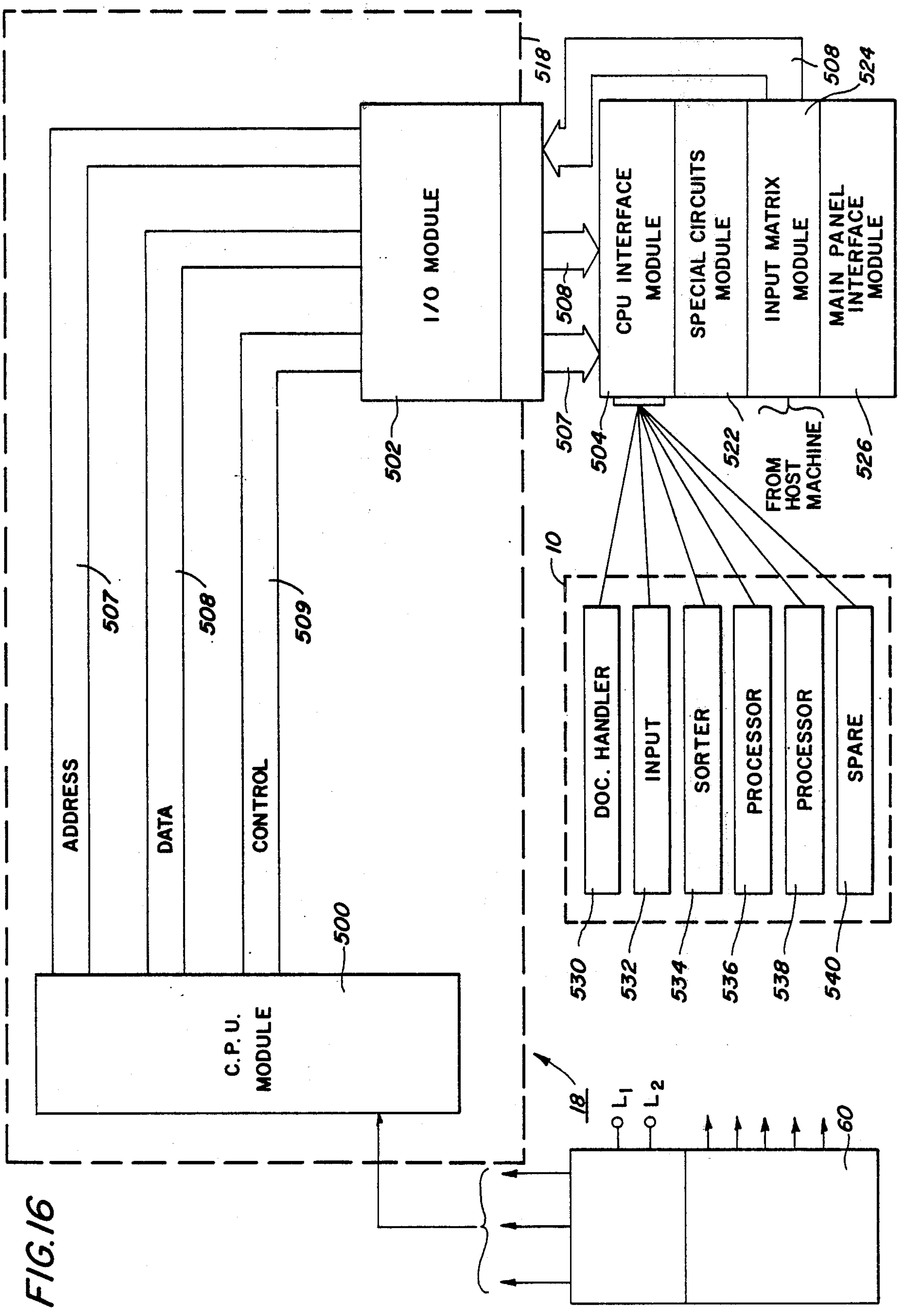
FIG. 16 is a block diagram of the controller for the apparatus shown in FIG. 1.

Referring to FIG. 16, controller 18 includes a Central Processor Unit (CPU) Module 500, Input/Output (I/O) Module 502, and Interface 504. Address, Data and Control Buses 507, 508, 509 respectively operatively couple CPU Module 500 and I/O Module 502. CPU Module 500 I/O Module 502 are disposed within a shield 518 to prevent noise interference.

Interface 504 couples I/O Module 502 with special circuits module 522, input matrix module 524, and main panel interface module 526. Module 504 also couples I/O Module 502 to the operating sections of the machine, namely, document handler section 530, input section 532, sorter section 534 and processor sections 536, 538. A spare section 540, which may be used for monitoring operation of the host machine, or which may be later utilized to control other devices, is provided.

Referring to FIGS. 17, 18(*a*), CPU module 500 comprises a processor 542 such as an Intel 8080 microprocessor manufactured by Intel Corporation, Santa Clara, California, 16K Read Only Memory (herein ROM) and 2K Random Access Memory (herein RAM) sections 545, 546, Memory Ready section 548, power regulator section 550, and onboard clock 552. Biplor tri-state buffers 510, 511 in Address and Data buses 507, 508 disable the bus on a Direct Memory access (DMA) signal (HOLDA) as will appear. While the capacity of memory sections 545, 546 are indicated throughout as being 16K and 2K respectively, other memory sizes may be readily contemplated.

Figure 19A:
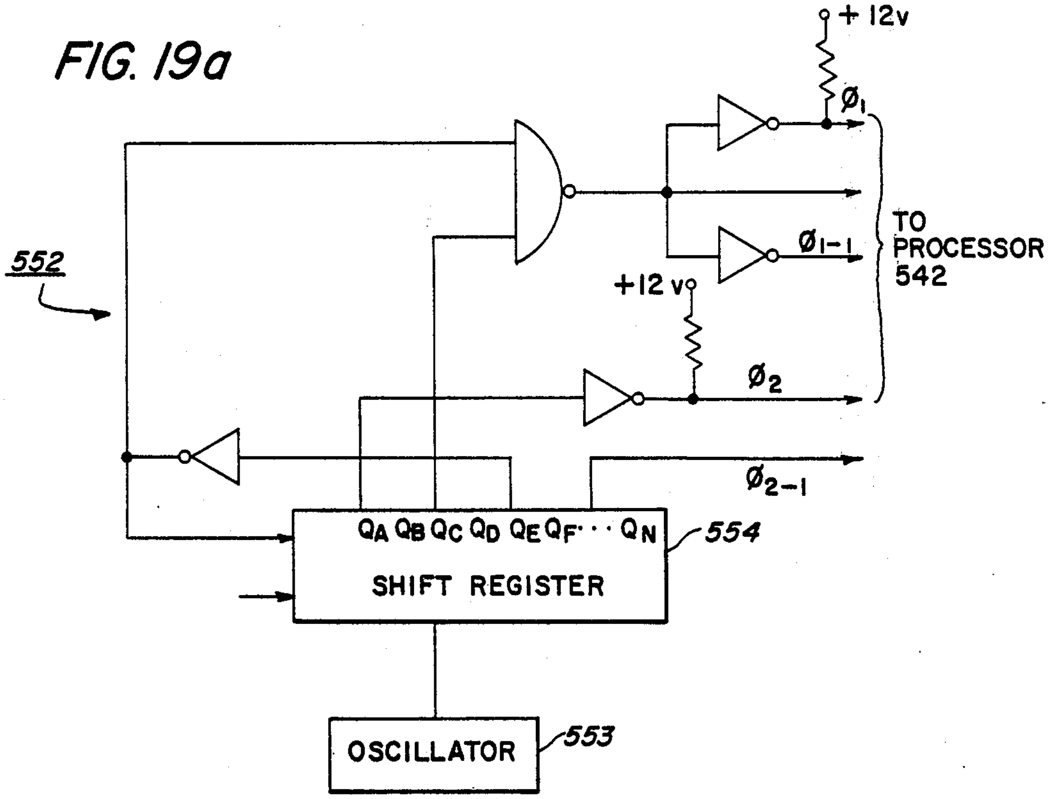
FIG. 19*a* is a logic schematic of the CPU clock.
Figure 19B:
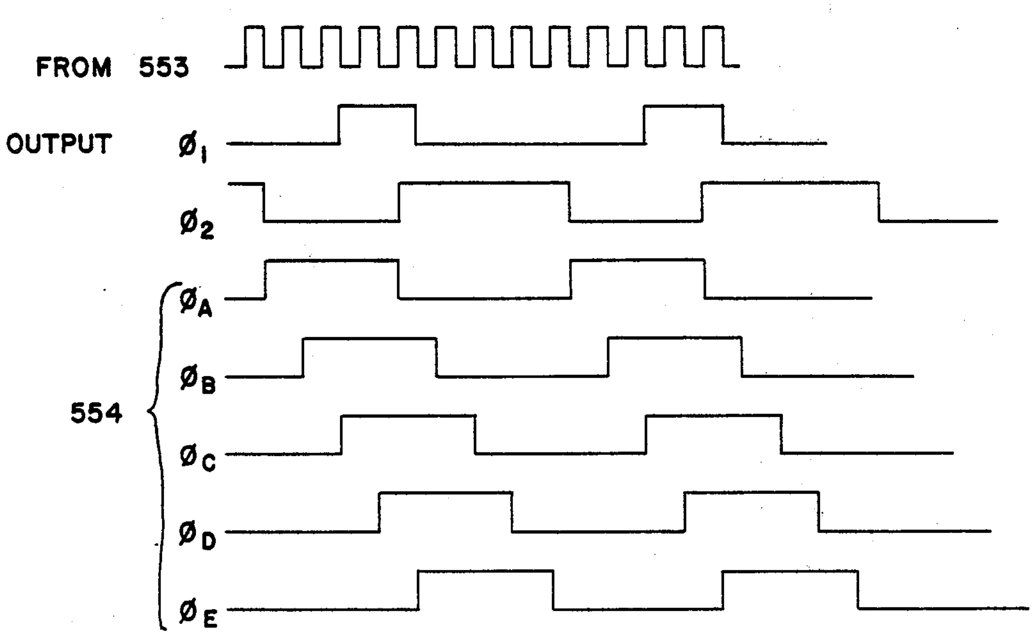
FIG. 19*b* is a chart illustrating the output wave form of the clock shown in FIG. 19*a;*

Referring particularly to FIG. 19(*a,b*), clock 552 comprises a suitable clock oscillator 553 feeding a multibite (Qa–Qn) shift register 554. Register 554 includes an internal feedback path from one bit to the serial input of register 554. Output signal waveforms $\phi_1$, $\phi_2$, $\phi_{1\text{-}1}$ and $\phi_{2\text{-}1}$ are produced for use by the system.

Figure 20:
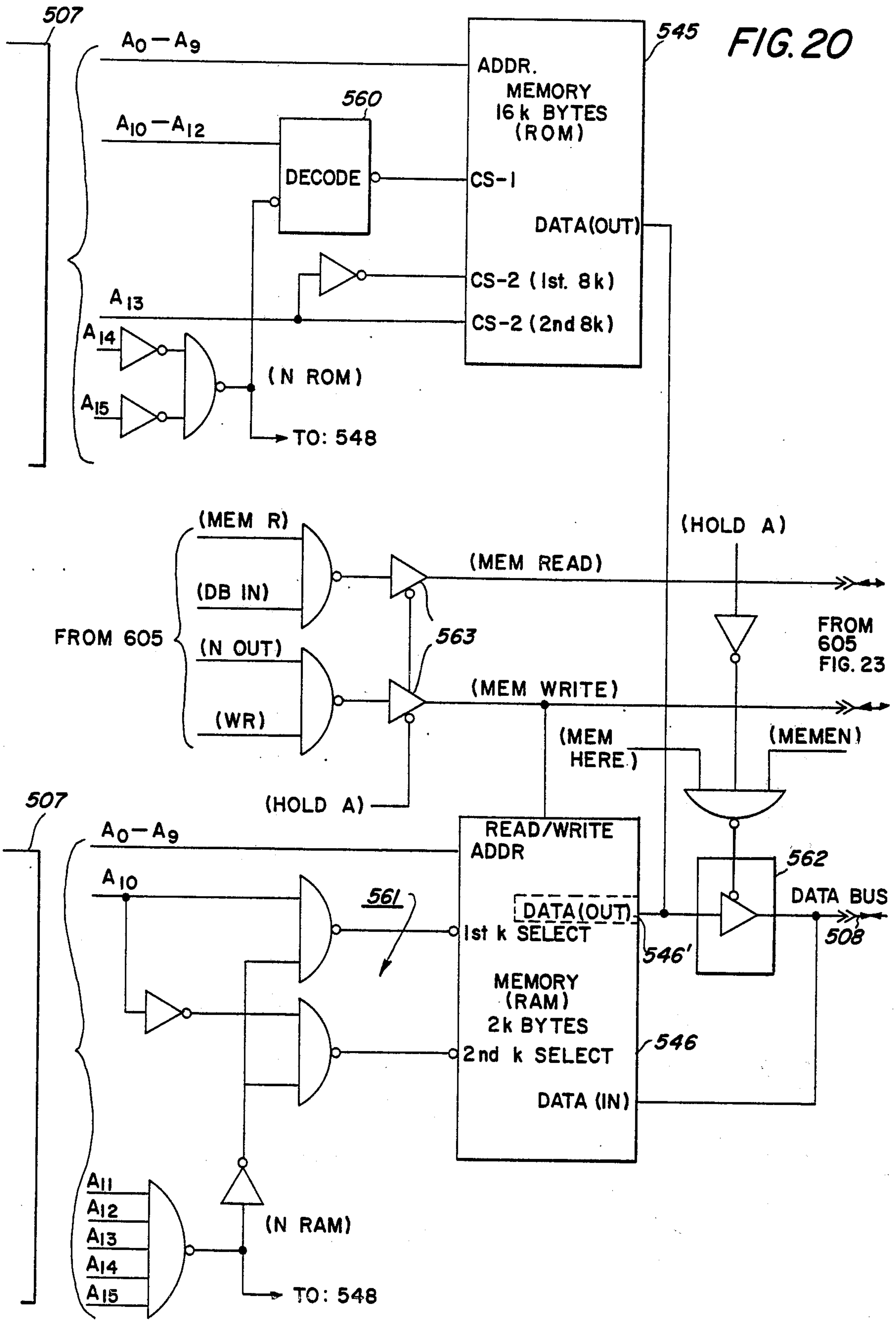
FIG. 20 is a logic schematic of the CPU memory.

Referring to FIG. 20, the memory bytes in ROM section 545 are implemented by address signals (AO–A 15) from processor 542, selection being effected by 3 to 8 decode chip 560 controlling chip select 1(CS-1) and a 1 bit selection (A 13) controlling chip select 2(CS-2). The most significant address bits (A 14, A 15) select the first 16K of the total 64 bytes of the addressing space. The memory bytes in RAM section 546 are implemented by Address signals Ao– A 15) through selector circuit 561. Address bit A 10 serves to select the memory bank while the remaining five most significant bits (A 11– A 15) select the last 2 K bytes out of the 64K bytes of addressing space. RAM memory section 546 includes a 40 bit output buffer (Data Out) the output of which is tied together with the output from ROM memory section 545 and goes to tri-state buffer 562 to drive Data bus 508. Buffer 562 is enabled when either memory section 545 or 546 is being addressed and either a (MEM READ) or DMA (HOLD A) memory request exists. An enabling signal (MEMEN) is provided from the machine control or service panel (not shown) which is used to permit disabling of buffer 562 during servicing of CPU Module 500. Write control comes from either processor 542 (MEM WRITE) or from DMA (HOLD A) control. Tri-state buffers 563 permit Refresh Control 605 of I/O Module 502 (FIG. 23*b*) to access MEM READ and MEM WRITE control channels directly on a DMA signal (HOLD A) from processor 542 as will appear.

Referring to FIG. 21, memory ready section 548 provides a READY signal to processor 542. A binary counter 566, which is initialized by a SYNC signal 100,) to a prewired count as determined by input circuitry 567, counts up at a predetermined rate. At the maximum count, the output at gate 568 comes true stopping the counter 566. If the cycle is a memory request (MEM REQ) and the memory location is on board as determined by the signal (MEM HERE) to tri-state buffer 569, a READY signal is sent to processor 542. Tri-state buffer 570 in MEM REQ line permits Refresh Control 605 of I/O Module 502 to access the MEM REQ channel directly on a DMA signal (HOLD A) from processor 542 as will appear.

Figure 22A:
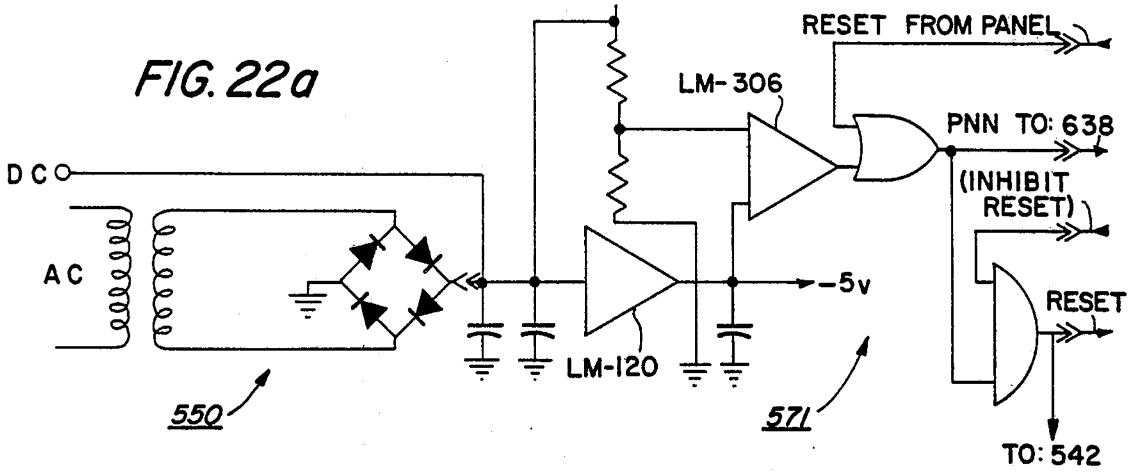
FIGS. 22*a*, 22*b*, 22*c* are logic schematics of the CPU power supply stages.
Figure 22B:
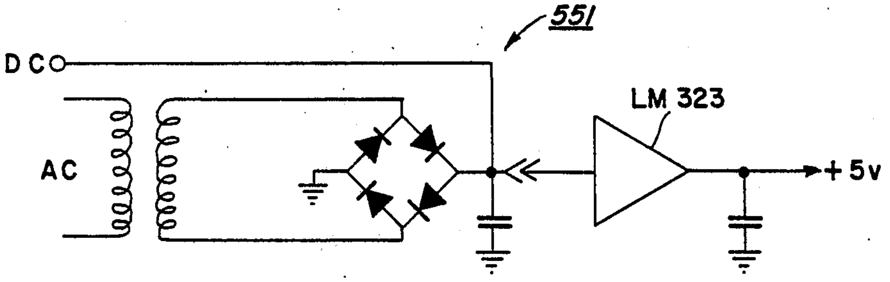
Figure 22C:
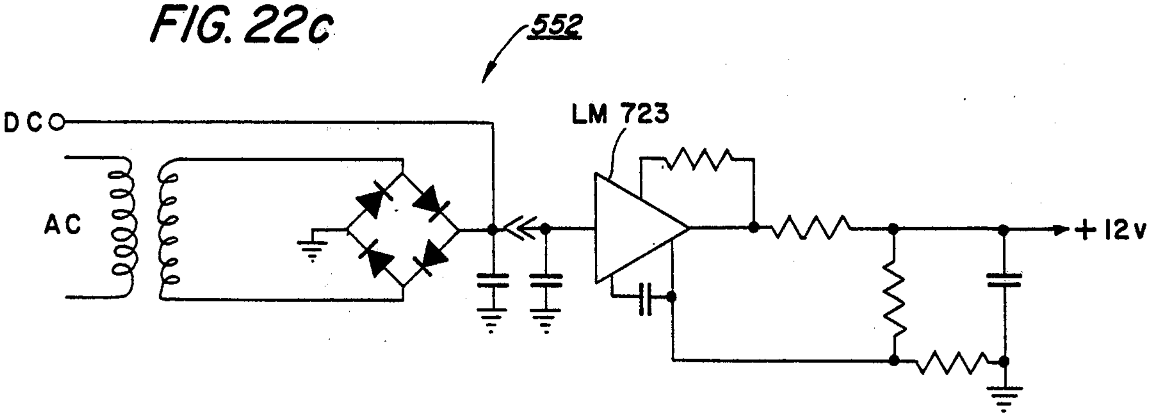

Referring to FIGS. 22 (*a,bc*) and 23*b* power regulators 550, 551, 552 provide the various voltage levels, i.e. +5v, +12v, and −5v D.C. required by the module 500. Each of the three on board regulators 550, 551, 552 employ filtered D.C. inputs. Power Not Normal (PNN) detection circuitry 571 is provided to reset processor 542 during the power up time. Reset control from the machine service panel (not shown) is also provided via PNN. An enabling signal (INHIBIT RESET) from Memory Control 638 allows completion of a write cycle in Non Volatile (N.V.) Memory 610 of I/O Module 502.

Figure 18A:
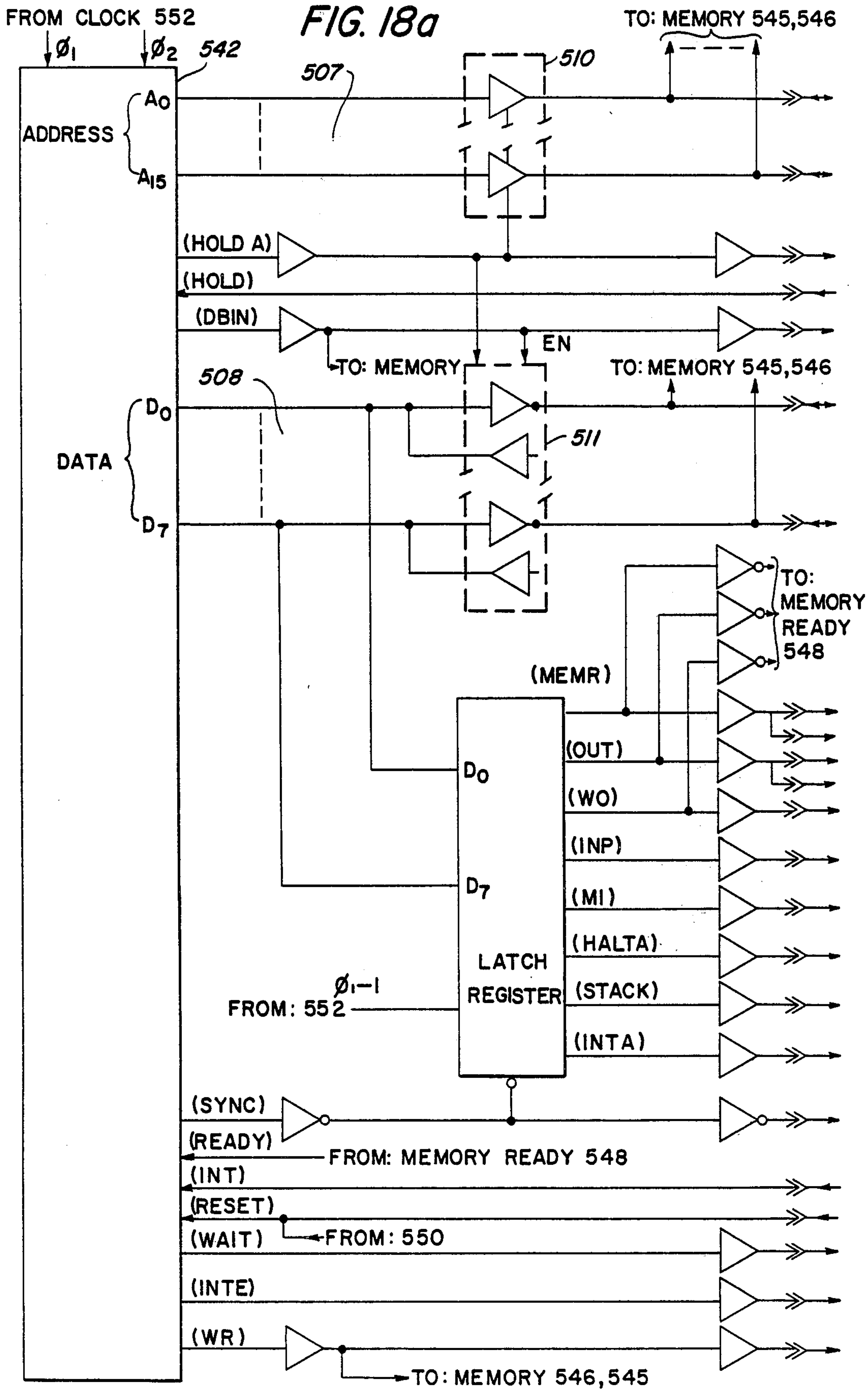
FIG. 18*a* is a block diagram showing the CPU microprocessor input/output connections.
Figure 18B:
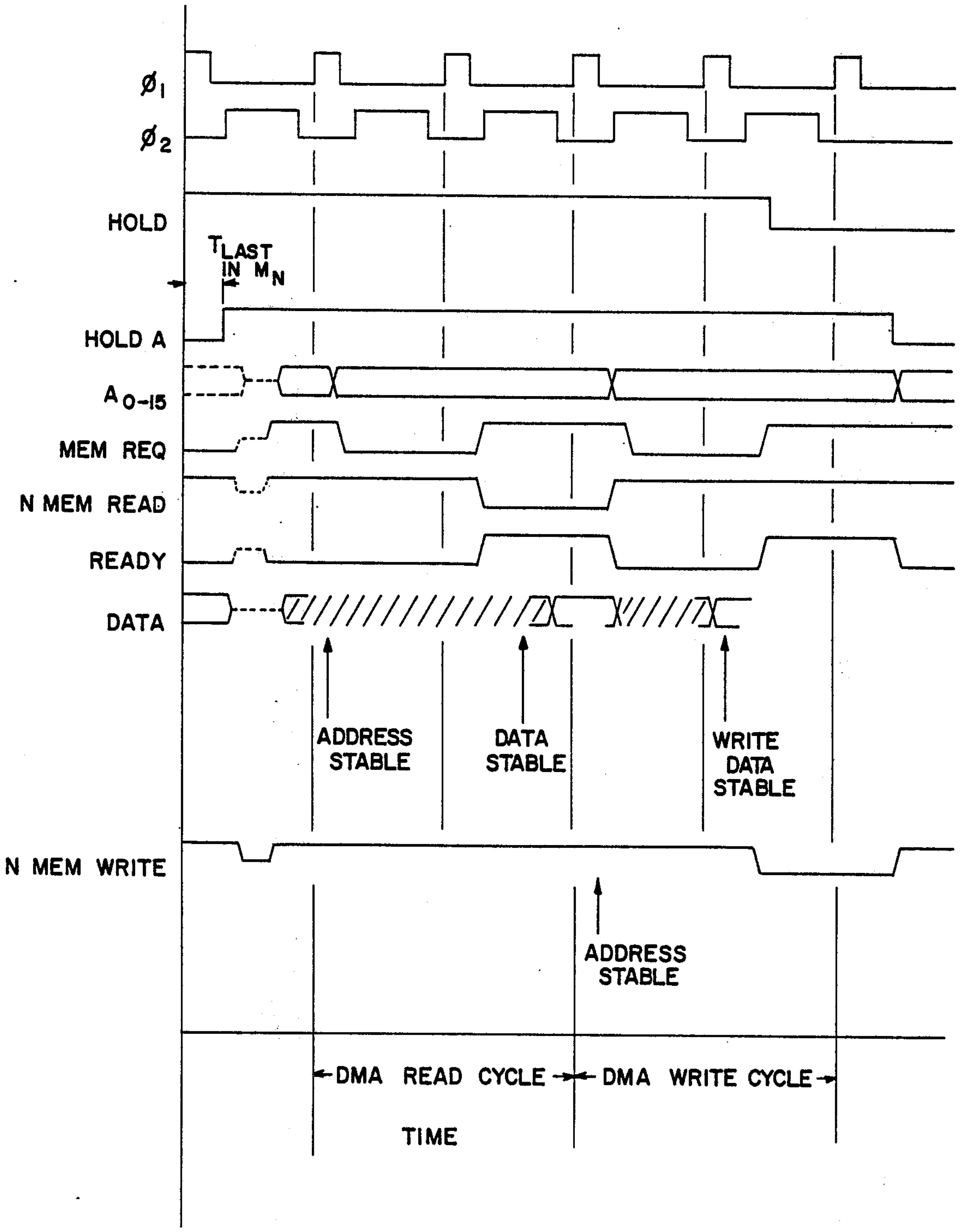
FIG. 18*b* is a timing chart of Direct Memory access (DMA) Read and Write cycles.
Figure 23A:
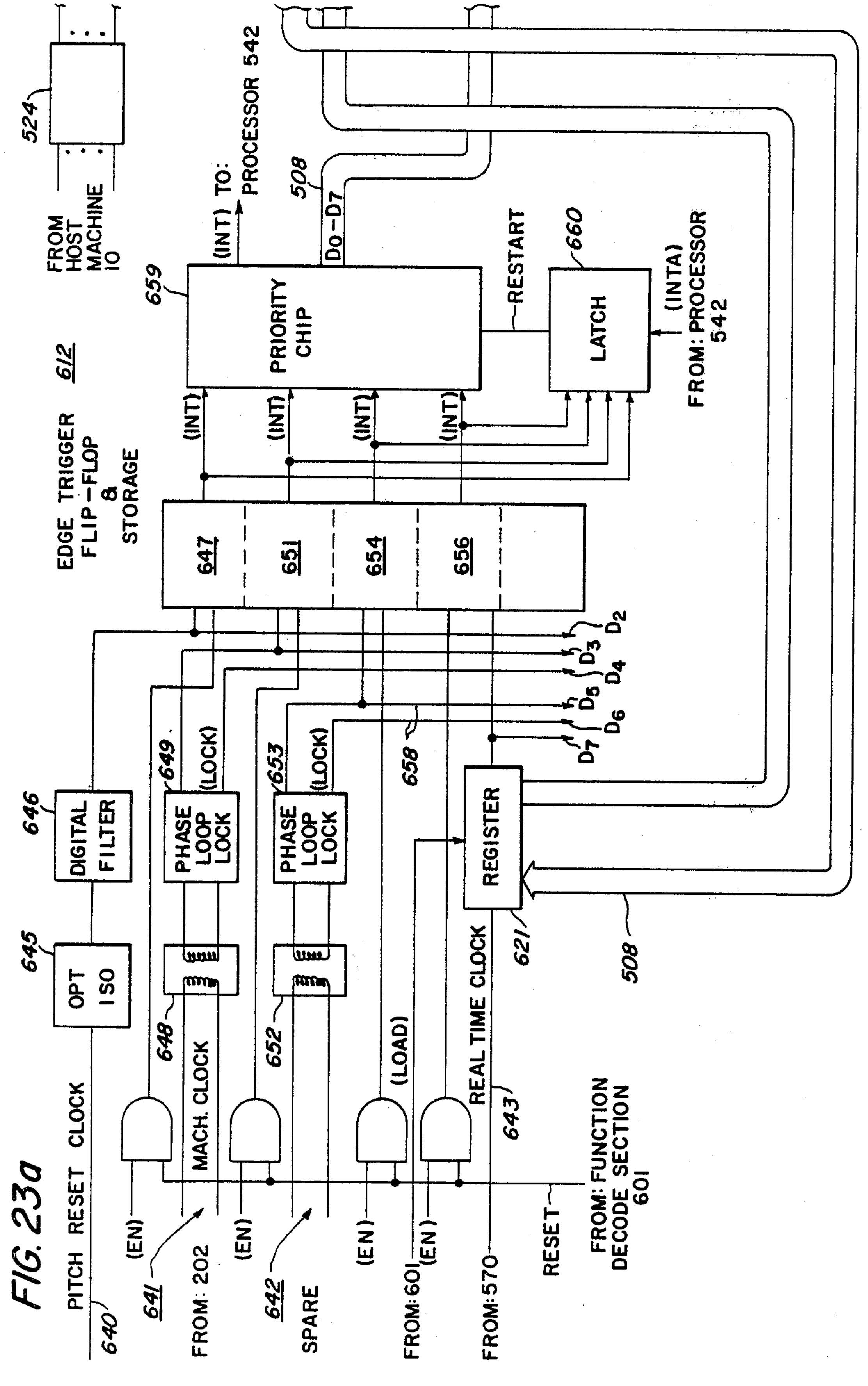
FIGS. 23*a* and 23*b* comprise a block diagram of the controller I/O module.
Figure 23B:
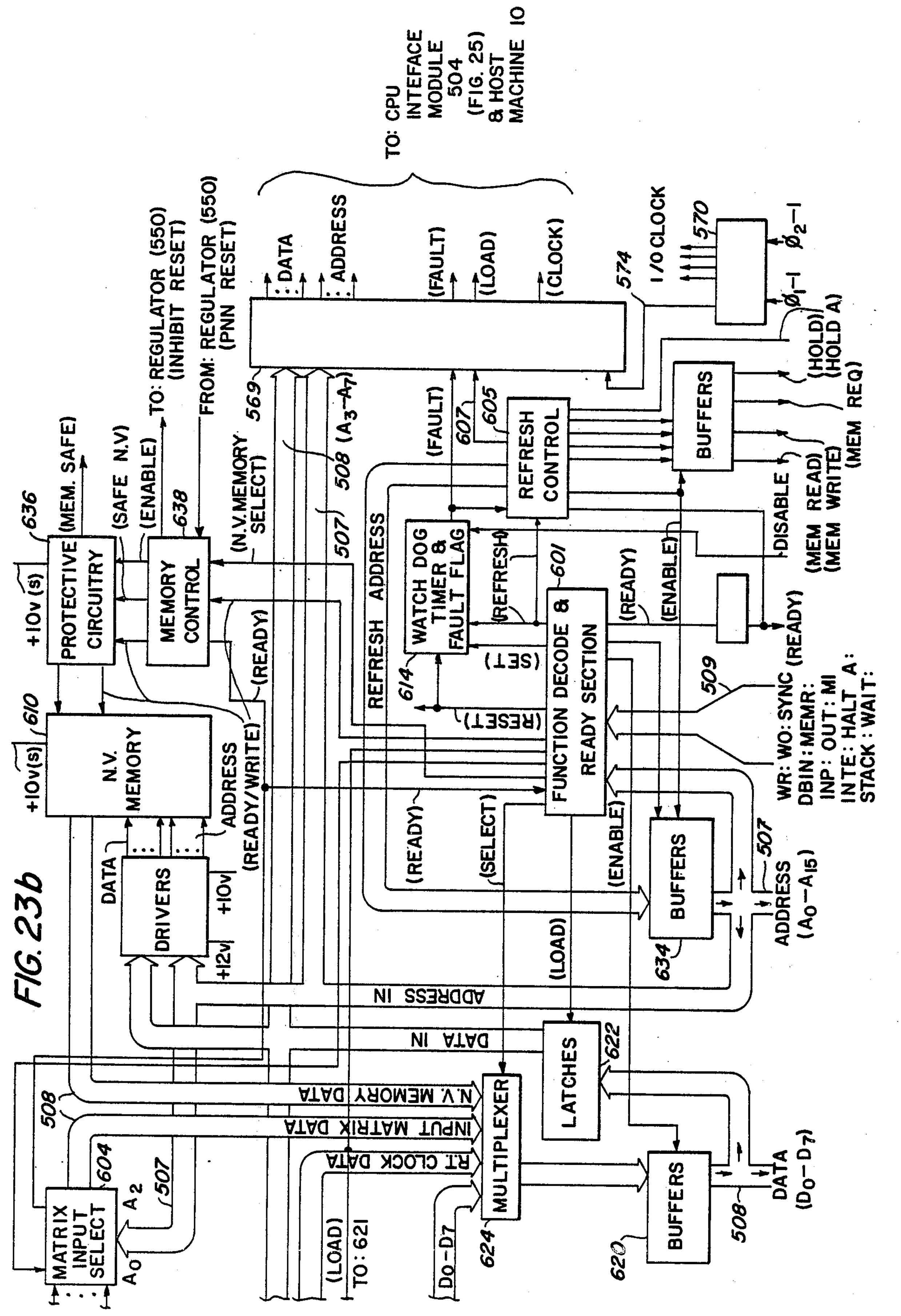

Referring to FIGS. 18*a*, 20, 21, and the DMA timing chart (FIG. 18*b*) data transfer from RAM section 546 to host machine 10 is effected through Direct Memory Access (DMA), as will appear. To initiate DMA, a signal (HOLD) is generated by Refresh Control 605 (FIG. 23*b*). On acceptance, processor 542 generates a signal HOLD ACKNOWLEDGE (HOLD A) which works through tri-state buffers 510, 511 and through buffers 563 and 570 to release Address bus 507, Data bus 508 and MEM READ, MEM WRITE, and MEM REQ channels (FIGS. 20, 21) to Refresh Control 605 of I/O Module 502.

Referring to FIG. 23 (*a,b*), I/O Module 502 interfaces with CPU module 500 through bi-directional Address and, Data buses 507, 508 respectively, and control bus, 509 . I/O Module 502 appears to CPU module 500 as a memory portion. Data transfers between CPU and I/O modules 500, 502, and commands to I/O module 502 except for output refresh are controlled by memory reference instructions executed by CPU module 500. Output refresh which is initiated by one of several uniquely decoded memory reference commands, enables Direct Memory access (DMA) by I/O module 502 of RAM section 546.

I/O module 502 includes Matrix Input select 604 (through which inputs from the host machine 10, are received), Refresh Control 605, Nonvolatile (NV) memory 610, Interrupt Control 612 (FIG. 23*a*), Watch dog Timer and failure Flag 614 and clock 570.

A Function Decode Section 601 receives and interprets commands from CPU section 500 by decoding information on address bus 507 along with control signals from processor 542 on control bus 509. On command, decode section 601 generates control signals to perform the function indicated. These functions include (a) controlling tri-state buffers 620 to establish the direction of data flow in Data bus 508; (b) strobing data from Data bus 508 into buffer latches 622; (c) controlling multiplexer 624 to put data from Interrupt Control 612, Real Time clock register, Matrix Input Select 604 or N.V. memory 610 onto data bus 508; (d) actuating refresh control 605 to initiate a DMA operation; (e) actuating buffers 634 to enable address bits Ao - A 7 to be sent to the host machine 10 for input matrix read operations; (f) commanding operation of Matrix Input Select 604; (g) initiating read or write operation of N.V. memory 610 through Memory Control 638; (h) loading Real Time clock register 621 (FIG. 23*a*) from data bus 508; and (i) resetting the Watch Dog timer and setting the Fault Failure flag 614. In addition, section 601 includes logic to control and synchronize the READY control line to CPU module 500, the READY line being used to advise module 500 when data placed on the Data bus by I/O module 502 is valid.

Watch dog timer and failure flag 614, which serves to detect certain hardwired and software malfunctions, comprises a free running counter which under normal circumstances is periodically reset by an output refresh command (REFRESH) from Function Decode Section 601. If an output refresh command is not received within a preset time interval, (i.e. 25m sec) a fault flip flop is set and a signal (FAULT) sent to the host machine 10. The signal (FAULT) also raises the HOLD line (Via Refresh Control 605) to disable CPU Module 500 clearing of the fault flip flop may be by cycling power or generating a signal (RESET). A selector (not shown) may be provided to disable (DISABLE) the watch dog timer when desired. The fault flip flop may also be set by a command from the CPU Module to indicate that the operating program detected a fault.

Matrix Input select 604 which controls receipt of data from host machine 10 has capacity to read up to 32 groups of 8 discrete inputs from host machine 10. Lines $A_3$ through $A_7$ of Address bus 507 are routed to host machine 10 via optical isolator 569 and CPU Interface Module 504 to select the desired group of 8 inputs. The selected inputs from machine 10 are received by matrix 604 via Input Matrix Module 524 (FIG. 28) and are placed by matrix 604 onto data bus 508 and sent to CPU Module 500 via multiplexer 624. Bit selection is effected by lines $A_0$ through $A_2$ of Address bus 507.

Output refresh control 605, when initiated, transfers either 16 or 32 sequential words from the memory output buffer (DATA OUT) of RAM memory section 546 to host machine 10 at the predetermined clock rate in line 574. Direct Memory access (DMA) is used to facilitate transfer of the data at a relatively high rate. On a Refresh signal from Function Decode Section 601, Refresh Control 605 generates a HOLD signal to processor 542. On acknowledgement (HOLD A) processor 542 enters a hold condition. In this mode, CPU Module 500 releases address and data buses 507, 508 (through actuation of tri-state buffers 510, 511 as described) to the high impedance state giving I/O module 502 control thereover. I/O module 502 then sequentially accesses the 32 memory words from output buffer (DATA OUT) of RAM section 546 (REFRESH ADDRESS) and transfers the contents to the host machine 10 via data bus 508 and optical isolator 569. CPU Module 500 is dormant during this period.

On capture of the address and data buses 507, 508, a control signal (LOAD) from Refresh Control 605 together with a clock signal (CLOCK) in line 574 are utilized to generate eight 32 bit serial words which are transmitted serially via CPU Interface Module 504 to the host machine remote locations where serial to parallel transformation is performed. Alternatively, the data may be stored in addressable latches and distributed in parallel directly to the required destinations.

N.V. memory 610 comprises a predetermined number of bits of non-volatile memory stored in I/O module 502 under Memory Control 638. N.V. memory 610 appears to CPU module 500 as part of the CPU module memory complement and therefore may be accessed by the standard CPU memory reference instruction set. Referring particularly to FIG. 24, to sustain the contents of N.V. memory 610 should system power be interrupted, one or more rechargeable batteries 635 are provided exterior to I/O module 502. CMOS protective circuitry 636 couples batteries 635 to memory 610 to preserve memory 610 on a failure of the system power. A logic signal (INHIBIT RESET) prevents the CPU Module 500 from being reset during the N.V. memory write cycle interval so that any write operation in progress will be completed before the system is shut down.

For tasks that require frequent servicing, high speed response to external events, or synchronization with the operation of host machine 10, a multiple interrupt system is provided. These comprise machine based interrupts, herein referred to as Pitch Reset interrupt and the Machine interrupt, as well as a third clock driven interrupt, the Real Time interrupt.

Referring particularly to FIG. 23(*a*) the highest priority interrupt signal, Pitch reset signal 640, is generated by the signal output of pitch reset clock 138. The clock signal is fed via optical isolator 645 and digital filter 646 to edge trigger flip flop 647.

The second highest priority interrupt signal, machine clock signal 641, is sent directly from machine clock 202 through isolation transformer 648 to a phase locked loop 649. Loop 649, which serves as bandpath filter and signal conditioner, sends a square wave signal to edge trigger flip flop 651. The second signal output (LOCK) serves to indicate whether loop 649 is locked onto a valid signal input or not.

The lowest priority interrupt signal, Real Time Clock signal 643, is generated by register 621. Register 621 which is loaded and stored by memory reference instructions from CPU module 500 is decremented by a clock signal in line 643 which may be derived from I/O Module clock 570. On the register count reaching zero, register 621 sends an interrupt signal to edge trigger flip flop 656. A spare interrupt 642 is also provided.

Setting of one or more of the edge trigger flip flops 647, 651, 654, 656 by the interrupt signals 640, 641, 642, 643 generates a signal (INT) via priority chip 659 to processor 542 of CPU Module 500 (FIG. 18*a*). On acknowledgement, processor 542, issues a signal (INTA) transferring the status of the edge trigger flip flops 647, 651, 654, 656 to a four bit latch 660 to generate an interrupt instruction code (RESTART) onto the data bus 508.

Each interrupt is assigned a unique RESTART instruction code. Should an interrupt of higher priority be triggered, a new interrupt signal (INT) and RESTART instruction code are generated resulting in a nesting of interrupt software routines whenever the interrupt recognition circuitry is enabled within the CPU 500.

Priority chip 659 serves to establish a handling priority in the event of simultaneous interrupt signals in accordance with the priority schedule described.

Once triggered, the edge trigger flip flop 647, 651, 654 or 656 must be reset in order to capture the next occurrence of the interrupt associated therewith. Each interrupt subroutine serves, in addition to performing the functions programmed, to reset the flip flops (through the writing of a coded byte in a uniquely selected address) and to re-enable the interrupt (through execution of a re-enabling instruction). Until re-enabled, initiation of a second interrupt is precluded while the first interrupt is in progress.

Lines 658 permit interrupt status to be interrogated by CPU module 500 on a memory reference instruction.

I/O Module 502 includes a suitable pulse generator or clock 570 for generating the various timing signals required by module 502. Clock 570 is driven by the pulse-like output $\phi_{1-1}$, $\phi_{2-1}$ of processor clock 552 (FIG. 19*a*). As described, clock 570 provides a reference clock pulse (in line 574) for synchronizing the output refresh data and is the source of clock pulses (in line 643) for driving Real Time register 621.

Figure 26:
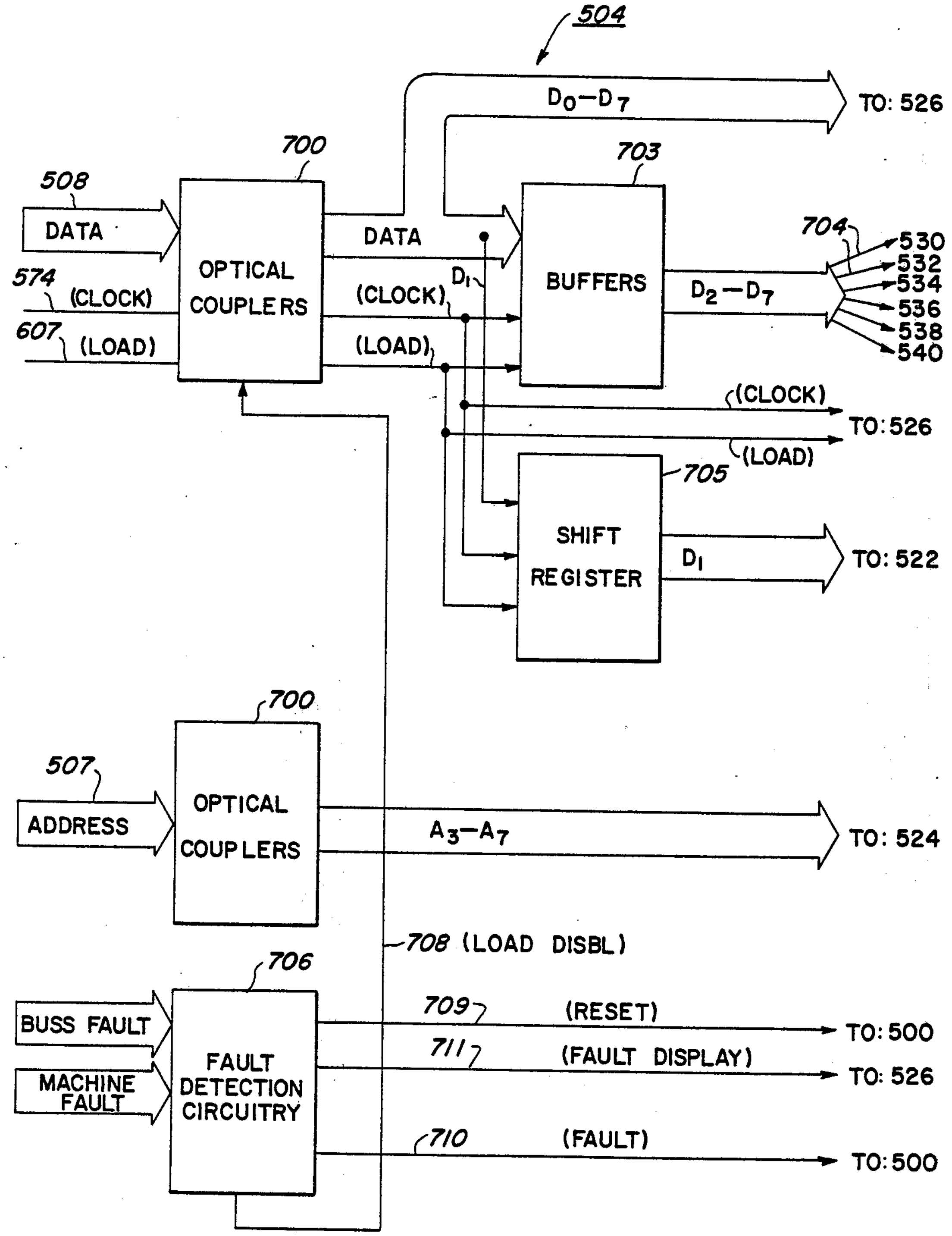
FIG. 26 is a block diagram of the CPU interface module.

CPU interface module 504 interfaces I/O module 502 with the host machine 10 and transmits operating data stored in RAM section 546 to the machine. Referring particularly to FIG. 25 and 26, data and address information are inputted to module 504 through suitable means such as optical type couplers 700 which convert the information to single ended logic levels. Data in bus 508 on a signal from Refresh Control 605 in the 607 (LOAD), is clocked into module 546 at the reference clock rate in line 574 parallel by bit, serial by byte for a preset byte length, with each data bit of each successive byte being clocked into a separate data channel D0 - D7. As best seen in FIG. 25, each data channel DO–D7 has an assigned output function with data channel D0 being used for operating the front panel lamps 830 in the digital display, (see FIG. 32), data channel D1 for special circuits module 522, and remaining data channels D2 - D7 allocated to the host machine operating sections 530, 532, 534, 536, 538 and 540. Portions of data channels DI–D7 have bits reserved for front panel lamps and digital display.

Since the bit capacity of the data channels D2–D7 is limited, a bit buffer 703 (FIG. 26) is preferably provided to catch any bit overflow in data channels D2–D7.

Inasmuch as the machine output sections 530, 532, 534, 536, 538 and 540 are electrically a long distance away, i.e. remote, from CPU interface module 504, and the environment is electrically "noisy", the data stream in channels D2–D7 is transmitted to remote sections 530, 532, 534, 536, 538 and 540 via a shielded twisted pair 704. By this arrangement, induced noise appears as a differential input to both lines and is rejected. The associated clock signal for the data is also transmitted over line 704 with the line shielded carrying the return signal currents for both data and clock signals.

Data in channel $D_1$ destined for special circuits module 522 is inputted to shift register type storage circuitry 705 for transmittal to module 522. Dispaly data ($D_o$–$D_7$) is also inputted to main panel interface module 526. Address information in bus 507 is converted to single ended output by couplers 700 and transmitted to Input Matrix Module 524 to address host machine inputs.

CPU interface module 504 includes fault detector circuitry 706 for monitoring both faults occurring in host machine 10 and faults or failures along the buses, the latter normally comprising a low voltage level or failure in one of the system power lines. Machine faults may comprise a fault in CPU module 500, a belt mistrack signal from sensor 27 (see FIG. 2), opening one of the machine doors or covers as responded to by conventional cover interlock sensors (not shown), a fuser over temperature as detected by sensor 175, etc. In the event of a bus fault, a reset signal (RESET) is generated automatically in line 709 to CPU module 500 (see FIGS. 17 and 18*a*) until the fault is removed. In the event of a machine fault, a signal is generated in line 710 to actuate a suitable relay (not shown) controlling power to all or a portion of host machine 10. A load disabling signal (LOAD DISBL) is inputted to optical couplers 700 via line 708 in the event of a fault in CPU module 500 to Data receiving terminate input of data to host machine 10. Other fault conditions are monitored by the software background program. In the event of a fault, a signal is generated in line 711 to the digital display on control console 800 (via main panel interface module 526) signifying a fault.

Figure 27:
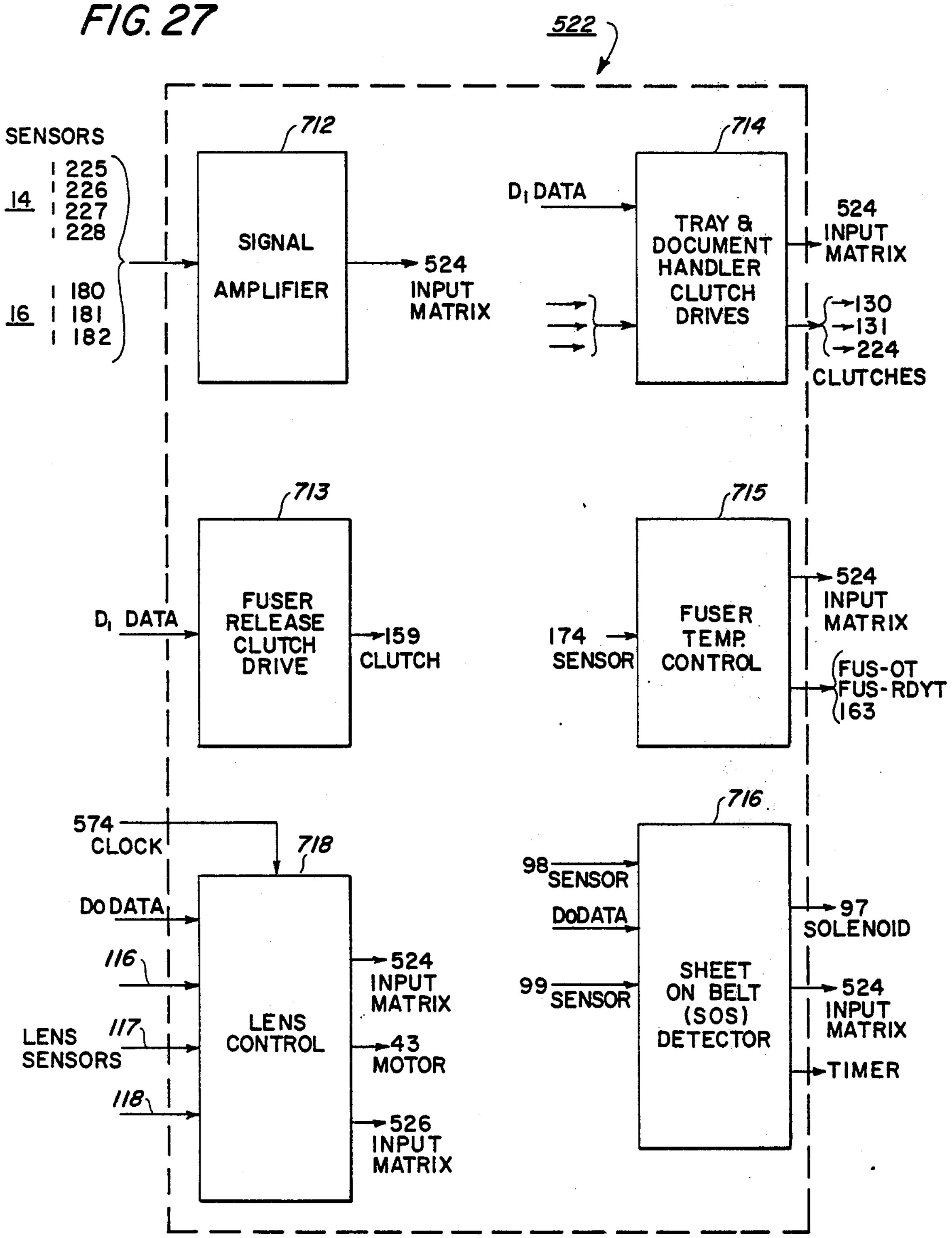
FIG. 27 is a block diagram of the apparatus special circuits module.

Referring particularly to FIGS. 25 and 27, special circuits module 522 comprises a collection of relatively independent circuits for either monitoring operation of and/or driving various elements of host machine 10. Module 522 incorporates suitable circuitry 712 for amplifying the output of sensors 225, 226, 227, 228 and 280, 281, 282 of sorter 14 and document handler 16 respectively; circuitry 713 for operating fuser release clutch 159; and circuitry 714 for operating main and auxiliary paper tray feed roll clutches 130, 131 and document handler feed clutch 244.

Additionally, fuser detection circuitry 715 monitors temperature conditions of fuser 150 as responded to by sensor 174. On overheating of fuser 150, a signal (FUS- OT) is generated to turn heater 163 off, actuate clutch 159 to separate fusing and pressure rolls 160, 161; trigger trap solenoid 158 to prevent entrance of the next copy sheet into fuser 150, and initiate a shutdown of host machine 10. Circuitry 715 also cycles fuser heater 163 to maintain fuser 150 at proper operating temperatures and signals (FUS-RDYT) host machine 10 when fuser 150 is ready for operation.

Circuitry 716 provides closed loop control over sensor 98 which responds to the presence of a copy sheet 3 on belt 20. On a signal from sensor 98, solenoid 97 is triggered to bring deflector 96 into intercepting position adjacent belt 20. At the same time, a backup timer (not shown) is actuated. If the sheet is lifted from the belt 20 by deflector 96 within the time allotted, a signal from sensor 99 disables the timer and a misstrip type jam condition of host machine 10 is declared and the machine is stopped. If the signal from sensor 99 is not received within the allotted time, a sheet on selenium (SOS) type jam is declared and an immediate machine stop is effected.

Circuitry 718 controls the position (and hence the image reduction effected) by the various optical elements that comprise main lens 41 in response to the reduction mode selected by the operator and the signal inputs from lens position responsive sensors 116, 117, 118. The signal output of circuitry 718 serves to operate lens drive motor 43 as required to place the optical elements of lens 41 in proper position to effect the image reduction programmed by the operator.

Figure 28:
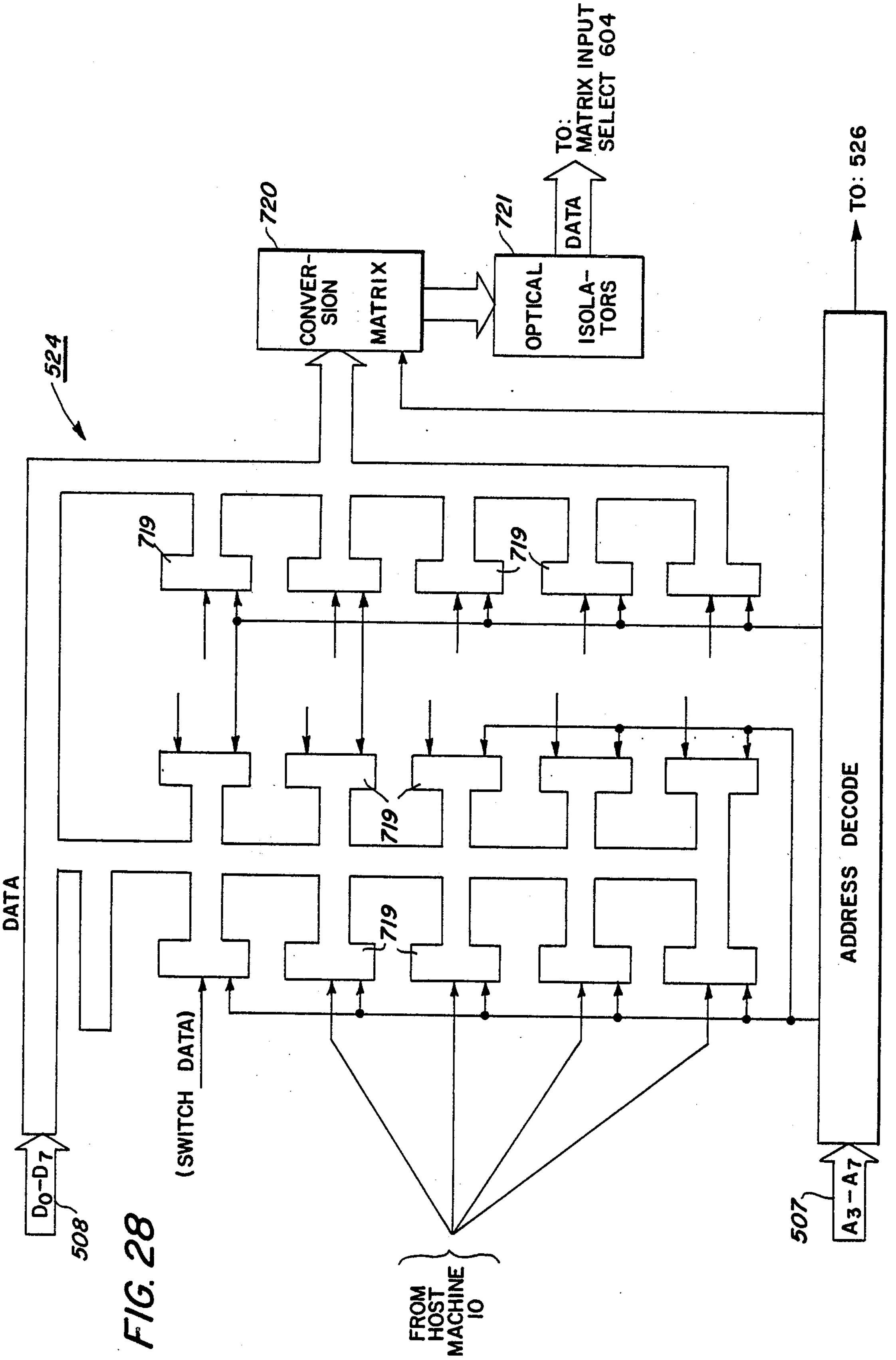
FIG. 28 is a block diagram of the main panel interface module.

Referring to FIG. 28, input matrix module 524 provides analog gates 719 for receiving data from the various host machine sensors and inputs (i.e. sheet sensors 135, 136; pressure sensor 157; etc), and data (SWITCH DATA) from the various switches on Console 800 (FRONT PANEL SWITCHES - FIG. 25) module 524 serving to convert the signal input to a byte oriented output for transmittal to I/O module 502 under control of Input Matrix Select 604 (FIG. 23*b*). The byte output to module 524 is selected by address information inputted on bus 507 and decoded on module 524. Conversion matrix 720, which may comprise a diode array, converts the input logic signals of "0" to logic "1" true. Data from input matrix module 524 is transmitted via optical isolators 721 to Input Matrix Select 604 of I/O module 502 (FIG. 23*b*). From there, the data is transmitted through Multiplexer 624 and buffers 620 to CPU Module 500.

Figure 29:
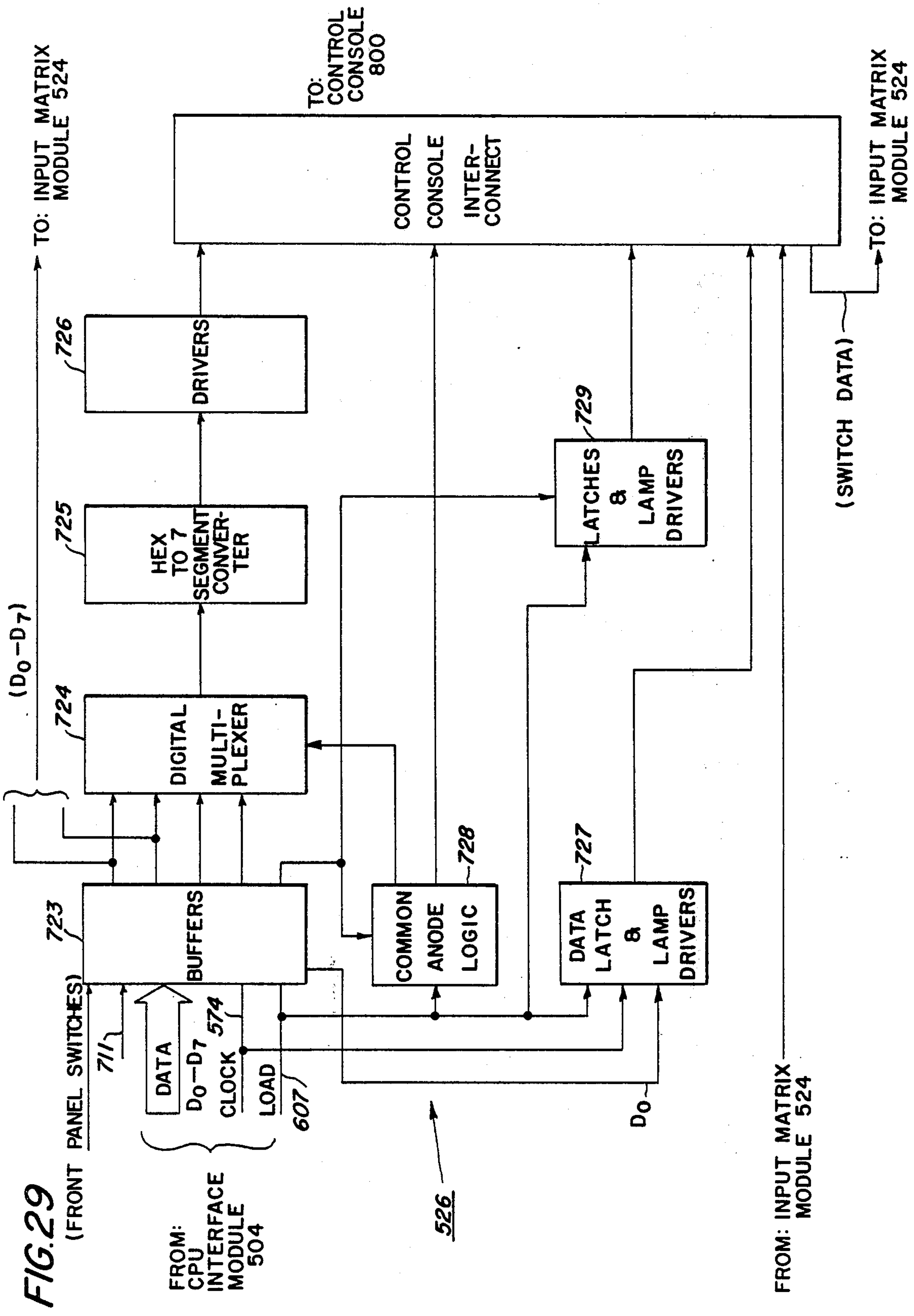
FIG. 29 is a block diagram of the input matrix module.

Referring particularly to FIG. 29, main panel interface module 526 serves as interface between CPU interface module 504 and operator control console 800 for display purposes and as interface between input matrix module 524 and the console switches. As described, data channels DO-D7 have data bits in each channel associated with the control console digital display or lamps. This data is clocked into buffer circuitry 723 and from there, for digital display, data in channels D1-D7 is inputted to multiplexer 724. Multiplexer 724 selectively multiplexes the data to HEX to 7 segment converter 725. Software controlled output drivers 726 are provided for each digit which enable the proper display digit in response to the data output of converter 725. This also provides blanking control for leading zero suppression or inter digit suppression.

Buffer circuitry 723 also enables through anode logic 728 the common digit anode drive. The signal (LOAD) to latch and lamp driver control circuit 729 regulates the length of the display cycle.

For console lamps 830, data in channel D0 is clocked to shift register 727 whose output is connected by drivers to the console lamps. Access by input matrix module 524 to the console switches and keyboard (FRONT PANEL SWITCHES) is through main panel interface module 526.

The machine output sections 530, 532, 534, 536, 538, 540 are inerfaced with I/O module 502 by CPU interface module 504. At each interrupt/refresh cycle, data is outputted to sections 530, 532, 534, 536, 538, 540 at the clock signal rate in line 574 over data channels D2, D3, D4, D5, D6, D7 respectively.

Figure 30:
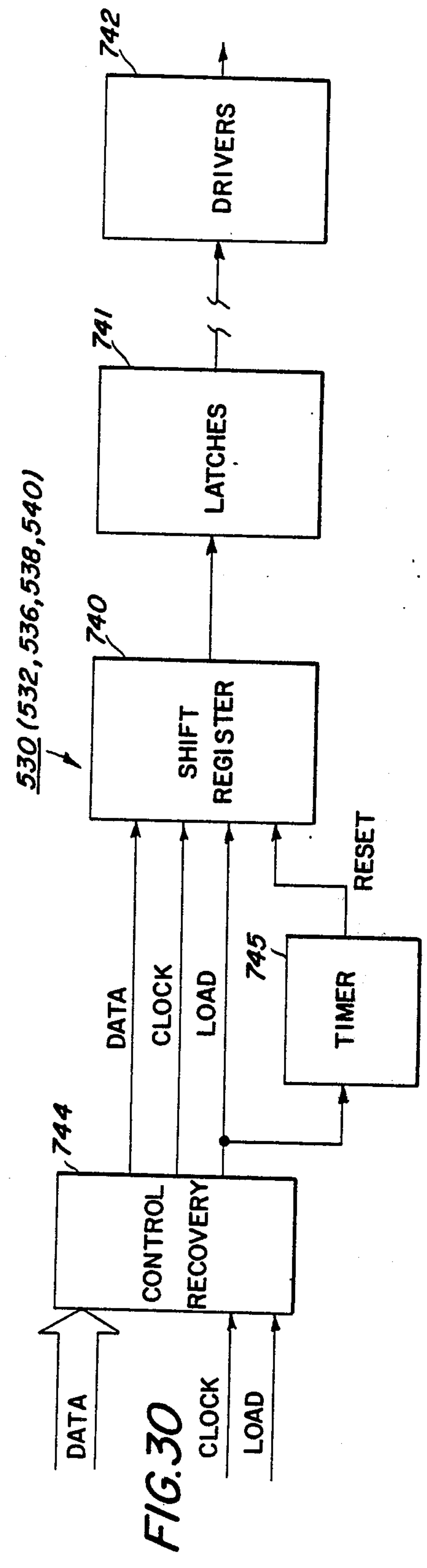
FIG. 30 is a block diagram of a typical remote.

Referring to FIG. 30, wherein a typical output section i.e. document handler section 530 is shown, data inputted to section 530 is stored in shift register/latch circuit combination 740, 741 pending output to the individual drivers 742 associated with each machine component. Preferably d.c. isolation between the output sections is maintained by the use of transformer coupled differential outputs and inputs for both data and clock signals and a shielded twisted conductor pair. Due to transformer coupling, the data must be restored to a d.c. waveform. For this purpose, control recovery circuitry 744, which may comprise an inverting/non-inverting digital comparator pair and output latch is provided.

The LOAD signal serves to lockout input of data to latches 741 while new data is being clocked into shift register 740. Removal of the LOAD signal enables commutation of the fresh data to latches 741. The LOAD signal also serves to start timer 745 which imposes a maximum time limit within which a refresh period (initiated by Refresh Control 605) must occur. If refresh does not occur within the prescribed time limit, timer 745 generates a signal (RESET) which sets shift register 740 to zero.

With the exception of sorter section 534 discussed below, output sections 532, 536, 538 and 540 are substantially identical to document handler section 530.

Figure 31:
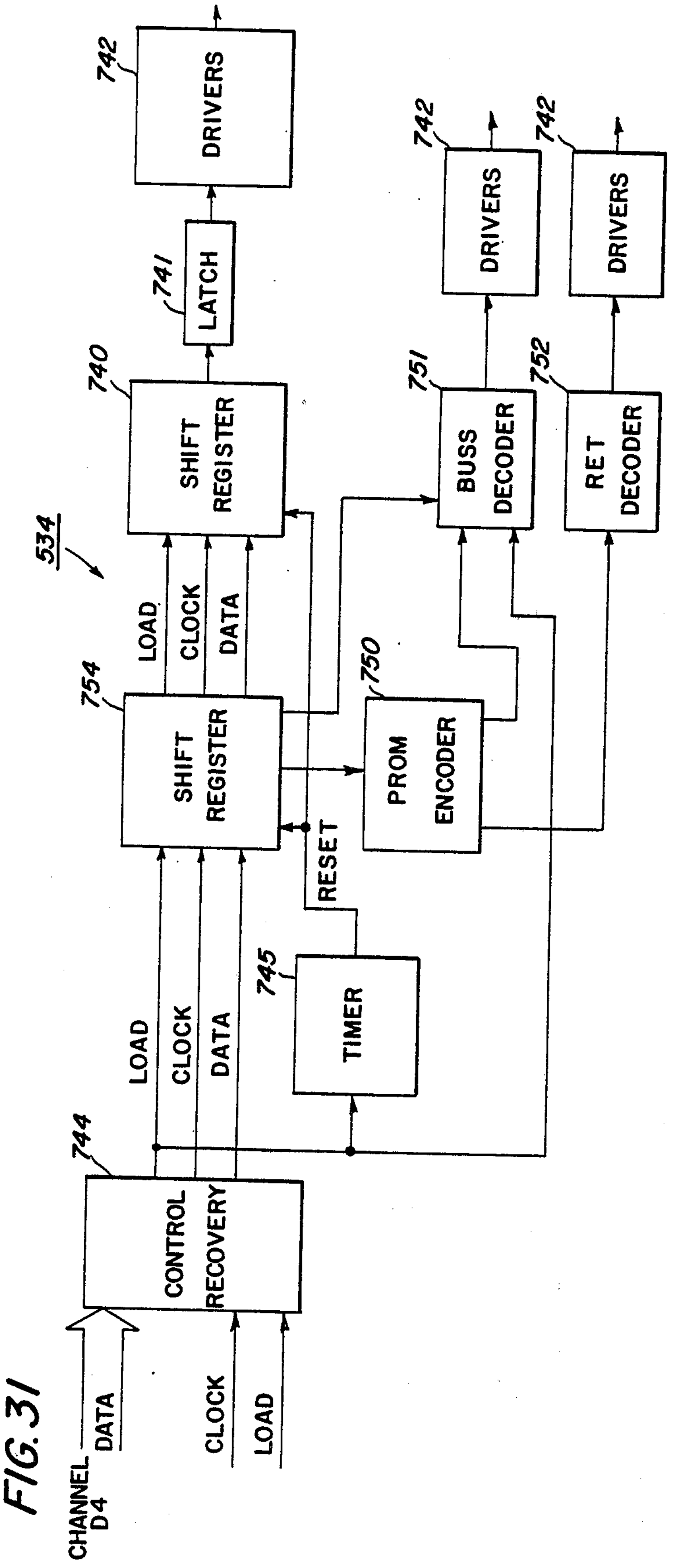
FIG. 31 is a block diagram of the sorter remote.

Referring to FIG. 31 wherein like numbers refer to like parts, to provide capacity for driving the sorter deflector solenoids 221, a decode matrix arrangement consisting of a Prom encoder 750 controlling bus decoder (BUS DECODER) 751, 752 (RET DECODER) is provided. The output of decoders 751, 752 drive the sorter solenoids 221 of upper and lower bin arrays 210, 211 respectively. Data is inputted to encoder 750 by means of shift register 754.

Figure 32:
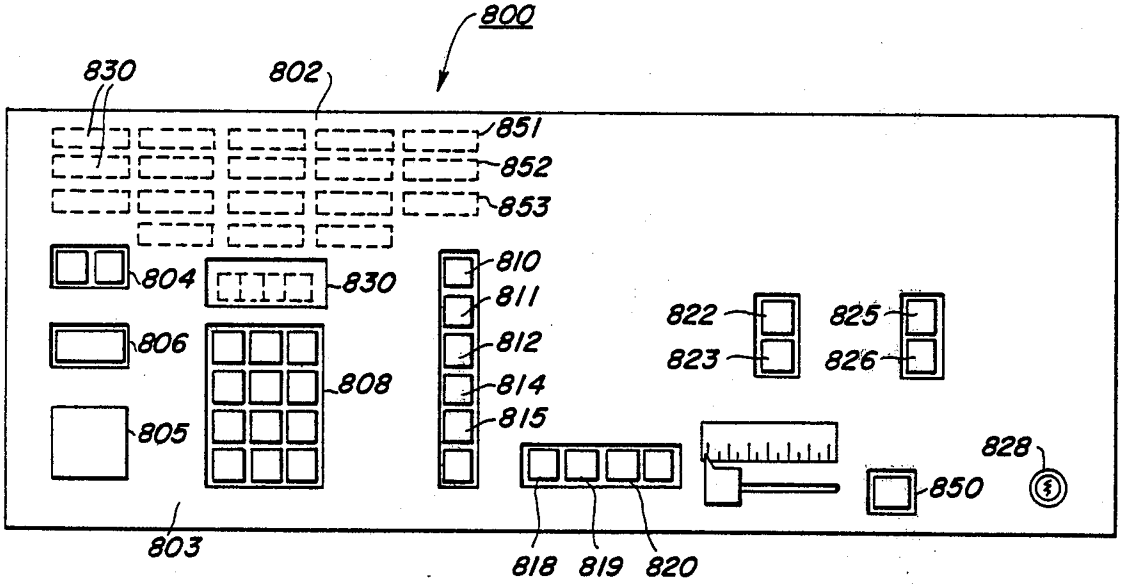
FIG. 32 is a view of the control console for inputting copy run instructions to the apparatus shown in FIG. 1.

Referring now to FIG. 32, control console 800 serves to enable the operator to program host machine 10 to perform the copy run or runs desired. At the same time, various indicators on console 800 reflect the operational condition of machine 10. Console 800 includes a bezel housing 802 suitably supported on host machine 10 at a convenient point with decorative front or face panel 803 on which the various machine programming buttons and indicators appear. Programming buttons include power on/off buttons 804, start print (PRINT) buttons 805, stop print (STOP) button 806 and keyboard copy quantity selector 808. A series of feature select buttons consisting of auxiliary paper tray button 810, two sided copy button 811, copy lighter button 814, and copy darker button 815, are provided.

Additionally, image size selector buttons 818, 819, 820; multiple or single document select buttons 822, 823 for operation of document handler 16; and sorter sets or stack buttons 825, 826 are provided. An on/off service selector 828 is also provided for activation during machine servicing.

Indicators comprise program display lamps 830 and displays such as READY, WAIT, SIDE 1, SIDE 2, ADD PAPER, CHECK STATUS PANEL, PRESS FAULT CODE, QUANTITY COMPLETED, CHECK DOORS, UNLOAD AUX TRAY, CHECK DOCUMENT PATH, CHECK PAPER PATH, JOB INCOMPLETE and UNLOAD SORTER. Other display information may be envisioned.

MACHINE OPERATION

As will appear, host machine 10 is conveniently divided into a number of operational states. The machine control program is divided into background routines and Foreground routines with operational control normally residing in the Background routine or routines appropriate to the particular machine state then in effect. The output buffer 546' of RAM memory section (DATA OUT) is used to transfer/refresh control data to the various remote locations in host machine 10, control data from both Background and Foreground routines being inputted to RAM memory section 546 for subsequent transmittal to host machine 10. Transmittal/refresh of control data presently in the output buffer DATA OUT of section 546 is effected through Direct Memory access (DMA) under the aegis of a Machine Clock interrupt routine.

Foreground routine control data which includes a Run Event Table built in response to the particular copy run or runs programmed, is transferred to output buffer DATA OUT of RAM section 546 by means of a multiple prioritized interrupt system wherein the Background routine in process is temporarily interrupted while fresh Foreground routine control data is inputted to the RAM output buffer following which the interrupted Background routine is resumed.

The operating program for host machine 10 is divided into a collection of foreground tasks, some of which are driven by the several interrupt routines and background or non-interrupt routines. Foreground tasks are the tasks that generally require frequent servicing, high speed response, or synchronization with the host machine 10. Background routines are related to the state of host machine 10, different background routines being performed with different machine states. A single background software control program (STCK) composed of specific sub-programs associated with the principal operating states of host machine 10 is provided. A byte called STATE contains a number indicative of the current operating state of host machine 10. The machine states are as follows:

| STATE NO. | MACHINE STATE | CONTROL SUBR. |
|---|---|---|
| 0 | Softward Initialize | INIT |
| 1 | System Not Ready | NRDY |
| 2 | System Ready | RDY |
| 3 | Print | PRINT |
| 4 | System Running, Not Print | RUNNPRT |
| 5 | Service | TECHREP |

Figure 33:
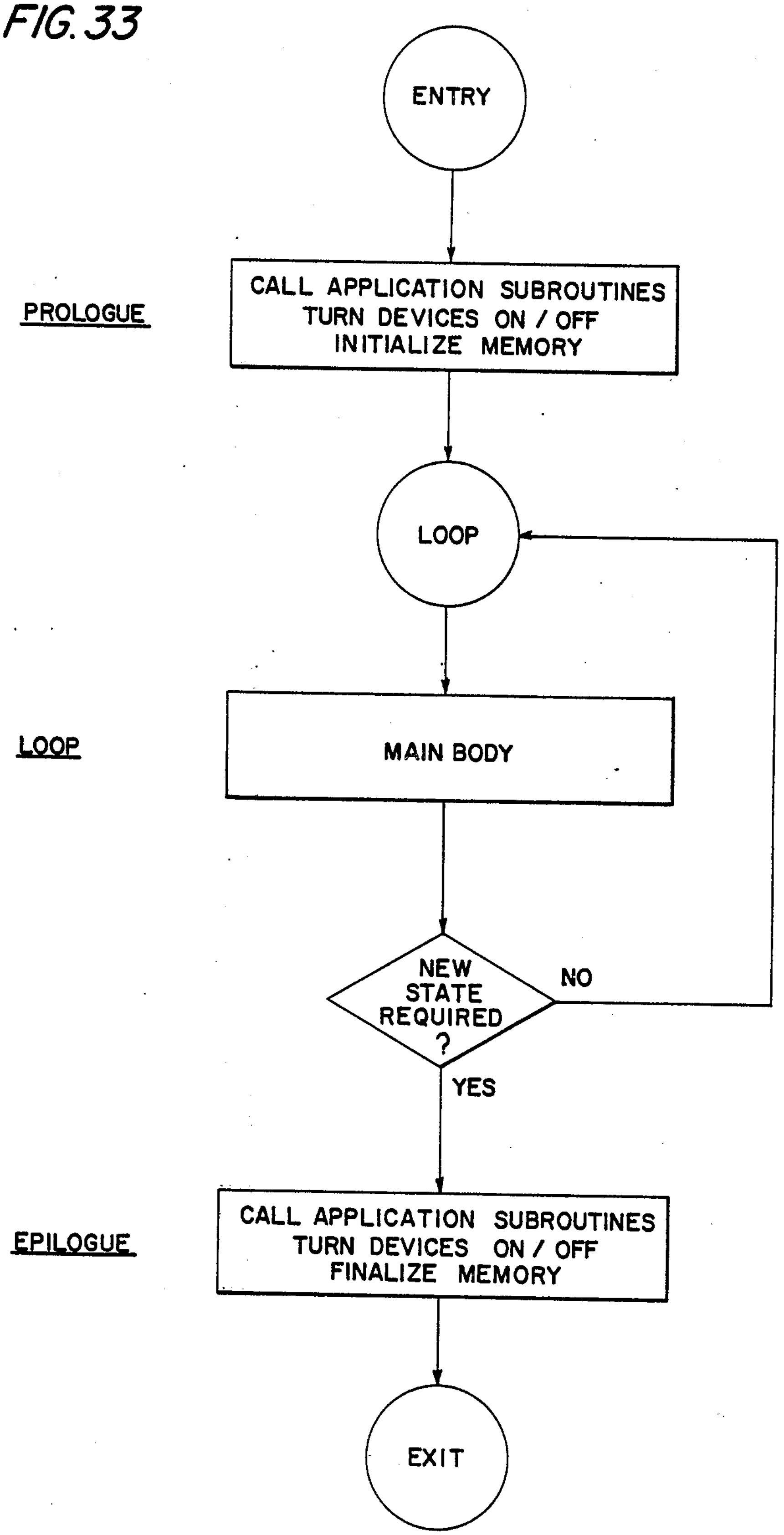
FIG. 33 is a flow chart illustrating a typical machine state.

Referring to FIG. 33, each STATE is normally divided into PROLOGUE, LOOP and EPILOGUE sections. As will be evident from the exemplary program STCK reproduced in TABLE I, entry into a given STATE (PROLOGUE) normally causes a group of operations to be performed, these consisting of operations that are performed once only at the entry into the STATE. For complex operations, a CALL is made to an applications subroutine therefor. Relatively simpler operations (i.e. turning devices on or off, clearing memory, presetting memory, etc.) are done directly.

Once the STATE PROLOGUE is completed, the main body (LOOP) is entered. The program (STCK) remains in this LOOP until a change of STATE request is received and honored. On a change of STATE request, the STATE EPILOGUE is entered wherein a group of operations are performed, following which the STATE moves into the PROLOGUE of the next STATE to be entered.

Figure 34:
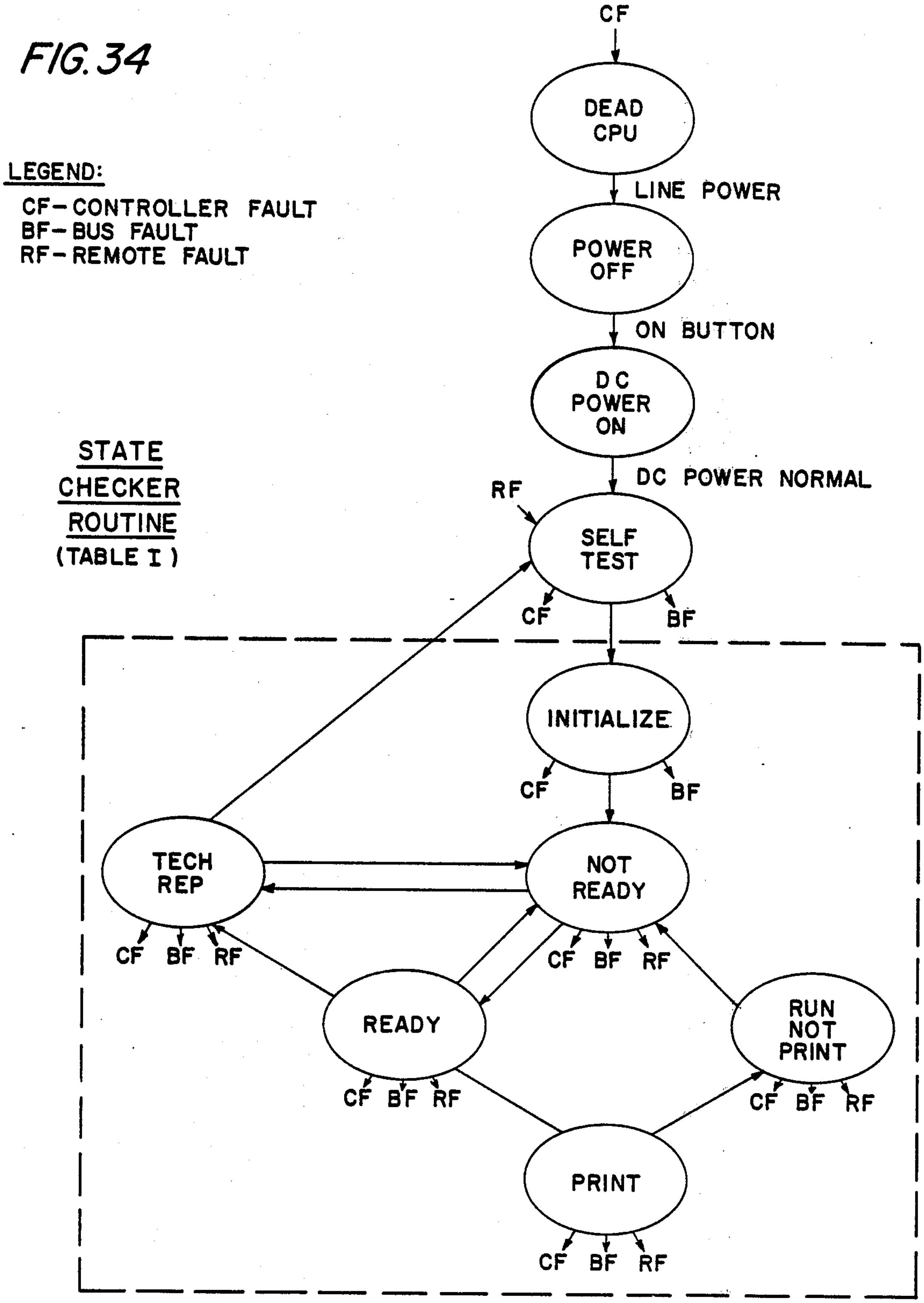
FIG. 34 is a flow chart of the machine state routine.

Referring to FIG. 34 and the exemplary program (STCK) in TABLE I. On actuation of the machine POWER-ON button 804 (FIG. 32), the software Initialize STATE (INIT) is entered. In this STATE, the controller is initialized and a software controlled self test subroutine is entered. If the self test of the controller is successfully passed, the System Not Ready STATE (NRDY) is entered. If not, a fault condition is signaled.

In the System Not Ready STATE (NRDY), background subroutines are entered. These include setting of Ready flags, control registers, timers, and the like; turning on power supplies, the fuser, etc., initializing the Fault Handler, checking for paper jams (left over from a previous run), door and cover interlocks, fuser temperatures, etc. During this period, the WAIT lamp on console 800 is lit and operation of host machine 10 precluded.

When all ready conditions have been checked and found acceptable, the controller moves to the system ready state (RDY). The READY lamp on console 800 is lit and final ready checks made. Host Machine 10 is now ready for operation upon completion of input of a copy run program, loading of one or more originals 2 into document handler 16 (if selected by the operator), and actuation of START PRINT button 805. As will appear hereinafter, the next state is PRINT wherein the particular copy run programmed is carried out.

While the machine is completing a copy run, the controller normally enters the Run Not Print state (RUNNPRT) where the controller calculates the number of copies delivered, resets various flags, stores certain machine event information in the memory, as well as generally conditioning the machine for another copy run, if desired. The controller then returns to the System Not Ready state (NRDY) to recheck for ready conditions prepatory for another copy run, with the same state sequence being repeated until the machine is turned off by actuation of POWER OFF button 804 or a malfunction inspired shutdown is triggered. The last state (TECH REP) is a machine servicing state wherein certain service routines are made available to the machine/repair personnel, i.e. Tech Reps.

Referring particularly to FIG. 32 and Tables II, III, IV, V, VI and VII, the machine operator uses control console 800 to program the machine for the copy run desired. Programming may be done during either the System Not Ready (NRDY) or System Ready (RDY) states, although the machine will not operate during the System Not ready state should START PRINT button 805 be pushed. The copy run includes selecting (using keyboard 808) the number of copies to be made, and such other ancillary program features as may be desired, i.e. use of auxiliary paper tray 102, (push button 810), image size selection (push buttons 818, 819, 820), document handler/sorter selection (push buttons 822, 823, 825, 826), copy density (push buttons 814, 815), duplex or two sided copy button 811, etc. On completion of the copy run program, START PRINT button 805 is actuated to start the copy run programmed (presuming the READY lamp is on and an original or originals 2 have been placed in tray 233 of document handler 16 if the document handler has been selected).

With programming of the copy run instructions, controller 18 enters a Digit Input routine in which the program information is transferred to RAM section 546. The copy run program data passes via Main Panel Interface Module 526 to Input Matrix Module 524 and from there is addressed through Matrix Input Select 604, Multiplexer 624, and Buffers 620 of I/O Module 502 to RAM section 546 of CPU Module 500.

On entering PRINT STATE, a Run Event Table (FIG. 35) comprised of Foreground tasks is built for operating in cooperation with the background tasks the various components of host machine 10 in an integrated manner to produce the copies programmed. The run Event Table is formed by controller 18 through merger of a Fixed Pitch Event Table (TABLE II) (stored in ROM 545 and Non Volatile Memory 610) and a Variable Pitch Event Table (TABLE III) in a fashion appropriate to the parameters of the job selected.

The Fixed Pitch Event Table (TABLE II) is comprised of machine events whose operational timing is fixed during each pitch cycle such as the timing of bias to transfer roll 75, (TRN 2 CURR), actuating toner concentration sensor 65 (ADC ACT), loading roll 161 of fuser 150 (FUS*LOAD), and so forth, irrespective of the particular copy run programmed. The Variable Pitch Table (TABLE III) is comprised of machine events whose operational timing varies with the individual copy run programmed, i.e. timing of pitch fadeout lamp 44 (FO*ONBSE) and timing of flash illumination lamps 37 (FLSH BSE). The variable Pitch Table is built by the Pitch Table Builder (TABLE IV) from the copy run information programmed in by controller 18 (using the machine control program stored in ROM section 545 and Non-Volatile Memory 610), coupled with event address information from ROM section 545, sorted by absolute clock count (via the routine shown in TABLE V), and stored in RAM section 546 (via the routine shown in TABLE VI). The Fixed Pitch Event Table and Variable Pitch Table are merged with the relative clock count differences between Pitch events calculated to form a Run Event Table (TABLE VII).

Figure 35:
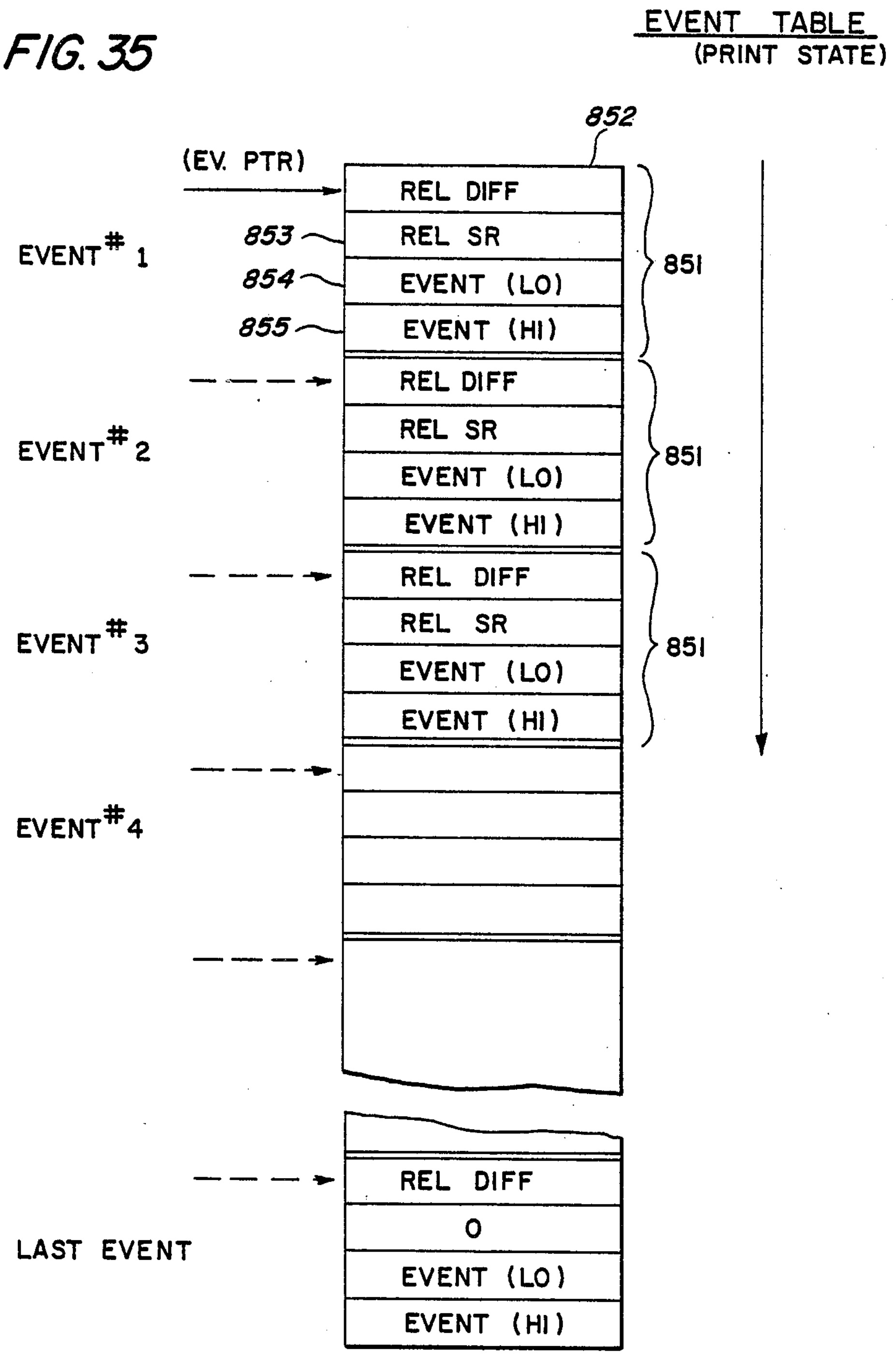
FIG. 35 is a view showing the event table layout.
Figure 36:
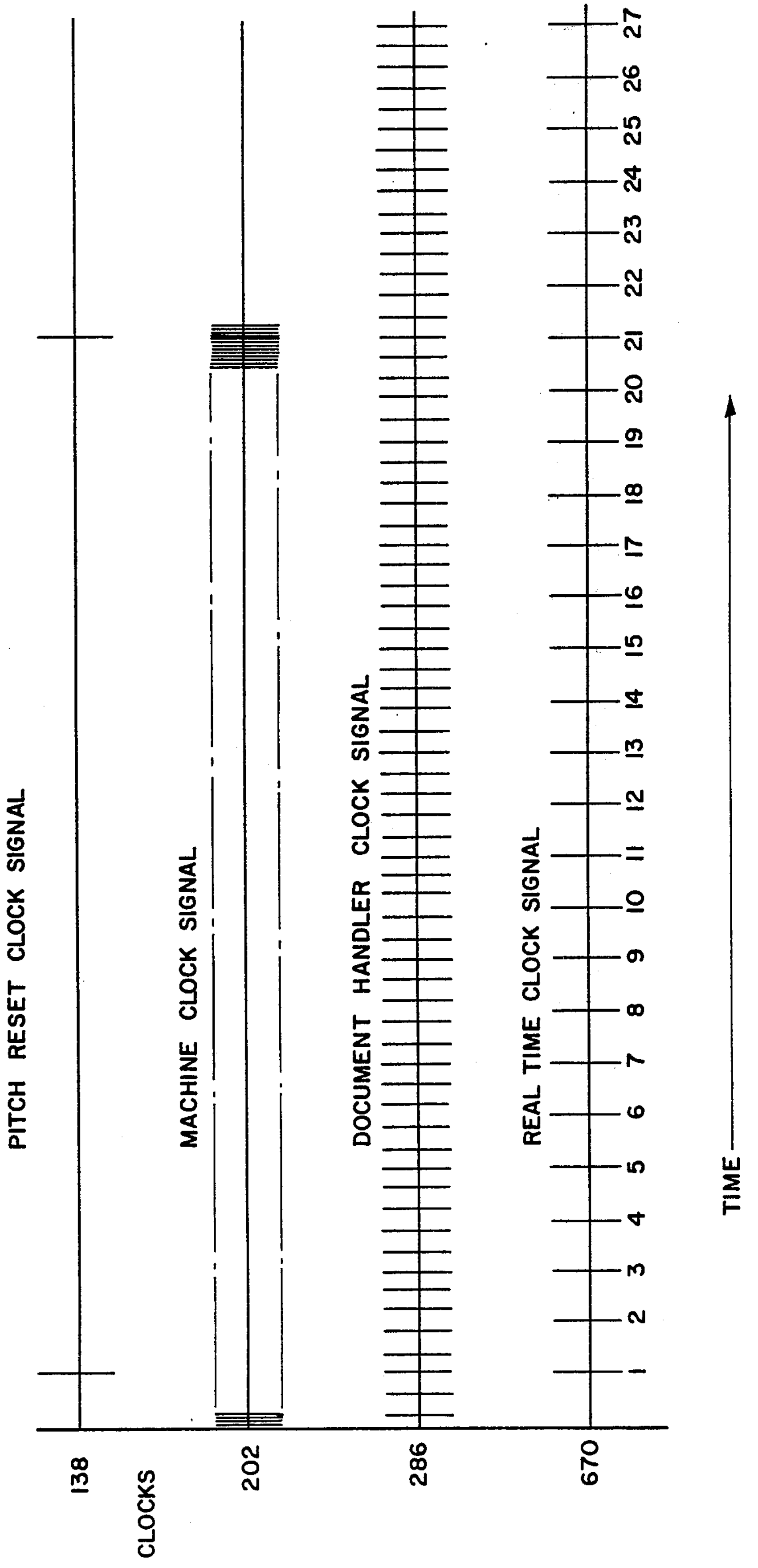
FIG. 36 is a chart illustrating the relative timing sequences of the clock interrupt pulses.
Figure 37:
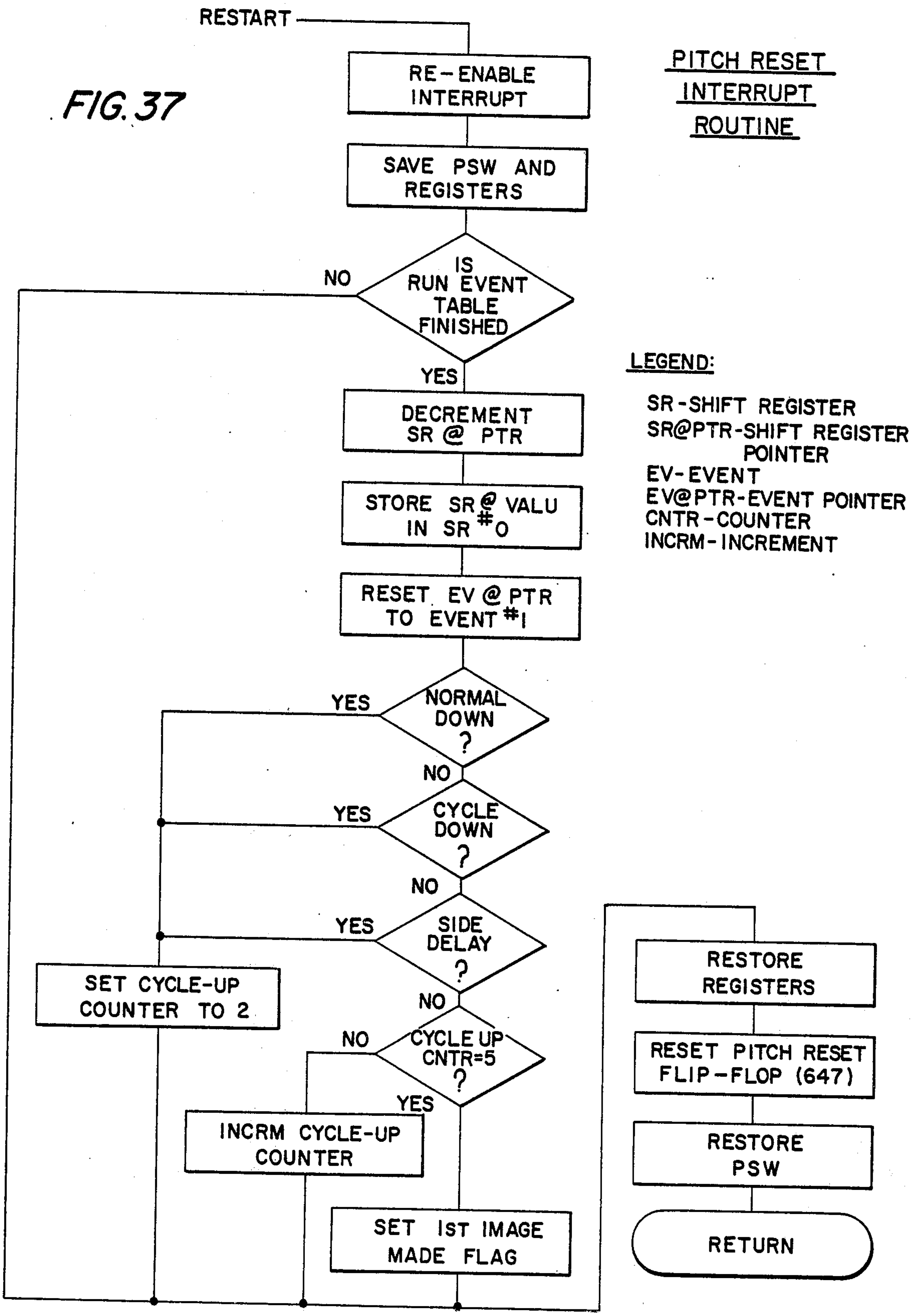
FIG. 37 is a flow charge of the pitch interrupt routine.

Referring particularly to FIG. 35, the Run Event Table consists of successive groups of individual events 851. Each event 851 is comprised of four data blocks, data block 852 containing the number of clock pulses (from machine clock 202) to the next scheduled pitch event (REL DIFF), data block 853 containing the shift register position associated with the event (REL SR), and data blocks 854, 855 (EVENT LO) (EVENT HI) containing the address of the event subroutine.

In machine states other than PRINT, data blocks 852, 853 (REL DIFF) (REL SR) are set to zero. Data blocks 854, 855 hold the address information for the Non-Print state event.

Control Data in the Run Event Table represents a portion of the foreground tasks and is transferred to the output buffer 546' of RAM memory section 546 by the Pitch Reset and Machine Clock interrupt routines. Other control data, representing foreground tasks not in the Run Event Table is transferred to RAM output buffer 546' by the Real Time Clock interrupt routine. Transfer of the remainder of the control data to output buffer 546' is by means of background (non-interrupt) routines.

Transfer of control data from output buffer 546' of RAM memory section 546 to the various locations in host machine 10 is through output Refresh via Direct Memory access (DMA) in response to machine clock interrupt signals as will appear. The interrupt routines are initiated by the respective interrupt signals.

Referring particularly to FIGS. 23 and 35–37 and TABLES VII, VIII the interrupt having the highest priority, the Pitch Reset interrupt (signal 640), is operable only during the PRINT state, and occurs once each revolution of sheet register fingers 141 as responded to by sensor 146 of pitch reset clock 138. At each pitch reset interrupt signal, after a determination of priority by Priority Chip 659 in the event of multiple interrupt signals, an interrupt signal (INT) is generated. The acknowledgement signal (INTA) from processor 542 initiates the pitch reset interrupt routine.

On entering the pitch reset routine, the interrupt is re-enabled and the contents of the program working registers stored. A check is made to determine if building of the Run Event Table is finished. Also checks are made to insure that a new shift register schedules have been built and at least 910 clock counts since the last pitch reset have elapsed. If not, an immediate machine shutdown is initiated.

Presuming that the above checks are satisfactory, the shift register pointer (SR PTR), which is the byte variable containing the address of a pre-selected shift register position (SR O), is decremented by one and adjusted for overflow and the shift register contents are updated with a byte variable (SR+VALUV) containing the new shift register value to be shifted in following the pitch reset interrupt. The event pointer (EV*PTR), a two byte variable containing the full address of the next scheduled event, is reset to Event #1. The count in the C resister equals the time to the first event.

Machine Cycle Down, Normal Down, and Side One Delay checks are made, and if negative, the count on a cycle up counter (CYC UP CT) is checked. If the count is less than a predetermined control count (i.e. 5), the counter (CYC UP CT) is incremented by one. When the count on the cycle up counter equals the control count, an Image Made Flag is set.

If a Normal Down, Cycle Down, or Side One Delay has been initiated, the cycle up counter (CYC UP CT) is reset to a preset starting count (i.e. 2). The pitch reset interrupt routine is exited with restoration of the working registers and resetting of pitch reset flip flop 647.

The Machine Clock Interrupt routine, which is second in priority, is operative in all operational states of host machine 10. Although nominally driven by machine clock 202, which is operative only during Print state when processor main drive motor 34 is energized, machine clock pulses are also provided by phase locked loop 649 when motor 34 is stopped.

Figure 38:
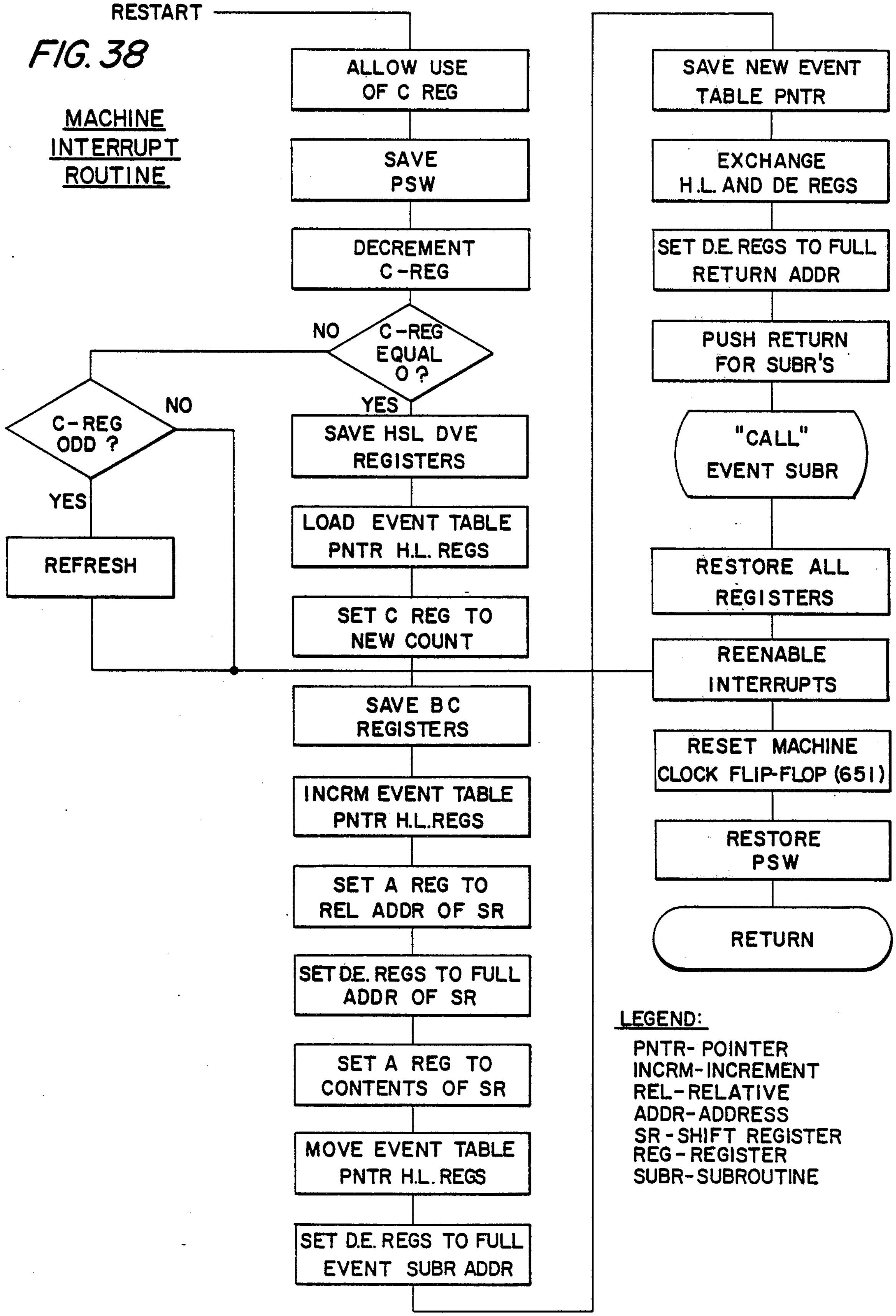
FIG. 38 is a flow chart of the machine clock interrupt routine.

Referring particularly to FIG. 38 and TABLE IX, entry to the Machine Clock interrupt routine there shown is by a signal (INTA) from processor 542 following a machine clock interrupt signal 642 as described earlier. On entry, the event control register (C REG) is obtained and the working register contents stored. The C REG is decremented by one, the register having been previously set to a count corresponding to the next event in the Event Run Table.

The control register (C REG) is checked for zero. If the count is not zero and is an odd number, an output refresh cycle is initiated to effect transfer/refresh of data in RAM output buffer 546' to host machine 10. If the number is even, or following an output refresh, the interrupt system is re-enabled, the machine clock interrupt flip flop 651 is reset and the working registers are restored. Return is then made to the interrupted routine.

If the control register (C REG) count is zero, the Event Pointer (EV*PTR), which identifies the clock count (in data block 852) for the next scheduled event (REL DIFF), is loaded and the control register (C REG) reset to a new count equal to the time to the next event. The Event Pointer (EV*PTR) is incremented to the relative shift register address for the event (REL SR, data block 853), and the shift register address information is set in appropriate shift registers (B, D, E, A registers).

The event Pointer (EV*PTR) is incremented successively to the event subroutine address information (EVENT LO) (EVENT HI) in the Event Run Table, and the address information therefrom loaded into a register pair (D & E registers). The Event Pointer (EV PTR) is incremented to the first data block (REL DIFF) of the next succeeding event in the Run Event Table, saved, and the register pair (H & L registers) that comprise the Event Pointer are loaded with the event subroutine address from the register pair (D & E registers) holding the information. The register pair (D & E registers) are set to the return address for the Event Subroutine. Using the address information, the Event Subroutine is called and the subroutine data transferred to RAM output buffer 546' for transfer to the host machine on the next Output Refresh.

Following this, the Machine Clock interrupt routine is exited as described earlier.

The Output Refresh cycle alluded to earlier functions, when entered, to transfer/refresh data from the output buffer of 546' RAM section 546 to host machine 10. Direct Memory Access (DMA) is used to insure a high data transfer rate.

On a refresh, Refresh Control 605 (see FIG. 23) raises the HOLD line to processor 542, which on completion of the operation then in progress, acknowledges by a HOLD A signal. With processor 542 in a hold mode and Address and Data buses 507, 508 released to I/O Module 502 (through operation of tri-state buffers 510, 511, 563, 570), the I/O module then sequentially accesses the output buffer 546' of RAM section 546 and transfers the contents thereof to host machine 10. Data previously transferred is refreshed.

The Real Time Interrupt, which carries the lowest priority, is active in all machine states. Primarily, the interrupt acts as an interval timer by decrementing a series of timers which in turn serve to control initiation of specialized subroutines used for control and error checking purposes.

Figure 39A:
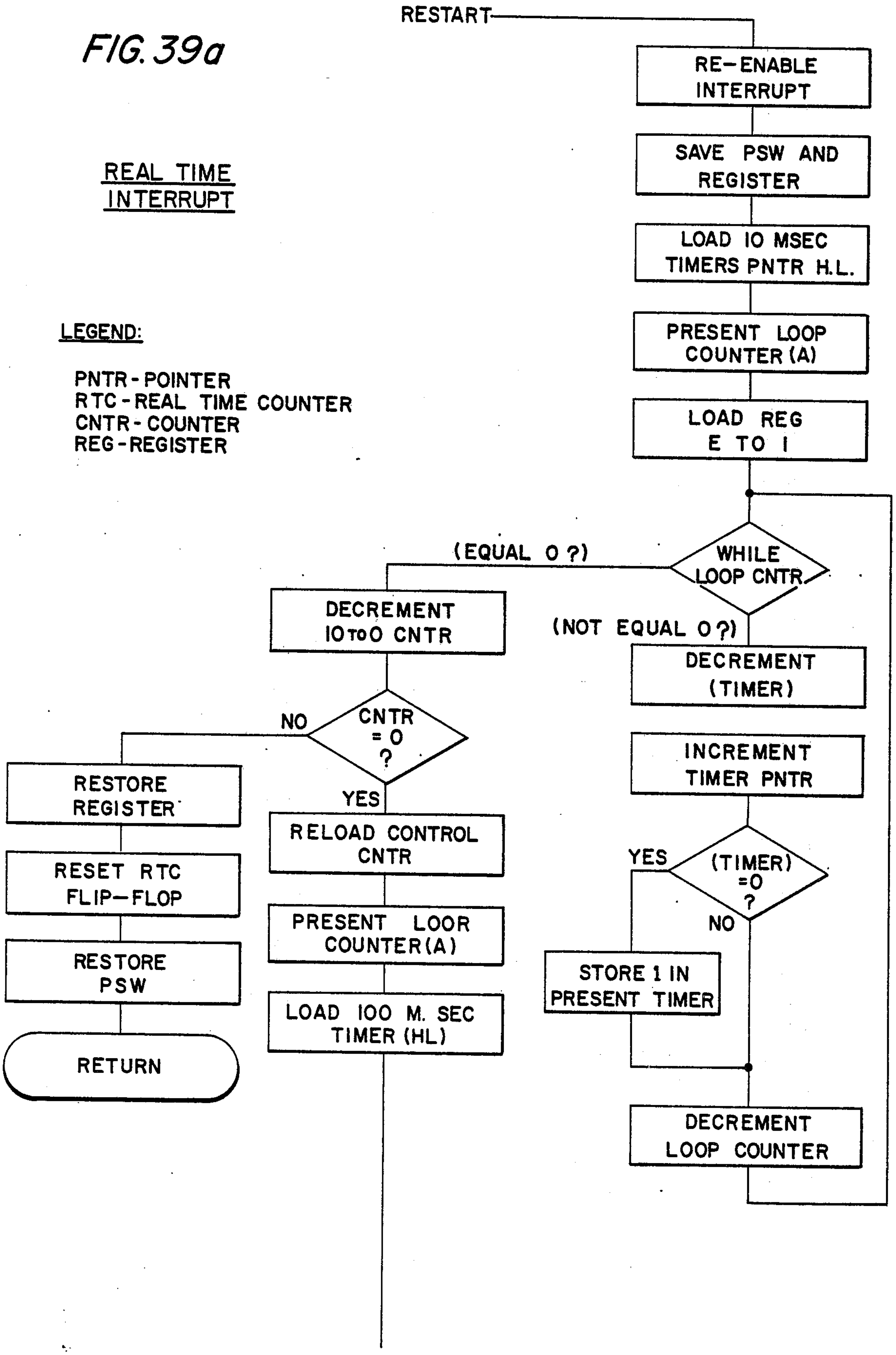
FIGS. 39*a* and 39*b* comprise a flow chart of the real time interrupt routines.
Figure 39B:
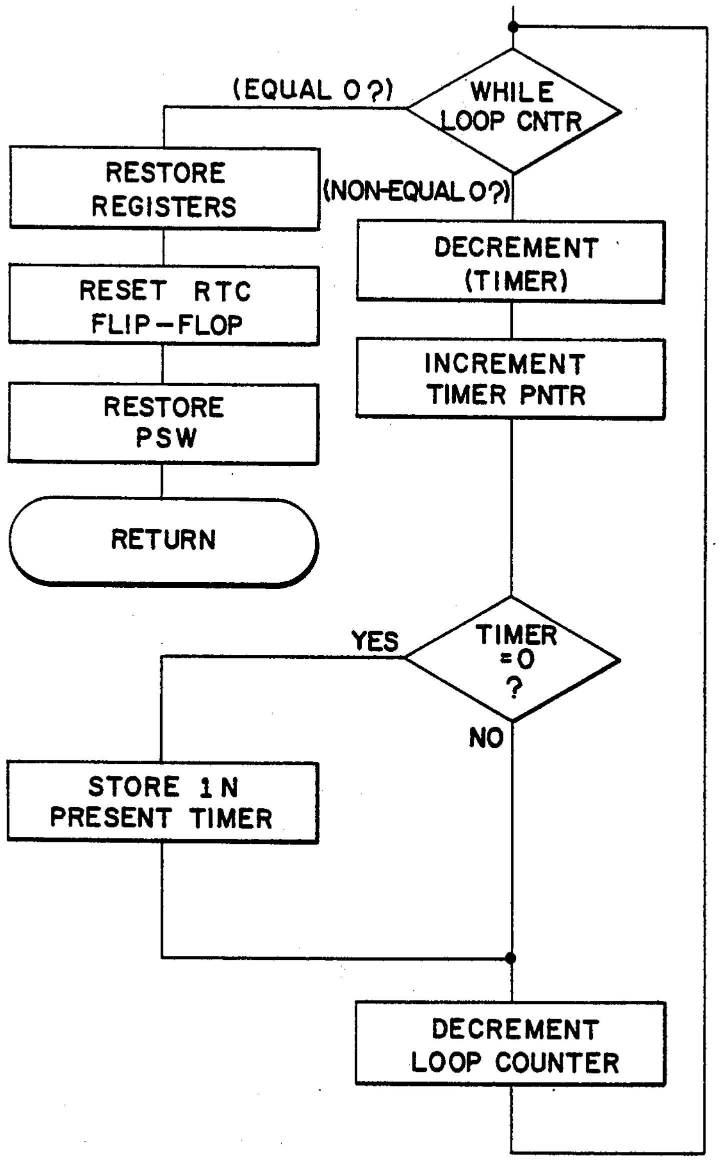

Referring particularly to FIG. 39 and TABLE X, the Real Time interrupt routine is entered in the same manner as the interrupt routines previously described, entry being in response to a specific RESTART instruction code assigned to the Real Time interrupt. On entry, the interrupt is re-enabled and the register contents stored. The timer pointer (PNTR) for the first class of timers (i.e. 10 msec TIMERS) is loaded, and a loop counter identifying the number of timers of this class (i.e. 10 msec TIMERS) preset. A control register (E REG) is loaded and a timer decrementing loop is entered for the first timer. The loop decrements the particular timer, increments the timer pointer (PNTR) to the location of the next timer in this class, checks the timer count, and decrements the loop counter. The decrementing loop routine is repeated for each timer in the class (i.e. 10 msec TIMERS) following which a control counter (CNTR) for the second group of timers (i.e. 100 msec TIMERS) is decremented by one and the count checked.

The control counter (CNTR) is initially set to a count equal to the number of times the first timer interval is divisible into the second timer interval. For example, if the first class of timers are 10 msec timers and the second timer class are 100 msec timers, the control counter (CNTR) is set at 10 initially and decremented on each Real Time interrupt by one down to zero.

If the count on the control counter (CNTR) is not zero, the registers are restored, Real Time interrupt flip flop 856 reset, and the routine exited. If the count on the control counter is zero, the counter is reloaded to the original maximum count (i.e. 10) and a loop is entered decrementing individually the second group of timers (i.e. 100 msec TIMERS). On completion, the routine is exited as described previously.

In the following TABLES:

"at " - is used to indicate flags, counters and subroutine names.

"#" - is used to indicate input signals.

"$" - is used to indicate output signals.

":" - is used to indicate macro instructions, system subroutines, system flags, and data, etc.

For further explanation of the mnemonics and particular instructions utilized by the following routines, the reader is directed to Intel Corporation's Programming Manual for the 8080 Microcomputer System.

TABLE I

```
                                  *NAR
                                  *
                                  *       I N I T I A L I Z E    S T A T E
                                  *
                                  *       INIT: SUBROUTINE
                                  *
                                  *       INITIALIZE STATE- EXECUTED AFTER EACH START OR RESTART.  SETS
                                  *       ALL POINTERS, FLAGS, AND DATA TO INITIAL VALUES REQUIRED TO
                                  *       START EXECUTION OF ANY CONTROL ALGORITHIMS.  ALWAYS EXITS TO
                                  *       'NOT READY' STATE.

                                  *       EPILOG

05 00000    3E0A      A    INIT:  MVI      A,10
05 00002    3252FD    N           STA      DIVD:10                    INITIALIZE TO 10
05 00005    3285FC    N           STA      SLOWTOGL                   INITIALIZE TO 10
05 00008    211907    N           LXI      H,EV&STBY:                 H&L= ADDR OF STBY EVENT TABLE
05 0000B    2264FD    N           SHLD     EV@PTR:                    SAVE FOR MACH CLK ROUTINE
05 0000E    21FFFF    A           LXI      H,X'FFFF'                  INIT INSTRUMENTATION REMOTE
05 00011    2272FB    N           SHLD     INS@PTRR                     ADDR PNTR TO END OF RAM
05 00014    21FFFF    N           LXI      H,ADHORAMT-1               SET PNTR TO RAM CNTRL TABLE
```

```
05 00017   2278FB   N          SHLD     TAB8STRT                       SAVE PNTR
05 0001A   3E7F     A          MVI      A,X'7F'                        INIT TO UN-BYPASS
05 0001C   328DFC   N          STA      JAM8BYPS                                          ALL JAM SWS
                           *
                           *   TIMER INITIALIZATION
                           *   MUST BE DONE BEFORE ANY TIMERS CAN BE USED
                           *
05 0001F   211FF9   A          LXI      H,AVAIL1**8+X'1F'              SET H&L TO END OF AVAIL1 TABLE
05 00022   36FF     A          MVI      H,X'FF'                        STORE X'FF' IN LAST TABLE ADDR
05 00024   3E1F     A          MVI      A,31                           SET A-REG TO VALUE TO BE STORED
                               REPEAT
05 00026   2D       A             DCR      L                           STEP TO NEXT TABLE LOCATION
05 00027   77       A             MOV      M,A                         STORE INITIALIZATION VALUE
05 00028   3D       A             DCR      A                           STEP TO NEXT VALUE
05 00029   C22600   N          UNTIL:   CC,Z,S                         IS INITIALIZATION COMPLETE
05 0002C   2120FE   A          LXI      H,ADR(DATA,TIME1OUT)           TO INITIALIZE TIME1OUT TABLE
05 0002F   225FFD   N          SHLD     INPTR1                          SET IN/OUT POINTERS TO
05 00032   2261FD   N          SHLD     OUTPTR1                         BEGINNING OF TIME1OUT TABLE
                           *
                           *   INITIALIZE SPOOL
                           *   POINTERS
                           *
05 00035   2140FE   A          LXI      H,ADR(DATA,SPL1TBL)            SET PNTRS
05 00038   226AFD   N          SHLD     SPL1IN                                       TO START
05 0003B   226CFD   N          SHLD     SPL1OUT                                                 OF TABLE
                           *
                           *   CHECK IF PAPER WAS PRESENT WHEN POWER WENT DOWN
                           *
05 0003E   3AC9E2   A          RNVNIB   NV8JAM8N                       A = JAM INFO FROM POWER DOWN
05 00041   0F       A          RRC                                     SET CARRY TO FOR JAM INFO
05 00042   D25A00   N          IF1      CC,C,S                         WAS THERE PAPER IN FOR AREA
05 00045   47       A             MOV      B,A                         YES, SAVE JAM INFO
05 00046   213CFD   A             SFBIT,P  FDR8AJAM,FDR8MJAM           SET FEEDER JAMS
05 00049   3E0C     A
05 0004B   B6       A
05 0004C   77       A
05 0004D   2121F9   A             SFBIT,P  ON8X82,ON8X83               SIGNAL TRANSPT CL'RANCE REQ'D
05 00050   3E03     A
05 00052   B6       A
05 00053   77       A
05 00054   3E80     A             SFLG     CLP8REQD                    TELL FLT HNDLR CLEARANCE REQD
05 00056   3267F4   A
05 00059   78       A             MOV      A,B                         RESTORE THE A-REG
                               ENDIF
05 0005A   0F       A          RRC                                     SET CARRY TO IMEDBON1
05 0005B   D27100   N          IF1      CC,C,S                         WAS THERE AN IMED8ON1
                           *
                                  MVI      L,MSK(FBIT,L8PR8FLT,JAM28FLT,JAM38FLT,JAM48FLT,;
05 0005E   2EFF     A                      JAM58FLT,JAM68FLT,RET18FLT,RET28FLT)
                           *                                           SETS ALL JAM FBITS IN REG-L
05 00060   2603     A             MVI      H,MSK(FBIT,S8S8JAM,MISSTRIP)
                           *                                           SETS ADDITIONAL FBITS IN H
05 00062   223BFD   A             SHLD     ADR(FBYT,PAP11)             MOVE FBITS INTO FBYTES
05 00065   3E80     A             SFLG     CLR8REQD                    TELL FLT HNDLR CLEARANCE REQD
05 00067   3267F4   A
05 0006A   2120F9   A             SFBIT,P  TS8FUS,TS8X82               TURN ON UNDEDICATED MAP LAMPS
05 0006D   3E21     A
05 0006F   B6       A
05 00070   77       A
                               ENDIF
                               IF1      XBYT,A,AND,;                   IS EITHER SRT JAM FLAG SET
05 00071   E60C     A                   MSK(NVBIT,NV8LOW8J,NV8UP8J),NZ ' IN NVNIB
05 00073   CA8A00   N
                                  IF1      XBYT,A,EQ,;                 YES, ARE BOTH SET
05 00076   FE0C     A                      MSK(NVBIT,NV8LOW8J,NV8UP8J)
05 00078   C28300   N
05 0007B   3E80     A                SFLG     TWO8ACT                  TELL SRT THAT THERE WAS A JAM
05 0007D   3261F4   A
05 00080   C38700   N             ELSE1
05 00083   0F       A                RRC                               GET NV8LOW8J TO SIGN BIT &
                                     ID1READ  NV8LOW8J
05 00084   3237F4   A                MODFLG   LOW8MOD                  TELL SRT IF UP OR LOW JAM
                                  ENDIF
05 00087   CD0000   N             CALL     JAM8SET                     LET SRT SET JAM FLAGS & LAMPS
                               ENDIF
05 0008A   3E80     A          SFLG     SRT8RDY                        SIGNAL SRT NOT IN USE (READY)
05 0008C   328CF7   A
05 0008F   3287F7   A          MODFLG   PROG8RDY                       SET PROG ROUTINE READY
05 00092   3268F4   A          MODFLG   2SD8ENAB                       ALLOW SELECTION OF DUPLEX MODE
05 00095   3EF2     A          MVI      A,X'F2'                        RE-ENABLE
05 00097   3200E6   A          STA      RSINTFF1                                   INTERRUPT
05 0009A   FB       A          EI                                                                SYSTEM
05 0009B   CD0000   N          SOBIT,S  NPF0*ON,24V*SPL                PF0 OFF (INVT'D) & 24V ON
05 0009E   02       A
05 0009F   E480     A
05 000A1   EE80     A
05 000A3   CD0000   N          STIMR    FLT8DLY,25000,FLT8CHK          START LENS FAULT TIMER
05 000A6   12       A
05 000A7   FA       A
05 000A8   0000     N
05 000AA   CD0000   N          CALL     DOC8CLP                        INITIALIZE DOC8NUM TO 1    (1)
05 000AD   327AFC   N          STA      QF8DIGIT                       ENABLE '0' IN QTY FLASHED  (2)
05 000B0   3E08     A          MVI      A,MSK(FBIT,P8P8RS)             TELL FLT ASSUME
05 000B2   3286FC   N          STA      XP8PREV                                          BRUSH HOUSE OPN
05 000B5   3E02     A          MVI      A,1NRDY                        INIT STCK
05 000B7   3254FD   N          STA      1STATE1                                  SYNCRONIZED BACKGROUND
05 000BA   3253FD   N          STA      STATE1                                                 CONTROL LOOP
05 000BD   CD3702   N          CALL     NRDY1PRL                       INIT CONTROL TO NOT-READY STATE
```

```
                                ***********************************************************************************
                                *                                                                                 *
                                *  S Y C R O N I Z E D   B A C K G R O U N D   C O N T R O L   L O O P S          *
                                *                                                                                 *
                                ***********************************************************************************

                                *      PRIORTIES:
                                *              FIRST     10MS TIME OUT REQUESTS
                                *              SECOND    10MS CALLS
                                *              THIRD     SPOOLED CALLS
                                *              FOURTH    20MS CALLS
                                *              FIFTH     100MS CALLS
                                *              SIXTH     100MS TIME OUT REQUESTS

05 000C0   2151FD   A          LXI     H,ADR(DATA,SB:RQST)        SET MEM PNTR TO SB BYTE
                               REPEAT                             LOOP-3 FROM HLT ON ALL INTER'S
                                  REPEAT                          LOOP-2 BACK AFTER EACH 100MS
                                     REPEAT                       LOOP-1 BACK AFTER EACH 20MS
05 000C3   7E       A                   MOV     A,M               A= SYNC BKGND REQUESTS FROM RTC
                                        ID:READ   SB:RQST
05 000C4   07       A                   RLC                       TEST FOR 10MS
05 000C5   D2F700   N                   IF:       CC,C,S                       SB REQUEST
                                *
                                *                                 TIMER SERVICE REQUESTS
                                *                                  CALLS TIMED OUT TIMER SUBRS
                                *                                  USING WRAP ARROUND TABLE AND
                                *                                  IN/OUT PNTRS - RTCI SETS
                                *                                  INPTR: & ENTERS CALL ADDR
                                *
05 000C8   3A5FFD   N                     WHILE:   XBYT,INPTR:,NE,OUTPTR: ARE PNTRS AT SAME TABL
05 000CB   2161FD   N
05 000CE   BE       A
05 000CF   CAE500   N
05 000D2   6E       A                        MOV      L,M      SET L-REG TO ADDR(L) IN TABLE
05 000D3   26FE     A                        MVI      H,HADR(DATA,TIME:OUT) MEM PNTR NOW SET TO
05 000D5   5E       A                        MOV      E,M          MOVE CALL ADDR(L) TO E
05 000D6   23       A                        INX      H             STEP TO NEXT TABLE BYTE
05 000D7   56       A                        MOV      D,M          MOVE CALL ADDR(H) TO D
05 000D8   23       A                        INX      H             STEP TO NEXT TABLE BYTE
05 000D9   7D       A                        MOV      A,L      PREPARE TO UPDATE PNTR
                                             ID:READ  TIME:OUT DYNAMIC TABLE CONTAINING ADDRS
                                             MODBYT   A,AND,)  ADJUST FOR END OF TABLE
05 000DA   E62F     A                                 TIME:MSK
05 000DC   3261FD   A                        STA      ADR(DATA,OUTPTR:) PNTR TO ADDR OF LAST SE
05 000DF   CD0000   N                        CALL     DE:IND   DO TIMEOUT CALL
05 000E2   C3C800   N                     ENDWHILE             YES, ALL TIME OUTS SERVICED
                                *                                 END TIMER SECTION
05 000E5   2A55FD   N                     LHLD     10:CALLS    GET PROPER 10MS CALL TABLE
05 000E8   CDC000   N                     CALL     HL:IND      DO 10MS CALLS
05 000EB   2151FD   A                     LXI      H,ADR(DATA,SB:RQST) SET MEM PNTR TO SB BYTE
05 000EE   F3       A                     DI
05 000EF   7E       A                     MODBYT   M,AND, 10:RQST REMOVE 10MS REQUEST
05 000F0   E67F     A
05 000F2   77       A
                                          ID:ALTR  SB:RQST
05 000F3   FB       A                     EI                              (WATCH OUT FOR UNPRINTABLE NOT)
05 000F4   C31501   N                  ELSE:                           DO ANY SPOOLED ROUTINES
05 000F7   3A6AFD   N                     IF:      XBYT,SPL:IN,NE,SPL:OUT
05 000FA   216CFD   N
05 000FD   BE       A
05 000FE   CA1101   N
05 00101   6E       A                        MOV      L,M
05 00102   26FE     A                        MVI      H,HADR(DATA,SPL:TBL)
05 00104   5E       A                        MOV      E,M
05 00105   23       A                        INX      H
05 00106   56       A                        MOV      D,M
05 00107   23       A                        INX      H
05 00108   7D       A                        MOV      A,L
05 00109   E64F     A                        MODBYT   A,AND,SPL:MSK
05 0010B   326CFD   A                        STA      ADR(DATA,SPL:OUT)
05 0010E   CD0000   N                        CALL     DE:IND
                                          ENDIF
05 00111   2151FD   A                     LXI      H,ADR(DATA,SB:RQST)
05 00114   7E       A                     MOV      A,M
                                       ENDIF
                                       ID:READ  SB:RQST
05 00115   07       A                  RLC
05 00116   07       A                  RLC                             TEST FOR 20MS
05 00117   D24201   N                  IF:      CC,C,S                              SB REQUEST
05 0011A   2A59FD   N                     LHLD     20PNTR          SET MEM PTR TO CALL IN 20MS TAB
05 0011D   5E       A                     MOV      E,M             MOVE CALL ADDR(L) TO E
05 0011E   23       A                     INX      H               STEP MEM PTR TO ADDR(H)
05 0011F   7E       A                     IF:      XBYT,M,EQ,X'FF' IS POINTER AT END OF TABLE
05 00120   FEFF     A
05 00122   C23701   N
05 00125   2A57FD   N                        LHLD     20:PNTR   YES, SET MOVING POINTER
05 00128   2259FD   N                        SHLD     20PNTR          BACK TO BEGINNING OF TABLE
05 0012B   2151FD   A                        LXI      H,ADR(DATA,SB:RQST)     SET MEM PNTR TO
05 0012E   F3       A                        DI
05 0012F   7E       A                        MODBYT   M,AND, 20:RQST REMOVE 20MS REQUEST
05 00130   E6BF     A
05 00132   77       A
                                             ID:ALTR  SB:RQST
05 00133   FB       A                        EI
05 00134   C34201   N                     ELSE:
05 00137   56       A                        MOV      D,M        NO, MOVE CALL ADDR(H) TO D
05 00138   23       A                        INX      H               STEP TO NEXT CALL IN TABLE
05 00139   2259FD   N                        SHLD     20PNTR          SAVE FOR NEXT LOOP-1
05 0013C   CD0000   N                        CALL     DE:IND
05 0013F   2151FD   A                        LXI      H,ADR(DATA,SB:RQST) SET MEM PNTR TO SB BY
                                          ENDIF
```

```
                                      ENDIF
05 00142    7E      A        UNTIL:    XBYT,M,AND,20:RQST,Z  MORE 20MS CALLS TO DO  (LOOP-1)
05 00143    E640    A
05 00145    C2C300  N
                             ID:READ    SB:RQST
05 00148    7E      A        IF:        XBYT,M,AND,100:RQST,NZ TEST FOR 100MS SB REQUEST
05 00149    E620    A
05 0014B    CA9E01  N
                                  ID:READ    SB:RQST
05 0014E    2A5DFD  N             LHLD       100PNTR            SET MEM PNTR TO CALL IN 100 TAB
05 00151    5E      A             MOV        E,M                MOVE CALL ADDR(L) TO E
05 00152    23      A             INX        H                  STEP MEM PNTR TO ADDR(H)
05 00153    7E      A             IF:        XBYT,M,EQ,X'FF'    IS PNTR AT END OF TABLE
05 00154    FEFF    A
05 00156    C29301  N
05 00159    2A5BFD  N                  LHLD       100:PNTR        YES, SET MOVING PNTR BACK
05 0015C    225DFD  N                  SHLD       100PNTR              TO BEGINNING OF TABLE
                       *
                       *                                      100MS TIMER SERVICE
                       *                                       DECREMENTS TIMERS AND CALLS
                       *                                       SUBROUTINE REQUESTED WHEN
                       *                                       TIMER TIMES OUT
                       *                                       USES 3 TABLES ON 3 CONSECUTIVE
                       *                                       RAM PAGES -100:CNT W/TIMER
                       *                                                 -100:LS W/ADDR(L)
                       *                                                 -100:LS W/ADDR(H)
                       *                                       ADDR IS FOR REQSTED SUBR
                       *
05 0015F    2130FA  N                  LXI        H,100:CNT       STARTING ADDR OF 100MS TIMERS
05 00162    1614    A                  MVI        D,100:TMAX      D-REG SET TO QTY OF 100MS TMRS
                       *
                                                              CONDITIONAL HOLD OF 100MS TMRS
05 00164    3A45FD  A                  IF:        FBIT,STDBOPNO,T IS STAND-BY RELAY OPEN
05 00167    E640    A
05 00169    CA6E01  N
                                            MVI        D,100:TMAX; YES, HOLD SPECIFIED NUMBER
05 0016C    1611    A                                  -HOLDTMRS            OF TIMERS
                                       ENDIF
                       *
                                       REPEAT                 LOOP TO DECR & SERVICE TIMEOUTS
05 0016E    7E      A                       IF:        VBYT,M,NZ IS TIMER ACTIVE
05 0016F    A7      A
05 00170    CA8201  N
05 00173    35      A                            DCR        M      DECR TIMER
05 00174    C28201  N                            IF:        CC,Z,S HAS TIMER TIMED OUT
05 00177    D5      A                                 PUSH       D      SAVE # TIMERS TO SERVICE
05 00178    E5      A                                 PUSH       H      SAVE ADDR OF CURRENT TIMER
05 00179    24      A                                 INR        H      STEP TO NEXT RAM PAGE
05 0017A    5E      A                                 MOV        E,M    MOVE CALL ADDR(L) TO E
05 0017B    24      A                                 INR        H      STEP TO NEXT RAM PAGE
05 0017C    56      A                                 MOV        D,M    MOVE CALL ADDR(H) TO D
05 0017D    CD0000  N                                 CALL       DE:IND
05 00180    E1      A                                 POP        H      RECALL ADDR OF CURRENT TMR
05 00181    D1      A                                 POP        D      RECALL NUMBER OF TIMERS
                       *                                                    YET TO BE SERVICED
                                                 ENDIF
                                            ENDIF
05 00182    23      A                       INX        H            STEP TO NEXT TIMER ADDR
05 00183    15      A                       DCR        D            DECR NUMBER OF 100MS TIMERS
05 00184    C26E01  N              UNTIL:     CC,Z,S              HAVE ALL TIMERS BEEN SERVICED
                       *                                          END 100MS TIMER SECTION
05 00187    2151FD  A              LXI        H,ADR(DATA,SB:RQST) SET MEM PNTR TO SB BYTE
05 0018A    F3      A              DI
05 0018B    7E      A              MODBYT     M,AND, 100:RQST REMOVE 100MS REQUEST
05 0018C    E6DF    A
05 0018E    77      A
                                   ID:ALTR    SB:RQST
05 0018F    FB      A              EI
05 00190    C39E01  N         ELSE:
05 00193    56      A              MOV        D,M                NO, MOVE CALL ADDR(H) TO D
05 00194    23      A              INX        H                      STEP PNTR TO NEXT CALL
05 00195    2250FD  N              SHLD       100PNTR                SAVE FOR NEXT LOOP-2
05 00198    CD0000  N              CALL       DE:IND
05 0019B    2151FD  A              LXI        H,ADR(DATA,SB:RQST) SET MEM PNTR TO SB BYTE
                              ENDIF
                         ENDIF
05 0019E    7E      A    UNTIL:    VBYT,M,Z                       MORE SB CALLS TO DO  (LOOP-2)
05 0019F    A7      A
05 001A0    C2C300  N
                         ID:READ   SB:RQST
05 001A3    76      A         HLT                                 COOL IT UNTIL INTERRUPT RESTART
05 001A4    CAC300  N    UNTIL:    CC,Z,C                         HAS INTERRUPT RTC  (LOOP-3)
05 001A7    F3      A    DI                                       ONLY KIDDING BEFORE, BUT THIS
05 001A8    76      A    HLT                                       TIME REALLY STOP (ABORT)
                       *
                       *     SUBR TO SET CALL TABLE POINTERS
                       *     CALLED BY EACH STATE PROLOG
                       *
                       *     POSITION SB:TABLE POINTER
                       *
05 001A9    3A53FD  N  SB:PNTRS LDA      STATE:                  WHAT STATE IS WANTED
05 001AC    110600  A           LXI      D,X'06'                 LOAD D&E WITH SKIP NUMBER
05 001AF    210501  N           LXI      H,SB:TABLE-X'06'        H&L=6'<' TABLE ADDR
                                REPEAT
05 001B2    19      A                DAD      D                  SKIP THREE WORDS
05 001B3    3D      A                DCR      A                  DECR STATE LOOP COUNTER
05 001B4    F28201  N           UNTIL:   CC,S,S                  IS POINTER AT CORRECT STATE
                       *
                       *     TRANSFER ADDRS TO VARIABLE SB POINTERS
                       *
```

```
05 001B7   1155FD   N               LXI       D,10!CALLS               SET D&E TO FIRST OF SB PNTRS
05 001BA   0602     A               MVI       B,2                      LOAD 10!CALLS
05 001BC   CDCE01   N               CALL      MV!WORDS                          & 20!PNTR
05 001BF   2B       A               DCX       H                        ADJUST 'FROM' PNTR
05 001C0   2B       A               DCX       H                                     BACK 1 WORD
05 001C1   0602     A               MVI       B,2                      LOAD 20PNTR
05 001C3   CDCE01   N               CALL      MV!WORDS                          & 100!PNTR
05 001C6   2B       A               DCX       H                        ADJUST 'FROM' PNTR
05 001C7   2B       A               DCX       H                                     BACK 1 WORD
05 001C8   CDCC01   N               CALL      MV!WORD                  LOAD 100PNTR
                                    ID!ALTR   10!CALLS,20!PNTR,20PNTR,!  DATA WORDS MODIFIED
                                              100!PNTR,100PNTR            BY THIS SUBR
05 001CB   C9       A               RET
                           *NAR
                           *
                           *        MV!WORD/MV!WORDS SUBROUTINES
                           *
                           *        SUBR TO TRANSFER WORDS (2BYTES) FROM MEMORY POINTED TO BY <H&L>
                           *         TO MEMORY POINTED TO BY <D&E>. CALL MV!WORD FOR 1 TRANSFER,
                           *         AND CALL MV!WORDS (WITH B-REG # WORDS TO TRANSFER) FOR
                           *         MULTIPLE TRANSFERS. USES ALL BUT C-REG.
                           *
05 001CC   0601     A      MV!WORD  MVI       B,1                      B= # WORDS TO BE MOVED
                           MV!WORDS REPEAT
05 001CE   7E       A                   MOV       A,M                  A= 1ST 'FROM' BYTE
05 001CF   12       A                   STAX      D                    STORE IN 1ST 'TO' LOCATION
05 001D0   23       A                   INX       H                    ADVANCE 'FROM'
05 001D1   13       A                   INX       D                                 AND 'TO' PNTRS
05 001D2   7E       A                   MOV       A,M                  A= 2ND 'FROM' BYTE
05 001D3   12       A                   STAX      D                    STORE IN 2ND 'TO' LOCATION
05 001D4   23       A                   INX       H                    ADVANCE 'FROM'
05 001D5   13       A                   INX       D                                 AND 'TO' PNTRS
05 001D6   05       A                   DCR       B                    DECRM # OF WORDS CNTR
05 001D7   C2CE01   N               UNTIL!    CC,Z,S                   LOOP UNTIL ALL WORDS TRANSFERRD
05 001DA   C9       A               RET
                           *
                           *        TABLE OF SB CALL POINTERS
                           *        FOR EACH STATE
                           *
05 001DB   0906     N      SB!TABLE DW        COMP10
05 001DD   0A06     N               DW        COMP20
05 001DF   1206     N               DW        COMP100
05 001E1   B105     N               DW        TREP10
05 001E3   B505     N               DW        TREP20
05 001E5   C305     N               DW        TREP100
05 001E7   4202     N               DW        NRDY10
05 001E9   4602     N               DW        NRDY20
05 001EB   5202     N               DW        NRDY100
05 001ED   AF02     N               DW        RDY10
05 001EF   B302     N               DW        RDY20
05 001F1   BF02     N               DW        RDY100
05 001F3   AB03     N               DW        PRNT10
05 001F5   B203     N               DW        PRNT20
05 001F7   C803     N               DW        PRNT100
05 001F9   1905     N               DW        RUNN10
05 001FB   1D05     N               DW        RUNN20
05 001FD   2F05     N               DW        RUNN100

                           *
                           *        SUBR TO DO EPILOGS & PROLOGS LAST CALL IN EVERY 100MS TABLE
                           *
05 001FF   2153FD   A      STAT!CHG LXI       H,ADR(DATA,STATE!)       A= PRESENT STATE # IF UNCHANGED
05 00202   7E       A               MOV       A,M                       OR NEXT STATE IF CHANGED
05 00203   23       A               INX       H                        H&L= ADDR 'FORMER STATE' GLOBAL
05 00204   BE       A               IF!       XBYT,A,NE,M              HAS THERE BEEN A STATE CHANGE
05 00205   CA3602   N
                                        ID!READ   STATE!,!STATE!
05 00208   46       A                   MOV       B,M                  YES, B= FORMER STATE
05 00209   77       A                   MOV       M,A                  UPDATE 'FORMER' TO 'PRESENT'
                                        ID!ALTR   !STATE!
05 0020A   78       A                   CASE!     VBYT,B               DO EPILOG FOR FORMER STATE
05 0020B   111F02   N
05 0020E   FE06     A
05 00210   CD0000   N
05 00213   1806     N                         C,0       COMP!EPL       COMPONENT CONTROL STATE
05 00215   DB05     N                         C,1       TREP!EPL       TECH REP STATE
05 00217   7A02     N                         C,2       NRDY!EPL       NOT-READY STATE
05 00219   E302     N                         C,3       RDY!EPL        READY STATE
05 0021B   E603     N                         C,4       PRNT!EPL       PRINT STATE
05 0021D   4105     N                         C,5       RUNN!EPL       SYSTEM RUNNING, NOT PRINT STATE
                                        ENDCASE
05 0021F   3A53FD   N                   CASE!     VBYT,STATE!          DO PROLOG FOR PRESENT STATE
05 00222   113602   N
05 00225   FE06     A
05 00227   CD0000   N
05 0022A   FF05     N                         C,0       COMP!PRL       COMPONENT CONTROL STATE
05 0022C   A505     N                         C,1       TREP!PRL       TECH REP STATE
05 0022E   3702     N                         C,2       NRDY!PRL       NOT-READY STATE
05 00230   A602     N                         C,3       RDY!PRL        READY STATE
05 00232   1603     N                         C,4       PRNT!PRL       PRINT STATE
05 00234   0B05     N                         C,5       RUNN!PRL       SYSTEM RUNNING, NOT PRINT STATE
                                        ENDCASE
                                    ENDIF
05 00236   C9       A               RET                                RETURN TO 100 MSEC SYNC BKGND

                           *NAR
                           *
                           *        N O T   R E A D Y   S T A T E
                           *
                           *        NOT READY STATE- EXECUTES AFTER INITIALIZE UNTIL ALL READY CONDITIONS
                           *        ARE MET. THIS STATE CAN ALSO BE ENTERED FROM 'RUN NOT PRINT','READY'
                           *        AND 'TECH REP'. CONTROL EXITS TO EITHER 'READY' OR 'TECH REP' STATES.
```

```
                                 *         PROLOG

05 00237   CDA901   N   NRDY:PRL CALL      SB:PNT--           SYNC BKG PNTRS TO NEW STATE
05 0023A   CD0000   N            STIMR     INST- -R,1000,NEXT@FLT    UPDATES INST FLT CODE IN STBY
05 0023D   49       A
05 0023E   64       A
05 0023F   0000     N
05 00241   C9       A            RET

                                 *         CALLS FOR NOT READY 10 MS SYN BACKGROUND

05 00242   CD0000   N   NRDY10   CALL      ADH@CTRL
05 00245   C9       A            RET

                                 *         CALLS FOR NOT READY 20 MS SYN BACKGROUND

05 00246   0000     N   NRDY20   DW        NRDY@SKS
05 00248   0000     N            DW        MN@ELVRS
05 0024A   0000     N            DW        DSPL@CTL
05 0024C   0000     N            DW        LMP@CTRL
05 0024E   0000     N            DW        INSTRU
05 00250   FFFF     A            DW        X'FFFF'            END OF TABLE

                                 *         CALLS FOR NOT READY 100 MS SYN BACKGROUND

05 00252   0000     N   NRDY100  DW        NRILK@CK
05 00254   0000     N            DW        RED@BGND
05 00256   0000     N            DW        DVL@DUMP
05 00258   0000     N            DW        REC@PER
05 0025A   0000     N            DW        BIN@CHK            1
05 0025C   0000     N            DW        MIN:PHS1           2
05 0025E   0000     N            DW        BIL@JMP@
05 00260   0000     N            DW        FUS@ROUT
05 00262   0000     N            DW        FLT@100            1
05 00264   0000     N            DW        FLT@CTRL           2
05 00266   0000     N            DW        FLT@CLRN           3
05 00268   0000     N            DW        PROG2SJM
05 0026A   0000     N            DW        PSD@STBY
05 0026C   0000     N            DW        XMM@STBY
05 0026E   0000     N            DW        JAM@RST
05 00270   0000     N            DW        KEY@CNTR
05 00272   0000     N            DW        TST@LP4
05 00274   84C2     N            DW        NRDY:CHG           TEST IF OK TO
05 00276   FF01     N            DW        STAT:CHG                LEAVE NOT READY
05 00278   FFFF     A            DW        X'FFFF'            END OF TABLE

                                 *         EPILOG

05 0027A   CDC000   N   NRDY:EPL CBBIT,S   WAIT*              INSURE WAIT OFF AT NRDY EXIT
05 0027D   E9FE     A
05 0027F   AF       A            CFLG      STRT:PRT           DIS-ABLE TRANSFER TO 'PRINT'
05 00280   3258F4   A
05 00283   C9       A            RET

                                 *
                                 *         SUBR FOR 'NOT-READY' 100MS SYNC BKGND
                                 *          TESTS FOR CHANGE TO 'READY' OR 'TREP REP'
                                 *
05 00284   CDCF05   N   NRDY:CHG CALL      TREP:CHG           TEST FOR STATE CHANGE TO :TREP
05 00287   7E       A            IF:       XBYT,M,NE,:TREP    DID IT CHANGE TO :TREP STATE
05 00288   FE01     A
05 0028A   CA9302   N
                                     ID:READ   STATE:
05 0028D   CD9402   N                CALL      RDYTEST:       TEST ALL 'READY' FLAGS
05 00290   CD0803   N                CALL      NRDY:RDY       MOVE TO EITHER :NRDY OR :RDY
                                 ENDIF
05 00293   C9       A            RET

                                 *
                                 *         SUBR TO TEST ALL 'READY' FLAGS IN A LOOP
                                 *
05 00294   2184F7   A   RDYTEST: LXI       H,RDYFLGS:         H&L= START ADDR OF READY FLAGS
05 00297   0609     A            MVI       B,RDYFNUM:         B= # OF READY FLAGS TO CHK
                                 REPEAT
05 00299   7E       A                MOV       A,M            A= <PRESENT READY FLAG>
05 0029A   07       A                RLC                      SET C IF FLAG SET (READY)
05 0029B   DAA002   N                IF:       CC,C,C         IS PRESENT FLAG INDICATING RDY
05 0029E   0601     A                    MVI       B,1        NO, DON'T TEST ANY FURTHER
                                     ENDIF
05 002A0   23       A                INX       H              MOVE TO NEXT FLAG LOCATION
05 002A1   05       A                DCR       B              DECRM LOOP CNTR (# READY FLAGS)
05 002A2   C29902   N            UNTIL:    CC,Z,S             LOOP UNTIL ALL FLAGS CHKED
                                 ID:READ   LENS@RDY,ELV@RDY,FUS@RDY,;   FLAGS READ
                                           PROG@RDY,ILCK@RDY,XMM@RDY,;
                                           FLT@RDY,ADH@NM@V,SRT@RDY
05 002A5   C9       A            RET                          RETURN
                                 *NAR
                                 *
                                 *         R E A D Y   S T A T E
                                 *
                                 *         READY STATE- EXECUTES WHEN MACHINE IS READY TO GO INTO PRINT STATE.
                                 *         CONTROL CAN GO BACK TO 'NOT READY' OR GO TO 'TECH REP' IF REQUIRED.

                                 *         PROLOG

05 002A6   CD0000   N   RDY:PRL  SBBIT,S   READY*
05 002A9   E701     A
05 002AB   CDA901   N            CALL      SB:PNTRS           SYNC BKG PNTRS TO NEW STATE
05 002AE   C9       A            RET

                                 *         CALLS FOR READY 10MS SYN BACKGROUND
```

```
05 002AF   CD0000   N   RDY10     CALL     ADHØCTRL
05 002B2   C9       A             RET

                        *         CALLS FØR READY 20MS SYN BACKGRØUND

05 002B3   0000     N   RDY20     DW       RDYØSWS
05 002B5   0000     N             DW       MNØELVØS
05 002B7   0000     N             DW       DSPLØCTL
05 002B9   0000     N             DW       LMPØCTRL
05 002BB   0000     N             DW       INSTRU
05 002BD   FFFF     A             DW       X'FFFF'                  END ØF TABLE

                        *         CALLS FØR READY 100MS SYN BACKGRØUND

05 002BF   0000     N   RDY100    DW       BINØCHK                  1
05 002C1   0000     N             DW       MINIPHS1                 2
05 002C3   0000     N             DW       BILØJMPØ
05 002C5   0000     N             DW       DVLØDUMP
05 002C7   0000     N             DW       RECAPEP
05 002C9   0000     N             DW       FUSØRDUT
05 002CB   0000     N             DW       FLTØ10C                  1
05 002CD   0000     N             DW       FLTØCTRL                 2
05 002CF   0000     N             DW       NRILKØCK
05 002D1   0000     N             DW       REDØBGND
05 002D3   0000     N             DW       2SDØSTPY
05 002D5   0000     N             DW       XMMØSTPY
05 002D7   0000     N             DW       JAMØRST
05 002D9   0000     N             DW       KEYØCNTR
05 002DB   0000     N             DW       TSTØLP4
05 002DD   E9C2     N             DW       RDY:CHG                  TEST IF ØK TØ
05 002DF   FFC1     N             DW       STAT:CHG                          LEAVE READY
05 002E1   FFFF     A             DW       X'FFFF'                  END ØF TABLE

                        *         EPILØG

05 002E3   CD0000   N   RDY:EPL   CØBIT,S  READY$
05 002E6   E7FE     A
05 002E8   C9       A             RET

                        *         CHANGE ØF STATE RØUTINES

                        *
                        *         SUBR FØR 'READY' 100MS SYNC BKGND
                        *         TESTS FØR CHANGE TØ 'NØT-READY' ØR 'TECH REP'
                        *
05 002E9   CDDF05   N   RDY:CHG   CALL     TREP:CHG                 TEST FØR STATE CHANGE TØ :TREP
05 002EC   7E       A             IF:      XBYT,M,NE,:TREP          DID IT CHANGE TØ :TREP STATE
05 002ED   FE01     A
05 002EF   CA0A03   N
                                     ID:READ   STATE:
05 002F2   CD9402   N                CALL      RDYTEST:             TEST ALL 'READY' FLAGS
05 002F5   CD0B03   N                CALL      NRDY:RDY             MØVE TØ EITHER :NRDY ØR :RDY
05 002F8   3A5BF4   A                IF:       FLG,STRT:PRT,T       IS START PRINT REQUESTED
05 002FB   07       A
05 002FC   D20A03   N
05 002FF   2153FD   A                   LXI       H,ADR(DATA,STATE:)   SET MEM PNTR
05 00302   7E       A                   IF:       XBYT,M,EQ,:RDY       ØK TØ GØ TØ PRINT
05 00303   FE03     A
05 00305   C20A03   N
                                           ID:READ   STATE:
05 00308   3604     A                      MVI       M,:PRNT          CHG TØ PRT STATE
                                           ID:ALTR   STATE:
                                        ENDIF
                                     ENDIF
                                  ENDIF
05 0030A   C9       A             RET

                        *
                        *         SUBR TØ USE INFØ FRØM 'RDYTEST' AND EXECUTE THE PRØPER CHANGE ØF STATE
                        *
05 0030B   2153FD   A   NRDY:RDY  LXI      H,ADR(DATA,STATE:)       SET MEM PNTR
05 0030E   3603     A             MVI      M,:RDY                   ASSUME GØING TØ 'READY' STATE
                                  ID:ALTR  STATE:
05 00310   DA1503   N             IF:      CC,C,C                   ARE ALL 'READY' FLAGS SET
05 00313   3602     A                MVI      M,:NRDY               NØ, MØVE TØ 'NØT-READY' STATE
                                     ID:ALTR  STATE:
                                  ENDIF
05 00315   C9       A             RET

                        *NAR
                        *
                        *         P R I N T    S T A T E
                        *
                        *         PRINT STATE- EXECUTES WHILE MACHINE IS PRØDUCING CØPIES.
                        *         ENTERED FRØM 'READY' AND EXITS TØ 'RUN NØT PRINT'.

                        *         PRØLØG

05 00316   2160FE   N   PRNT:PRL  CLR:MEM  16,SHIFTREG              CLEAR SHIFT REGISTER
05 00319   0610     A
05 0031B   CD0000   N
05 0031E   3E60     A             MVI      A,LADR(DATA,SHIFTREG)    FØRCE SHIFT REG TØ START AT
05 00320   3263FD   A             STA      ADR(DATA,SRØPTR:)         BEGINNING ØF SHIFTREG TABLE
                                  CLR:MEM  SD1ØDLY-TIMEØDN:+1,,     CLEAR THE FØLLØWING FLAGS
05 00323   21A7F4   A                      ADR(FLG,TIMEØDN:)
05 00326   0609     A
05 00328   CD0000   N
                                  ID:CLR   TIMEØDN:,IMEDØDN:,,
                                           CYCLØDN:,NØRMØDN:,QWIK:ØUT,,
                                           IMGMADE:,SD1ØTIMØ,SD1ØDLY
05 0032B   3E80     A             SFLG     910ØDØNE                 ALLØW FIRST PITCH RESET
05 0032D   326FF4   A
```

```
05 00330    AF        A             XRA       A
05 00331    3266FD    N             STA       CYCUPCT!                  INIT CYCLE-UP CNTR TO 0
05 00334    3269FD    N             STA       SR@VALU!                  INIT 'NEW SR VALUE' TO 0
05 00337    325DFA    N             STA       PLL@INFO                  INIT PLL SHUTDOWN CONTROL TO 0
05 0033A    3268FD    N             STA       SMPL@CT!                  INIT SAMPLE COPY CNTR TO 0
05 0033D    3E03      A             MVI       A,3
05 0033F    3267FD    N             STA       NOIMGCT!                  INIT 'NO IMAGE CNTR' TO 3
05 00342    CD0000    N             CALL      SRSK                      SHIFT REG SCHEDULER (INIT SR#0)
05 00345    CD0000    N             CALL      TIM@MOD                   CALC SHIFTED IMAGE VALUES   (1)
05 00348    CD0000    N             STIMR     935!TMR,810,RETURN!       SET 'OVER-RUN EVENT' TIMER  (2)
05 0034B    22        A
05 0034C    51        A
05 0034D    0000      N
05 0034F    CD0000    N             CALL      TBLD@PRT                  BUILD NEW PITCH TABLE       (3)
05 00352    CD0000    N             SOBIT,S   PRNT$RLY,PR$COOL          PRINT RELAY & COOLING FAN ON
05 00355    02        A
05 00356    EA08      A
05 00358    F608      A
05 0035A    AF        A             CTIMR     PR@COOL                   CLEAR COOLING FAN TIMER
05 0035B    3232FA    N
05 0035E    CD0000    N             COBIT,S   NPFO$ON                   TURN OFF PFO (INVERTED DRIVER)
05 00361    E47F      A
05 00363    3A80F4    A             IF!       FLG,ADH@SELC,T
05 00366    07        A
05 00367    D27003    N
05 0036A    CD0000    N                 CALL      ADH@MOTN
05 0036D    C37503    N             ELSE:
05 00370    3E80      A                 SFLG      ADH@WTEN
05 00372    32CCF4    A
                                    ENDIF
05 00375    CD0000    N             CALL      TRN@OOD
05 00378    CD0000    N             CALL      PAP@SIZE                  CHK PAPER WIDTH FOR FUSER   (1)
05 0037B    CD0000    N             CALL      EDGE@FP                   CHK WHICH EDGE FADE OUT     (2)
05 0037E    CD0000    N             CALL      PAP@PPL3
05 00381    CD0000    N             CALL      PROG@UP                   PROG INITIALIZATION SUBR
05 00384    CD0000    N             CALL      PROG@UP1
05 00387    CDC000    N             CALL      FDR@PRT                   CHECK FEEDER SELECTION
05 0038A    CD0000    N             CALL      BLG@BKPT                  READ BILLING BREAK-POINTS
05 0038D    CD0000    N             CALL      DO@ELV                    CAUSE ELV TO EXECUTE
05 00390    3A54F4    A             IF!       FLG,SRT@SEL,T             IS SORTER BEING USED
05 00393    07        A
05 00394    D29F03    N
05 00397    CD0000    N                 CALL      SRT@INIT              INITIALIZE SORTER JAM DETECT
                                        MVI       A,MSK(NVBIT,NV@FJAM,; SETS ALL 4 JAM CONDITIONS
05 0039A    3E0F      A                           NV@IMED,NV@LOW@J,NV@UP@J)
05 0039C    C3A403    N             ELSE!
05 0039F    3AC9E2    A                 RNVNIB    NV@JAM@N              READ SAVED PREVIOUS SRT JAMS
                                        MODBYT    A,OR,MSK(NVBIT,;      & SET IMED ON & FOR JAM
05 003A2    F603      A                           NV@FJAM,NV@IMED)
                                    ENDIF
05 003A4    32C9E2    A             WNVNIB    NV@JAM@N                  STORE IN CASE OF PWR DN
                                    ID!ALTR   NV@FJAM,NV@IMED,NV@LOW@J,; SEE ABOVE IF!/ELSE!
                                              NV@UP@J
05 003A7    CDA901    N             CALL      SB!PNTRS                  SYNC BKG PNTRS TO NEW STATE
05 003AA    C9        A             RET

                        *           CALLS FOR PRINT 10 MS SYN BACKGROUND

05 003AB    CD0000    N   PRNT10    CALL      ADH@CTPL
05 003AE    CDC004    N             CALL      PRT!IMD
05 003B1    C9        A             RET

                        *           CALLS FOR PRINT 20 MS SYN BACKGROUND

05 003B2    0000      N   PRNT20    DW        PRT@SWS
05 003B4    0000      N             DW        TON@DIS
05 003B6    0000      N             DW        PAP@TGL3
05 003B8    0000      N             DW        LMP@CTPL
05 003BA    0000      N             DW        FDR@BKFD
05 003BC    0000      N             DW        SORTER@
05 003BE    0000      N             DW        FLV@PRNT
05 003C0    0000      N             DW        SOS@JMDT
05 003C2    0000      N             DW        DSPL@CTL
05 003C4    0000      N             DW        INSTRU
05 003C6    FFFF      A             DW        X'FFFF'                   END OF TABLE

                        *           CALLS FOR PRINT 100 MS SYN BACKGROUND

05 003C8    0000      N   PRNT100   DW        FILK@CK
05 003CA    0000      N             DW        PSD@RUN
05 003CC    0000      N             DW        LITE@OFF
05 003CE    0000      N             DW        XMM@PRNT
05 003D0    0000      N             DW        FUS@RDUT
05 003D2    0000      N             DW        READY@CK
05 003D4    0000      N             DW        JAM@RST
05 003D6    0000      N             DW        MINIPHS8
05 003D8    4F06      N             DW        SMPL@CPY
05 003DA    0000      N             DW        RXCYCLDN                  STUB IN US IMG
05 003DC    0000      N             DW        KEY@CNTR
05 003DE    0000      N             DW        TST@LP4
05 003E0    2C04      N             DW        PRT!CHG                   TEST IF OK TO
05 003E2    FF01      N             DW        STAT!CHG                          LEAVE PRINT
05 003E4    FFFF      A             DW        X'FFFF'                   END OF TABLE

                        *           EPILOG

05 003E6    CD0000    N   PRNT!EPL  CALL      AX@EPTY                   (1)
05 003E9    CD0000    N             CALL      FDM@EPL3                  (2)
05 003EC    CD0000    N             CALL      FDA@EPL3                  (3)
05 003EF    CD0000    N             CALL      TRN@EPL3
05 003F2    CD0000    N             CALL      DVL@NRDY
```

```
744                                    COBIT,S   FUS$CAPL,FUS$LOAD,ILLM$SPL,,
745  05 003F5   CD0000   N                       FFO$11,EFO$12$5,SMPL$CPY,READY$
     05 003F8   07       A
     05 003F9   E6F7     A
     05 003FB   EDFD     A
     05 003FD   F2F7     A
     05 003FF   ECF7     A
     05 00401   EBF7     A
     05 00403   E2FE     A
     05 00405   E7FE     A
746  05 00407   CD0000   N             SOBIT,S   NPFO$ON               TURN OFF PFO (INVERTED DRIVER)
     05 0040A   E480     A
747  05 0040C   AF       A             CFLG      ELV@AUTO              DISABLE AUTO-TRAY SWITCHING
     05 0040D   3222F4   A
748  05 00410   CD0000   N             CALL      PAP@EPL3
749  05 00413   CD1704   N             CALL      ABORT
750  05 00416   C9       A             RET

752                            *
753                            *       SUBROUTINE
754                            *

756  05 00417   F3       A   ABORT     DI                              TURN OFF INTERRUPT SYSTEM
757  05 00418   AF       A             CFLG      TBLD@FIN              SIGNAL NEW PITCH TABLE REQ'D
     05 00419   3250F4   A
758  05 0041C   211907   N             LXI       H,EV@STBY!            ADDR OF STBY EVENT TABLE
759  05 0041F   2264FD   N             SHLD      EV@PTR!               SAVE FOR MACH CLK ROUTINE
760  05 00422   CD0000   N             COBIT,S   BTR$LOAD,PRNT$RLY     UN-LOAD BTR & DROP PRINT RELAY
     05 00425   02       A
     05 00426   E17F     A
     05 00428   EAF7     A
761  05 0042A   FB       A             EI
762  05 0042B   C9       A             RET

764  05 0042C   3A66FD   N   PRT!CHG   IF!       XBYT,CYCUPCT!,EQ,2    CHECK FOR PROLOG 2 OR CYCLE OUT
     05 0042F   FEC2     A
     05 00431   C23C04   N
765  05 00434   3E80     A                  SFLG      PRT$PRO2         YES, SET 'PRINT PROLOG 2' FLAG
     05 00436   3271F4   A
766  05 00439   C37004   N             ORIF!     XBYT,A,EQ,3           NO, IS CYCLE UP CNTR=3
     05 0043C   FEC3     A
     05 0043E   C27004   N
767  05 00441   3A71F4   A             ANDIF!    FLG,PRT$PRO2,T        YES, AND IS PROLOG 2 FLAG SET
     05 00444   07       A
     05 00445   D27004   N
768  05 00448   AF       A                  CFLG      PRT$PRO2         YES, DO PROLOG 2 AND CLR FLAG
     05 00449   3271F4   A
769                            *
770                            *       PRINT STATE BACKGROUND- PROLOG 2
771                            *
772  05 0044C   CD0000   N                  CALL      PAP@PRL2         RETN XPORT OFF IF NOT SIDE 1
773  05 0044F   CD0000   N                  CALL      PROG@UP2
774  05 00452   3AADF4   A                  IF!       FLG,IMGMADE!,T   HAS 1ST IMAGE BEEN MADE
     05 00455   07       A
     05 00456   D25C04   N
775  05 00459   CD0000   N                       CALL      PROG@UP     YES, CALL PROG INITIALIZATION
776                                         ENDIF
777  05 0045C   3A57FA   N                  IF!       VBYT,MINIBYTE,NZ IS MINI-PHYSICAL ACTIVE
     05 0045F   A7       A
     05 00460   CA7004   N
778  05 00463   AF       A                       CFLG      DSPL@1ST    YES, ENABLE DISPLAY UPDATE
     05 00464   329AF4   A
779  05 00467   3C       A                       INR       A           DISPLAY QUANTITY
780  05 00468   3250FA   N                       STA       DSPL@ST1     COMPLETE
781  05 0046B   3E06     A                       MVI       A,6         SET DOCUMENT TOTAL TO
782  05 0046D   326FFA   N                       STA       DOC@TOTL     6 FOR ADH DOCUMENT CHECK
783                                         ENDIF
784                                    ENDIF

786                            *       END PROLOG2

788                            *
789                            *       BUILD FLAG BYTE
790                            *
791  05 00470   0608     A             MVI       B,8                   NUMBER OF FLAGS REQ'D
792  05 00472   AF       A             XRA       A                     CLEAR A-REG
793  05 00473   57       A             MOV       D,A                   CLEAR D-REG
794  05 00474   21A9F4   A             LXI       H,ADR(FLG,IMED@DN!)   STARTING ADDR OF PRT!CHG FLAGS
795                                    REPEAT
796  05 00477   7E       A                  MOV       A,M              LOAD A W/CONTENTS OF FLAG ADDR
797  05 00478   07       A                  RLC                        ROTATE FLAG(D7) INTO CARRY
798  05 00479   7A       A                  MOV       A,D              LOAD A W/FLAGS BILT INTO BYTE
799  05 0047A   17       A                  RAL                        PUT FLAG IN DO & SHIFT LEFT
800  05 0047B   57       A                  MOV       D,A              SAVE RESULT IN D-REG
801  05 0047C   23       A                  INX       H                STEP TO NEXT FLAG
802  05 0047D   05       A                  DCR       B                DECR NUMBER OF FLAGS REQ'D
803  05 0047E   C27704   N             UNTIL!    CC,Z,S                LOOP UNTIL ALL FLAGS IN BYTE
804                                    ID!READ   IMED@DN!,CYCL@DN!,NORM@DN!,,   FLAGS READ
805                                              QWIK!OUT,IMGMADE!,SD1@TIMO,,
806                                              SD1@DLY,ADH@SELC
807                            *
808                            *       TEST FOR STATE CHANGE TO !RUNN
809                            *
810  05 00481   3A67FD   N             LDA       NO!MGCT!              MOV CURRENT NO IMAGE COUNTER
811  05 00484   5F       A             MOV       E,A                   TO THE E-REG
812  05 00485   060E     A             MVI       B,14                  LOOP CNTR FOR STATE CHG TESTS
813  05 00487   21E104   N             LXI       H,CYC!OUT             TABLE ADDR OF PRT!CHG TESTS
814                                    REPEAT
815  05 0048A   7A       A                  MOV       A,D              MOV FLAG BYTE TO THE A-REG
816  05 0048B   A6       A                  MODBYT    A,AND,M          MASK FOR DESIRED FLAGS
817  05 0048C   23       A                  INX       H                STEP TO STATUS TEST
```

```
05 0048D   AE       A          MODBYT   A,XOR,M                    TEST FLAG STATUS
05 0048E   C29F04   N          IF:      CC,Z,S                     DID TEST PASS
05 00491   23       A              INX      H                      YES, STEP TO NOIMGCT: TEST
05 00492   7B       A              IF:      XBYT,E,GE,M            IS NOIMGCT: AT CORRECT VALUE
05 00493   BE       A
05 00494   DA9E04   N
05 00497   3E05     A                  MVI      A,!RUNN            YES, CHANGE STATE
05 00499   3253FD   N                  STA      STATE!              TO RUN NOT PRINT
05 0049C   0601     A                  MVI      B,1                FORCE END OF TESTS (EARLY OUT)
                                   ENDIF
05 0049E   2B       A              DCX      H                      ADJ PNTR BACK TO NO IMG TEST
                               ENDIF
05 0049F   23       A          INX      H                          STEP OVER NO IMG TEST
05 004A0   23       A          INX      H                          STEP TO MASK FOR NEXT TEST
05 004A1   05       A          DCR      B                          DECR LOOP COUNTER
05 004A2   C28A04   N      UNTIL:   CC,Z,S                         ALL TESTS COMPLETE OR STATE CHG
                       *
05 004A5   7A       A      MOV      A,D                            MOV FLAG BYTE TO A-REG
05 004A6   E662     A      MODBYT   A,AND,D6!D5!D1                 MASK AND TEST FOR FLAGS TRUE
                           ID:READ  NORMODN!,CYCLODN!,SD1ODLY      FROM ABOVE BYTE BUILD
05 004A8   CABF04   N      IF:      CC,Z,C                         ARE ANY FLAGS TRUE
05 004AB   2166FD   A          LXI      H,ADR(DATA,CYCUPCT!)       PREPARE TO TEST OR MODIFY
05 004AE   7E       A          IF:      XBYT,M,GF,3                HAS PROG PUSHED IT TO 0
05 004AF   FE03     A
05 004B1   DAB604   N
                                   ID:READ  CYCUPCT!
05 004B4   3602     A              MVI      M,2                    NO, FORCE CYCLE-UP MODE AGAIN
                                   ID:ALTR  CYCUPCT!
                               ENDIF
05 004B6   CD0000   N          COBIT,S  ILLM$SPL                   ILLM SPL OFF DURING DEAD CYCLE
05 004B9   F2F7     A
05 004BB   AF       A          CFLG     SMPLOFLG                   CANCEL SAMPLE COPY SEQUENCE
05 004BC   324CF4   A
                           ENDIF
05 004BF   C9       A      RET


                   PRT:IMD  IF:      FLGS,IMEDODN!,AND,!           IS IMEDIATE DOWN REQUESTED
05 004C0   3AA9F4   A                TBLD$FIN,T                     AND HAS PROB BEEN DETECTED
05 004C3   2150F4   A
05 004C6   A6       A
05 004C7   F2D004   N
05 004CA   CD1704   N          CALL     ABORT
05 004CD   C3E004   N      ORIF:    FLG,TIMEODN!,T                 IF TIMED DWN REQ'D DROP OUT
05 004D0   3AA7F4   A
05 004D3   07       A
05 004D4   D2E004   N
05 004D7   21E1FF   A          COBIT    BTP$LOAD                   BIAS TRANS ROLL (ASAP)
05 004DA   3E7F     A
05 004DC   F3       A
05 004DD   A6       A
05 004DE   77       A
05 004DF   FB       A
                           ENDIF
05 004E0   C9       A      RET

                       *
                       *                                           D7 6 5 4 3 2 1 0 (X=DON'T CARE)
                       *
                       *                TABLE OF FLAG STATUS TESTS   I C N O I S S A   N C
                       *                 AND NO IMAGE COUNTER VALUES H Y O W M D D D   O O
                       *                 USED TO DETERMINE IF STATE  E C R I G 1 1 H     U   T N
                       *                 SHOULD CHANGE FROM PRINT TO D L M K M O O O   I N   E U
                       *                 RUN NOT PRINT               O O O : A T D S   M T   S M
                       *                                             D D D O D I L E   A E   T B
                       *                                             N N N U E M Y L   O R     E
                       *                                             ! ! ! T ! O   C   E       R
                       *
05 004E1   48       A  CYC:OUT  DB       D6!D3                     X 1 X X 0 X X X   00     1
05 004E2   40       A           DB       D6
05 004E3   00       A           DB       0
05 004E4   5C       A           DB       D6!D4!D3!D2               X 1 X 0 1 1 X X   16     2
05 004E5   4C       A           DB       D6!D3!D2
05 004E6   10       A           DB       16
05 004E7   5C       A           DB       D6!D4!D3!D2               X 1 X 0 1 0 X X   11     3
05 004E8   48       A           DB       D6!D3
05 004E9   0B       A           DB       11
05 004EA   68       A           DB       D6!D5!D3                  X 0 1 X 0 X X X   00     4
05 004EB   20       A           DB       D5
05 004EC   00       A           DB       0
05 004ED   75       A           DB       D6!D5!D4!D2!D0            X 0 0 0 X 1 X 0   36     5
05 004EE   04       A           DB       D2
05 004EF   24       A           DB       36
05 004F0   75       A           DB       D6!D5!D4!D2!D0            X 0 0 0 X 1 X 1   20     6
05 004F1   05       A           DB       D2!D0
05 004F2   14       A           DB'      20
05 004F3   7D       A           DB       D6!D5!D4!D3!D2!D0         X 0 1 0 1 1 X 0   36     7
05 004F4   2C       A           DB       D5!D3!D2
05 004F5   24       A           DB       36
05 004F6   7D       A           DB       D6!D5!D4!D3!D2!D0         X 0 1 0 1 1 X 1   20     8
05 004F7   2D       A           DB       D5!D3!D2!D0
05 004F8   14       A           DB       20
05 004F9   75       A           DB       D6!D5!D4!D2!D0            X 0 0 0 X 0 X 0   21     9
05 004FA   00       A           DB       0
05 004FB   15       A           DB       21
05 004FC   7D       A           DB       D6!D5!D4!D3!D2!D0         X 0 1 0 1 0 X 0   21    10
05 004FD   28       A           DB       D5!D3
05 004FE   15       A           DB       21
05 004FF   75       A           DB       D6!D5!D4!D2!D0            X 0 0 0 X 0 X 1   13    11
05 00500   01       A           DB       D0
```

```
05 00501   00       A              DB      13                                X 0 1 0 1 0 X 1   13   12
05 00502   70       A              DB      D61D51D41D31D21D0
05 00503   29       A              DB      D51D31D0
05 00504   00       A              DB      13                                X X X 1 X X X X   11   13
05 00505   10       A              DB      D4
05 00506   10       A              DB      D4
05 00507   08       A              DB      11                                1 X X X X X X X   00   14
05 00508   80       A              DB      D7
05 00509   80       A              DB      D7
05 0050A   00       A              DB      0

                          *NAR
                          *
                          *        R U N   N O T   P R I N T   S T A T E
                          *
                          *        RUN NOT PRINT- EXECUTES WHILE MACHINE IS COMPLETING A COPY RUN.
                          *        ENTERED FROM 'PRINT' AND EXITS TO 'NOT READY'.

                          *        PROLOG

05 0050B   CD0000   N     RUNN:PRL CALL    DO@ELV                    CAUSE ELV TO EXECUTE
05 0050E   CD0000   N              STIMR   RUNN:TMR,2500,RUNN@CHG    STAY IN RUNN 2.5 SEC
05 00511   2F       A
05 00512   FA       A
05 00513   7505     N
05 00515   CDA901   N              CALL    SB:PNTRS                  SYNC BKG PNTRS TO NEW STATE
05 00518   C9       A              RET

                          *        CALLS FOR RUN NOT PRINT 10 MS SYN BACKGROUND

05 00519   CD0000   N     RUNN10   CALL    ADH@CTRL
05 0051C   C9       A              RET

                          *        CALLS FOR RUN NOT PRINT 20 MS SYN BACKGROUND

05 0051D   0000     N     RUNN20   DW      RUNN@SWS
05 0051F   0000     N              DW      SORTERS
05 00521   0000     N              DW      SOS@JMDT
05 00523   0000     N              DW      FLV@PRNT
05 00525   0000     N              DW      LMP@CTRL
05 00527   0000     N              DW      PAP@TGL4
05 00529   0000     N              DW      DSPL@CTL
05 0052B   0000     N              DW      INSTRU
05 0052D   FFFF     A              DW      X'FFFF'                   END OF TABLE

                          *        CALLS FOR RUN NOT PRINT 100 MS SYN BACKGROUND

05 0052F   0000     N     RUNN100  DW      JAM@RST
05 00531   0000     N              DW      RILK@CK
05 00533   0000     N              DW      FUS@RDUT
05 00535   0000     N              DW      2SD@RUN
05 00537   0000     N              DW      XMM@PRNT
05 00539   0000     N              DW      LITE@OFF
05 0053B   0000     N              DW      TST@LP4
05 0053D   FF01     N              DW      STAT:CHG                  TEST IF OK TO LEAVE RUN NOT PRT
05 0053F   FFFF     A              DW      X'FFFF'                   END OF TABLE

05 00541   CD0000   N     RUNN:EPL CALL    DEL@CK                    CALC COPIES DELIVERED
05 00544   CD0000   N              CALL    PAP@EPL4                  'RUNNPRT' PAPER PATH MOP UP SUB
05 00547   CD0000   N              CALL    MOT@OFF                   TURN OFF SORTER MOTORS
05 0054A   CD0000   N              CALL    DO@ELV                    CAUSE ELV TO EXECUTE
05 0054D   AF       A              CFLG    AXFD@FLT                  RESET FOR USE DURING NEXT RUN
05 0054E   323FF4   A
05 00551   2123FC   A              CFBIT,P TF@XMMO                   STOP BLINKING OF XMM 'OTHER'
05 00554   3EFE     A
05 00556   A6       A
05 00557   77       A
05 00558   CD0000   N              COBIT,S SOS$SMPL
05 0055B   ECFD     A
05 0055D   CD7805   N              CALL    NV@JAM
05 00560   CD0000   N              CALL    RCP@STRE                  STORE RECAP DATA IN RAM
05 00563   CD0000   N              CALL    ADH@MOTF
05 00566   3E08     A              MVI     A,8
05 00568   3285FA   N              STA     COOLCNT                   SET COUNTER FOR 7 TIMEOUTS
05 0056B   CD0000   N              CALL    PR@FAN
05 0056E   CD0000   N              CALL    FLT@EPL5                  (1)
05 00571   CD0000   N              CALL    HIST@FLE                  (2) LOG HISTORY DATA FOR RUN
05 00574   C9       A              RET                               (3)

05 00575   2153FD   N     RUNN@CHG LXI     H,STATE!                  SET H&L TO ADDR OF STATE!
05 00578   3602     A              MVI     M,INRDY                   CHANGE STATE! TO NOT READY
                                   ID:ALTR STATE!
05 0057A   C9       A              RET

05 0057B   3A66F4   A     NV@JAM   RFLG    UP@JAM                    LOAD A WITH SRT UPPER JAM FLAG
05 0057E   07       A
                          *                                          & SAVE IT IN THE CARRY BIT
05 0057F   3A36F4   A              LDAFLG  LOW@JAM                   LOAD A WITH SRT LOWER JAM FLAG
05 00582   17       A              RAL                               & MOVE CARRY &
05 00583   17       A              RAL                               LOW@JAM INTO THEIR POSITIONS
05 00584   07       A              RLC
05 00585   07       A              RLC
                                   MODBYT  A,AND,MSK(NVBIT,;         MASK FOR DESIRED BITS
05 00586   E60C     A                      NV@LOW!J,NV@UP@J)
05 00588   47       A              MOV     B,A                       & SAVE IT IN THE B-REG
05 00589   3AA9F4   A              IFI     FLG,IMFD@DN!,T            WAS THERE AN IMED DN CONDITION
05 0058C   07       A
05 0058D   D29605   N                                                YES,RESTORE A-REG
05 00590   78       A              MOV     A,B                       & SET NV JAM BITS
                                   MODBYT  A,OR,MSK(NVBIT,NV@FJAM,;
05 00591   F603     A                      NV$IMED)
```

```
     05 00593   C3A105   N          ELSE:
     05 00596   3A3CFD   A              IF:      FBITS,FDR@AJAM,@R,FDR@MJAM,T IS EITHER JAM C@NDITI@N TRUE
     05 00599   E60C     A
     05 0059B   CA9F05   N
     05 0059E   37       A                  STC                                   YES,SET CARRY
                                        ENDIF
     05 0059F   17       A              RAL                                       R@TATE INT@ D0
     05 005A0   B0       A              M@DBYT    A,@R,B                          '@R' IN SRT JAM BITS
                                    ENDIF
     05 005A1   32C9E2   A          WNVNI8     NV@JAM@N
                                    ID:ALTR    NV@FJAM,NV@IMED,NV@L@W@J,NV@UP@J
     05 005A4   C9       A          RET                                           RETURN T@ STATE CHECKER

                               *NAR
                               *
                               *     T E C H    R E P    S T A T E
                               *
                               *     THE TECH REP STATE IS ENTERED WHEN THE SERVICE KEY IS @N IN
                               *     'N@T READY' & 'READY' STATES. THIS ALL@WS THE TECH REP T@ PERF@RM SU
                               *     TASKS AS ACCESS N@N-V@LATILE MEM@RY & C@MP@NENT C@NTR@L.

                               *
                               *     PR@L@G
                               *
     05 005A5   CD0000   N     TREP:PRL C@BIT,S    WAIT$                          INSURE WAIT @FF AT TREP ENTR
     05 005A8   E9FE     A
     05 005AA   CD0000   N          CALL       DGN@PRL                            DIAGN@STIC PR@L@G
     05 005AD   CDA901   N          CALL       SB:PNTRS                           SYNC BKG PNTRS T@ NEW STATE
     05 005B0   C9       A          RET

                               *     CALLS F@R TECH REP 10MS SYN BACKGR@UND

     05 005B1   CD0000   N     TREP10   CALL       ADH@CTRL
     05 005B4   C9       A          RET

                               *     CALLS F@R TECH REP 20MS SYN BACKGR@UND

     05 005B5   0000     N     TREP20   DW         TREP@SWS
     05 005B7   0000     N          DW         MN@ELVRS
     05 005B9   0000     N          DW         LMP@CTRL
     05 005BB   0000     N          DW         DSPL@CTL
     05 005BD   0000     N          DW         DGN@BKG
     05 005BF   0000     N          DW         INSTRU
     05 005C1   FFFF     A          DW         X'FFFF'                            END @F TABLE

                               *     CALLS F@R TECH REP 100MS SYN BACKGR@UND

     05 005C3   0000     N     TREP100  DW         NRILK@CK
     05 005C5   0000     N          DW         PSD@STPY
     05 005C7   0000     N          DW         XMM@STPY
     05 005C9   0000     N          DW         RED@B@ND
     05 005CB   0000     N          DW         BIN@CHK
     05 005CD   0000     N          DW         JAM@RST
     05 005CF   0000     N          DW         DVL@DUMP
     05 005D1   0000     N          DW         FUS@RDUT
     05 005D3   0000     N          DW         TST@LP4
     05 005D5   DF05     N          DW         TREP:CHG                           TEST IF @K T@
     05 005D7   FF01     N          DW         STAT:CHG                                  LEAVE TREP REP
     05 005D9   FFFF     A          DW         X'FFFF'                            END @F TABLE

                               *
                               *     EPIL@G  (TECH REP STATE)
                               *
     05 005DB   CD0000   N     TREP:EPL CALL       DGN@EPL                            DIAGN@STIC EPIL@G
     05 005DE   C9       A          RET

                               *     CHANGE @F STATE CHECK

     05 005DF   2153F0   A     TREP:CHG LXI        H,ADR(DATA,STATE:)                 PREPARE F@R P@SSIBLE STATE CHG
     05 005E2   7E       A          IF:        XBYT,M,NE,:C@MP                    D@ N@T CHG STATE IF IN C@MP
     05 005E3   FE00     A
     05 005E5   CAFE05   N
     05 005E8   3A49F4   A              IF: .      FLG,SER@ACT,T                  IF SERVICE KEY IS @N AND IF
     05 005EB   07       A
     05 005EC   D2FC05   N
     05 005EF   3A20FC   A              ANDIF:     FBIT,DGN@PRT@,F                 IN DIAG PRINT PR@GRAM
     05 005F2   E6C2     A
     05 005F4   C2FC05   N
     05 005F7   3601     A                  MVI        M,:TREP                    CHG T@ TREP STATE
     05 005F9   C3FE05   N              ELSE:                                     IF KEY IS TURNED @FF
     05 005FC   3602     A                  MVI        M,:NRDY                    CHG T@ N@T READY STATE
                                        ENDIF
                                        ID:ALTR    STATE:
                                    ENDIF
     05 005FE   C9       A          RET
```

TABLE II

```
                               *     FIXED PITCH EVENT TABLE
                               *
                               *     EVENTS MUST BE IN SEQUENTIAL @RDER STARTING
                               *     WITH THE EVENT CL@SES T@ PITCH RESET FIRST
                               *
```

```
                                *       THERE CAN BE NO MORE THAN 256 COUNTS BETWEEN EVENTS
                                *
                                *       FORMAT OF EVENTS FOR EVENT TABLE
                                *
                                *       EVENT    X,Y,Z
                                *       WHERE:
                                *       X = ABSOLUTE COUNTS FROM RESET
                                *       Y = SHIFT REGISTER NEEDED IN EVENT
                                *       Z = EVENT NAME
                                *
                                *
                                *       PITCH EVENTS
                                *
                                        TABLE
05 0001E  0200   A                      EVENT    2,3,TRN2CURR
05 00020  03     A
05 00021  0000   N
05 00023  0300   A                      EVENT    3,2,ADC@ACT
05 00025  02     A
05 00026  0000   N
05 00028  0400   A                      EVENT    4,3,FDR5AFLT
05 0002A  03     A
05 0002B  0000   N
05 0002D  0700   A                      EVENT    7,0,SPLYS@ON
05 0002F  00     A
05 00030  0000   N
05 00032  0800   A                      EVENT    8,2,FDR1AXFD
05 00034  02     A

05 00035  0000   N
05 00037  0A00   A                      EVENT    10,3,FUS@LOAD
05 00039  03     A
05 0003A  0000   N
05 0003C  3000   A                      EVENT    48,8,DECG@INV          DECISION GATE FOR INVTD COPI
05 0003E  08     A
05 0003F  0000   N
05 00041  3600   A                      EVENT    54,5,FUS@NTLD          FUSER LOADED TEST
05 00043  05     A
05 00044  0000   N
05 00046  5500   A                      EVENT    85,3,FDR6MFLT
05 00048  03     A
05 00049  0000   N
05 0004B  5900   A                      EVENT    89,2,FDR2MNFD
05 0004D  02     A
05 0004E  0000   N
05 00050  5D00   A                      EVENT    93,8,JAM6@NON          PAPER PATH JAM SW PITCH EVEN
05 00052  08     A
05 00053  0000   N
05 00055  7600   A                      EVENT    118,9,JAM5@INV         PAPER PATH JAM SW PITCH EVEN
05 00057  09     A
05 00058  0000   N
05 0005A  7800   A                      EVENT    120,0,FSH@OFF
05 0005C  00     A
05 0005D  0000   N
05 0005F  8700   A                      EVENT    135,0,PROG@HST         PROG HISTORY FILE UPDATE
05 00061  00     A
05 00062  0000   N
05 00064  8F00   A                      EVENT    143,6,JAM4@CHK         PAPER PATH JAM SW PITCH EVEN
05 00066  06     A
05 00067  0000   N
05 00069  AA00   A                      EVENT    170,10,RET2@CHK        PAPER PATH JAM SW PITCH EVEN
05 0006B  0A     A
05 0006C  0000   N
05 0006E  CF00   A                      EVENT    207,3,S0S@CLN
05 00070  03     A
05 00071  0000   N
05 00073  D100   A                      EVENT    209,2,TRN5CURR
05 00075  02     A
05 00076  0000   N
05 00078  E300   A                      EVENT    227,5,JAM3@CHK         PAPER PATH JAM SW PITCH EVEN
05 0007A  05     A
05 0007B  0000   N
05 0007D  0901   A                      EVENT    265,2,FDR3AEDG         ENABLE AUX FDR WT SENSOR
05 0007F  02     A
05 00080  0000   N
05 00082  0B01   A                      EVENT    267,4,JAM2@CHK         PAPER PATH JAM SW PITCH EVEN
05 00084  04     A
05 00085  0000   N
05 00087  0E01   A                      EVENT    270,8,RET1@CHK         PAPER PATH JAM SW PITCH EVEN
05 00089  08     A
05 0008A  0000   N
05 0008C  6901   A                      EVENT    361,3,TRN3DTCK
05 0008E  03     A
05 0008F  0000   N
05 00091  6C01   A                      EVENT    364,2,FDR4MEDG         ENABLE MAIN WT SENSOR
05 00093  02     A
05 00094  0000   N

05 00096  B901   A                      EVENT    441,9,JAM6@INV         PAPER PATH JAM SW PITCH E
05 00098  09     A
05 00099  0000   N
05 0009B  C201   A                      EVENT    450,4,FUS@UNLD
05 0009D  04     A
05 0009E  0000   N
05 000A0  C301   A                      EVENT    451,2,TRN1ROLL
05 000A2  02     A
05 000A3  0000   N
05 000A5  F401   A                      EVENT    500,0,DPH@SMPL
05 000A7  00     A
05 000A8  0000   N
```

```
143   05 000AA   0E02   A         EVENT   526,3,TRN4DTCK
      05 000AC   03     A
      05 000AD   0000   N
144   05 000AF   1802   A         EVENT   539,0,DVLV@ØFF          TURN ØFF VAR DFNS DEVELØP
      05 000B1   00     A
      05 000B2   0000   N
145   05 000B4   5802   A         EVENT   600,0,PIL@PLØP          TEST FØR PLATEN ØPEN
      05 000B6   00     A
      05 000B7   0000   N
146   05 000B9   7602   A         EVENT   630,5,INVTRCTL          INVTR GATE & RETURN CØNTR
      05 000BB   05     A
      05 000BC   0000   N
147   05 000BE   8A02   A         EVENT   650,6,DECG@NØN          DECISIØN GATE FØR NØN-INV
      05 000C0   06     A
      05 000C1   0000   N
148   05 000C3   9A02   A         EVENT   666,0,JAM@DLY
      05 000C5   00     A
      05 000C6   0000   N
149   05 000C8   BC02   A         EVENT   700,7,JAMS@NØN          PAPER PATH JAM SW PITCH E'
      05 000CA   07     A
      05 000CB   0000   N
150   05 000CD   2003   A         EVENT   800,0,PRØGMØDE
      05 000CF   00     A
      05 000D0   0000   N
151   05 000D2   2203   A         EVENT   802,0,FSH@ENB
      05 000D4   00     A
      05 000D5   0000   N
152   05 000D7   5003   A         EVENT   848,0,DVB@VAR           TURN ØN VARIABLE-BIAS DEVE
      05 000D9   00     A
      05 000DA   0000   N
153   05 000DC   5203   A         EVENT   850,4,SRSK@EV           INIT SRSK & SRT MØTØR
      05 000DE   04     A
      05 000DF   0000   N
154   05 000E1   5403   A         EVENT   852,0,PECØFFEV          TURN ØFF PØST EXP. CØRØTRØ
      05 000E3   00     A
      05 000E4   0000   N
155   05 000E6   8C03   A         EVENT   908,0,PECØNEV           TURN ØN PØST EXP CØRØTRØN
      05 000E8   00     A
      05 000E9   0000   N
156   05 000EB   8E03   A         EVENT   910,0,910@EV
      05 000ED   00     A
      05 000EE   0000   N
157   05 000F0   9003   A         EVENT   912,0,DGN@HCNT
      05 000F2   00     A
      05 000F3   0000   N
158   05 000F5   A703   A         EVENT   935,0,ØVER@RUN
      05 000F7   00     A
      05 000F8   0000   N
159                               ENDTABLE
```

TABLE III

```
71                              *
72                              *        VARIABLE PITCH EVENT TABLE
73                              *
74          00000001            FLSH@BSE  EQU      1
75          00000019            F@@ØNBSE  EQU      25
76          00000064            F@@ØFFBS  EQU      100
77    05 00000   0100   A       RØM@FSH   DW       FLSH@BSE
78    05 00002   00     A                 DB       0
79    05 00003   0000   N                 DW       FSH@ØN
80    05 00005   6400   A       RØM@ØFF   DW       F@@ØFFBS
81    05 00007   00     A                 DB       0
82    05 00008   0000   N                 DW       F@@ØFF
83    05 0000A   1900   A       RØM@ØN    DW       F@@ØNBSE
84    05 0000C   00     A                 DB       0
85    05 0000D   0000   N                 DW       F@@ØN
86    05 0000F   0100   A       RØM@FSHS  DW       FLSH@BSE
87    05 00011   00     A                 DB       0
88    05 00012   0000   N                 DW       FSH@ØN@S
89    05 00014   6400   A       RØM@ØFFS  DW       F@@ØFFBS
90    05 00016   00     A                 DB       0
91    05 00017   0000   N                 DW       F@@ØFF@S
92    05 00019   1900   A       RØM@ØNS   DW       F@@ØNBSE
93    05 0001B   00     A                 DB       0
94    05 0001C   0000   N                 DW       F@@ØN@S
95                              *
```

TABLE IV

```
161         00000396            BASE@CNT SET       918                   #CLK CNTS/PITCH
162         0000038E            SAFE@CNT SET       910                   MIN # CLK CNTS/PITCH
163                             *
164                             *        PITCH TABLE BUILDER
165                             *
166                             *        BUILD VARIABLE PITCH EVENT TABLE INTØ RAM
167                             *        FRØM RØM DATA + REDUCTIØN ADJUST & FØ TRIM
168                             *
169   05 000FA   2A0000   N     TBLD@PRT LHLD      RØM@FSH               H&L= BASE CNT ØF FLASH
170   05 000FD   EB       A              XCHG                            D&E= BASE CNT ØF FLASH
171   05 000FE   2A9AFC   N              LHLD      1FLSH@ØN              H&L= RED ADJ
172   05 00101   19       A              DAD       D                     H&L= BASE + ADJ
```

```
173  05 00102   2244FC   N          SHLD     RAM@FSH                   RAM@FSH = BASE + ADJ
174                           *
175  05 00105   2A0500   N          LHLD     ROM@OFF                   H&L= BASE CNT OF FO OFF
176  05 00108   EB       A          XCHG                               D&E= BASE CNT OF FO OFF
177  05 00109   2A9CFC   N          LHLD     1FO@OFF                   H&L= RED ADJ + TRIM ADJ
178  05 0010C   19       A          DAD      D                         H&L= BASE + ADJ
179  05 0010D   2249FC   N          SHLD     RAM@OFF                   RAM@OFF = BASE + ADJ
180                           *
181  05 00110   2A0A00   N          LHLD     ROM@ON                    H&L= BASE CNT OF FO ON
182  05 00113   EB       A          XCHG                               D&E= BASE CNT OF FO ON
183  05 00114   2A9EFC   N          LHLD     1FO@ON                    H&L= RED ADJ + TRIM ADJ
184  05 00117   19       A          DAD      D                         H&L= BASE + ADJ
185  05 00118   CDEA02   N          CALL     ON@MOD                    CALL MOD ROUTINE TO MOD IF<0
186  05 0011B   224EFC   N          SHLD     RAM@ON                    RAM@ON = RESULTS OF ABOVE
187                           *
188  05 0011E   3A31F4   A          IF:      FLG,IMG@SFT,T             IS THERE IMAGE SHIFT
     05 00121   07       A
     05 00122   D25601   N
189  05 00125   3E06     A             MVI      A,6                    YES,# OF VAR EVENTS TO USE = 6
190  05 00127   47       A             MOV      B,A                    SET UP B-REG FOR LOOP CONTROL
191  05 00128   3262FA   N             STA      TBLD@NUM               STORE # OF VAR EVENTS
192  05 0012B   3D       A             DCR      A                      SET UP # OF TIMES TO GO
193  05 0012C   3263FA   N             STA      TBLD@TMP               THRU SORT
194                           *
195  05 0012F   2A0F00   N             LHLD     ROM@FSHS               UPDATE ROM@FSHS TO
196  05 00132   EB       A             XCHG                            INCLUDE RED MODE ADJ + SHIFT
197  05 00133   2AA0FC   N             LHLD     2FLSH@ON               ADJ AND SAVE FOR THE
198  05 00136   19       A             DAD      D                      IMAGE SHIFT
199  05 00137   2253FC   N             SHLD     RAM@FSHS               FLASH EVENT
200                           *
201  05 0013A   2A1400   N             LHLD     ROM@OFFS               UPDATE ROM@OFFS TO INCLUDE
202  05 0013D   EB       A             XCHG                            RED MODE ADJ + TRIM ADJ +
203  05 0013E   2AA2FC   N             LHLD     2FO@OFF                SHIFT ADJ AND SAVE
204  05 00141   19       A             DAD      D                      FOR THE IMAGE SHIFT
205  05 00142   2258FC   N             SHLD     RAM@OFFS               FADE OUT EVENT
206                           *
207  05 00145   2A1900   N             LHLD     ROM@ONS                UPDATE ROM@ONS TO INCLUDE
208  05 00148   EB       A             XCHG                            RED MODE ADJ + TRIM ADJ +
209  05 00149   2AA4FC   N             LHLD     2FO@ON                 SHIFT ADJ
210  05 0014C   19       A             DAD      D
211  05 0014D   CDEA02   N             CALL     ON@MOD                 CALL MOD ROUTINE TO MOD IF <0
212  05 00150   225DFC   N             SHLD     RAM@ONS                SAVE THE RESULTS
213                           *
214  05 00153   C36001   N          ELSE:
215  05 00156   3E03     A             MVI      A,3                    IF IMAGE SHIFT NOT SET
216  05 00158   47       A             MOV      B,A                    #OF VAR EVENTS TO USE = 3
217  05 00159   3262FA   N             STA      TBLD@NUM               SET UP B-REG FOR LOOP CONTROL
218  05 0015C   3D       A             DCR      A                      STORE # OF VAR EVENTS & SETUP
219  05 0015D   3263FA   N             STA      TBLD@TMP               #OF TIMES TO GO THRU SORT
220                                 ENDIF
221                           *

   440                        *
   441                        *      SUBROUTINE TO DETERMINE IF MODIFIED FO ON EVENT
   442                        *      CLK COUNT IF CLK COUNT RESULTS ARE NEGATIVE OR 0
   443                        *
   444  05 002EA   7C       A ON@MOD  MOV      A,H                      A= MS PART OF ABS CLK COUNT
   445  05 002EB   07       A         RLC                               CARRY= SIGN OF ABS CLK COUNT
   446  05 002EC   D20203   N         IF:      CC,C,S                   IS THE ABS CLK CNT NEG
   447  05 002EF   119603   A            LXI      D,BASE@CNT            YES,ADD # CLK COUNTS PER PITCH
   448  05 002F2   19       A            DAD      D                     TO NEG #
   449  05 002F3   118E03   A            IF:      XWRD,H,GE,SAFE@CNT    IS RESULTS GE SAFE # CLK/PITCH
        05 002F6   CD0000   N
        05 002F9   DAFF02   N
   450  05 002FC   210100   A               LXI      H,1               YES,MOVE TO TURN ON LATER
   451                                    ENDIF
   452  05 002FF   C30E03   N         ORIF:    XWRD,H,EQ,0              IF RESULTS = 0, MOVE LATER IN
        05 00302   110000   A
        05 00305   CD0000   N
        05 00308   C20E03   N
   453  05 0030B   210100   A            LXI      H,1                   PITCH BECUASE EVENT MUST BE > 0
   454                                 ENDIF
   455  05 0030E   C9       A         RET
   456                                 END
CONTROL SECTION SUMMARY: 01 00000   PT 0    02 00000   PT 0    03 00000   PT 0    04 OFFD8   PT 2
                        05 0030F   PT 1
* NO UNDEFINED SYMBOLS
*    ERROR SEVERITY LEVEL: 0
* NO ERROR LINES
```

TABLE V

```
252                           *
253                           *     SORTS VARIABLE RAM EVENT TABLE BY
254                           *     ABS CLK COUNT & LOWEST ENDS IN EV@RAM
255                           *
256                           *     SORTS ONLY 1ST 3 IF NO IMAGE SHIFT, OTHERWISE SORTS ALL 6
257                           *
258  05 0017E   2144FC   N          LXI      H,EV@RAM                  H&L= ADDR OF TOP OF VAR RAM TBL
259  05 00181   3A63FA   N          WHILE:   XBYT,TBLD@TMP,NE,0        TIMES TO GO THRU OUTER LOOP
     05 00184   FE00     A
     05 00186   CAFD01   N
260  05 00189   3253FA   N             STA      IN@LP@CT               INTER LOOP CNT=OUTER LOOP CNT
261  05 0018C   3E80     A             SFLG     TBLD@1ST               SET 1ST FLAG FOR THIS POSITION
     05 0018E   325EF4   A
262  05 00191   2252FB   N             SHLD     FIX@ADDR               ADDR OF POSITION TO FULL
263  05 00194   B7       A             ORA      A                      CLEAR Z CONDITION BIT
264  05 00195   CAEF01   N             WHILE:   CC,Z,C
265  05 00198   5E       A                MOV      E,M                 E= LS PART OF ABS CLK COUNT
266  05 00199   23       A                INX      H
```

```
267   05 0019A   56       A        MOV    D,M              D= MS PART OF ABS CLK COUNT
268   05 0019B   D5       A        PUSH   D                STORE ABS CLK CNT OF FILL POS
269   05 0019C   3A5EF4   A        IF:    FLG,TBLD@1ST,T   IS IT 1ST TIME FOR THIS POS
      05 0019F   07       A
      05 001A0   D2AE01   N
270   05 001A3   AF       A          CFLG    TBLD@1ST      YES, CLEAR ITS FLAG
      05 001A4   325EF4   A
271   05 001A7   23       A          INX     H             AND INCREMENT
272   05 001A8   23       A          INX     H             POINTER TO LS PART OF
273   05 001A9   23       A          INX     H             ABS CLK COUNT OF NEXT
274   05 001AA   23       A          INX     H             EVENT
275   05 001AB   C3B601   N        ELSE:
276   05 001AE   2A5CFB   N          LHLD    VAR@ADDR      H&L= ADDR
277   05 001B1   23       A          INX     H             OF LS PART OF
278   05 001B2   23       A          INX     H             ABS CLK COUNT TO
279   05 001B3   23       A          INX     H             COMPARE TO FILL
280   05 001B4   23       A          INX     H             POSITION
281   05 001B5   23       A          INX     H
282                                ENDIF
283   05 001B6   225CFB   N        SHLD   VAR@ADDR         STORE POINTER TO COMPARE EVENT
284   05 001B9   5E       A        MOV    E,M              E= LS PART OF COMPARE ABS CLK
285   05 001BA   23       A        INX    H
286   05 001BB   56       A        MOV    D,M              D= MS PART OF COMPARE ABS CLK
287   05 001BC   E1       A        POP    H                H&L= ABS CLK COUNT OF FILL POS
288   05 001BD   EB       A        IF:    XWRD,D,LT,H      IS CLK OF COMPARE < FILL
      05 001BE   CD0000   N
      05 001C1   D2E501   N
289   05 001C4   2A5CFB   N          LHLD    VAR@ADDR      YES, SWITCH THE 2 EVENTS
290   05 001C7   EB       A          XCHG                  D&E= ADDR LOWER CLK VALUE
291   05 001C8   2A52FB   N          LHLD    FIX@ADDR      H&L= ADDR LARGER CLK VALUE
292   05 001CB   3EFB     A          MVI     A,-5          INITIALIZE LOOP COUNTER TO 5
293   05 001CD   3265FA   N          STA     TSW@NUM       WHICH = # OF ITEMS TO MOVE
294   05 001D0   B7       A          ORA     A             CLEAR Z CONDITION BIT
295   05 001D1   CAE501   N          WHILE:  CC,Z,C
296   05 001D4   1A       A            LDAX    D           A= CONTAINS OF COMPARE EVENT
297   05 001D5   46       A            MOV     B,M         B= CONTAINS OF FILL EVENT
298   05 001D6   77       A            MOV     M,A         UPDATE FILL POS
299   05 001D7   78       A            MOV     A,B         UPDATE COMPARE POS
300   05 001D8   12       A            STAX    D           WITH NEW VALUE
301   05 001D9   13       A            INX     D           MOVE POINTERS TO
302   05 001DA   23       A            INX     H           NEXT ITEM
303   05 001DB   3A65FA   N            LDA     TSW@NUM     INC MOVE
304   05 001DE   3C       A            INR     A           LOOP CONTROL
305   05 001DF   3265FA   N            STA     TSW@NUM     COUNTER
306   05 001E2   C3D101   N          ENDWHILE
307                                ENDIF
308   05 001E5   2153FA   N        DECBYT   IN@LP@CT       DECRM INNER LOOP CNTR
      05 001E8   35       A
309   05 001E9   2A52FB   N        LHLD     FIX@ADDR       H&L= ADDR OF FILL POSITION
310   05 001EC   C39501   N      ENDWHILE
311   05 001EF   110500   A      LXI      D,5              MOVE H&L TO LOOK AT NEXT EVENT
312   05 001F2   19       A      DAD      D                POSITION TO FILL
313   05 001F3   3A63FA   N      LDA      TBLD@TMP         DECREMENT # OF EVENTS
314   05 001F6   3D       A      DCR      A                TO SORT
315   05 001F7   3263FA   N      STA      TBLD@TMP
316   05 001FA   C38101   N    ENDWHILE
```

TABLE VI

```
223                            *
224                            *  MOVE THE SR# & EVENT ADDR FROM ROM TABLE
225                            *  TO RAM TABLE. MOVES ONLY THE FIRST 3 IF
226                            *  NO IMAGE SHIFT, OTHERWISE MOVES ALL 6
227                            *
228   05 00160   1144FC   N    LXI      D,RAM@FSH          D&E = ADDR OF RAM TABLE
229   05 00163   210000   N    LXI      H,ROM@FSH          H&L = ADDR OF ROM TABLE
230   05 00166   B0       A    ORA      B                  CLEAR Z CONDITION BIT
231   05 00167   CA7E01   N    WHILE:   CC,Z,C
232   05 0016A   23       A      INX      H                INCREMENT H&L AND D&E
233   05 0016B   23       A      INX      H                POINTERS OVER THE
234   05 0016C   13       A      INX      D                ABS CLK COUNT
235   05 0016D   13       A      INX      D
236   05 0016E   7E       A      MOV      A,M              LOAD A WITH SR#
237   05 0016F   12       A      STAX     D                STORE SR# IN RAM TABLE
238   05 00170   23       A      INX      H                MOVE POINTERS TO LS
239   05 00171   13       A      INX      D                ADDR OF EVENT
240   05 00172   7E       A      MOV      A,M              LOAD A WITH LS ADDR OF EVENT
241   05 00173   12       A      STAX     D                & STORE IT IN RAM TABLE
242   05 00174   23       A      INX      H                MOVE POINTERS TO MS
243   05 00175   13       A      INX      D                ADDR OF EVENT
244   05 00176   7E       A      MOV      A,M              MOVE MS ADDR OF EVENT
245   05 00177   12       A      STAX     D                TO RAM
246   05 00178   23       A      INX      H                MOVES POINTERS TO
247   05 00179   13       A      INX      D                LS PART OF ABS CLK COUNT
248   05 0017A   05       A      DCR      B                DECREMENT LOOP COUNTER
249   05 0017B   C36701   N    ENDWHILE
250                            *
```

TABLE VII

```
318                            *
319                            *  MERGE VARIABLE PITCH EVENT TABLE & FIXED EVENT
320                            *  TABLE CALCULATING THE REL DIFFERENCE WITH THE
321                            *  RESULTS GOING INTO THE RUN EVENT TABLE
322                            *
323   05 001FD   2A44FC   N    LHLD     FV@RAM             INITIALIZE VAR@CLK TO ABS CLK
```

```
324  05 00200  225EFB  N        SHLD    VAR@CLK            COUNT OF 1ST VAR PITCH EVENT
325  05 00203  2144FC  N        LXI     H,EV@RAM           INITIALIZE VAR@ADDR TO ADDR OF
326  05 00206  225CFB  N        SHLD    VAR@ADDR           1ST VAR PITCH EVENT
327  05 00209  211E00  N        LXI     H,EV@ROM           INITIALIZE FIX@ADDR TO ADDR OF
328  05 0020C  2252FB  N        SHLD    FIX@ADDR           1ST FIXED PITCH EVENT
329  05 0020F  3E80    A        SFLG    TBLD@1ST           NOTES 1ST EVENT TO RUN TABLE
     05 00211  325EF4  A
330  05 00214  3E2C    A        MVI     A,TABLENUM         INITIALIZE TSW@NUM TO # OF
331  05 00216  3265FA  N        STA     TSW@NUM            EVENTS IN FIXED PITCH TABLE
332  05 00219  2A1E00  N        LHLD    EV@ROM             INITIALIZE D&E WITH ABS CLOCK
333  05 0021C  EB      A        XCHG                       COUNT OF 1ST FIXED EVENT
334  05 0021D  AF      A        CFLG    VAR@DONE           FLAG DENOTES VAR EVENTS
     05 0021E  3259F4  A
335  05 00221  3A59F4  A        WHILE!  FLG,VAR@DONE,F     WHILE THERE ARE MORE VAR EVENTS
     05 00224  07      A
     05 00225  DA6F02  N
336  05 00228  2A5EFB  N          IF!     XWRD,VAR@CLK,LE,D  IS VAR CLK CNT <= FIXED CLK CNT
     05 0022B  CD0000  N
     05 0022E  DA3402  N
     05 00231  C25902  N
337  05 00234  2A5CFB  N            LHLD    VAR@ADDR         YES, H&L= VAR EVENT ADDR
338  05 00237  CD9302  N            CALL    TBLD@UPD         PLACE VAR EVENT AT END RUN TBL
339  05 0023A  3A62FA  N            LDA     TBLD@NUM         DECREMENT # OF
340  05 0023D  3D      A            DCR     A                VARIABLE EVENTS LEFT
341  05 0023E  3262FA  N            STA     TBLD@NUM         TO MERGE
342  05 00241  C24C02  N            IF!     CC,Z,S           DID TBLD@NUM GO TO 0
343  05 00244  3E80    A              SFLG    VAR@DONE       YES,DENOTE NO MORE VAR EVENTS
     05 00246  3259F4  A
344  05 00249  C35602  N            ELSE:
345  05 0024C  225CFB  N              SHLD    VAR@ADDR       STORE ADDR OF NEXT VAR EVENT
346  05 0024F  5E      A              MOV     E,M            UPDATE VAR@CLK TO
347  05 00250  23      A              INX     H              VALUE OF ABS CLK COUNT
348  05 00251  56      A              MOV     D,M            OF PRESENT VARIABLE
349  05 00252  EB      A              XCHG                   EVENT
350  05 00253  225EFB  N              SHLD    VAR@CLK
351                                 ENDIF
352  05 00256  C36602  N          ELSE:                      IF FIXED TABLE CLK COUNT IS
353  05 00259  2A52FB  N            LHLD    FIX@ADDR         LESS THEN VAR TABLE UPDATE THE
354  05 0025C  CD9302  N            CALL    TBLD@UPD         RUN TABLE WITH THAT EVENT
355  05 0025F  2252FB  N            SHLD    FIX@ADDR         UPDATE TO NEXT FIXED EVENT
356  05 00262  2165FA  N            LXI     H,TSW@NUM        DECREMENT # OF FIXED EVENTS
357  05 00265  35      A            DCR     M                LEFT
358                               ENDIF
359  05 00266  2A52FB  N          LHLD    FIX@ADDR
360  05 00269  5E      A          MOV     E,M                UPDATE D&L TO =
361  05 0026A  23      A          INX     H                  ABS CLK CNT VALUE
362  05 0026B  56      A          MOV     D,M                OF PRESENT FIXED TABLE
363  05 0026C  C32102  N        ENDWHILE
364  05 0026F  3EFF    A        MVI     A,X'FF'            CLEAR Z CONDITION
365  05 00271  B7      A        ORA     A                  BIT FOR LOOP
366  05 00272  2A52FB  N        LHLD    FIX@ADDR           NO MORE VAR EVENTS, USE FIXED
367  05 00275  CA8402  N        WHILE!  CC,Z,C             DONE WITH FIXED TABLE
368  05 00278  CD9302  N          CALL    TBLD@UPD           NO,UPDATE RUN TABLE
369  05 0027B  EB      A          XCHG                       SAVE H&L IN D&E
370  05 0027C  2165FA  N          LXI     H,TSW@NUM          DECREMENT # OF FIXED
371  05 0027F  35      A          DCR     M                  EVENTS LEFT
372  05 00280  EB      A          XCHG                       RESTORE H&L
373  05 00281  C37502  N        ENDWHILE
374  05 00284  2A58FB  N        LHLD    P@TBL@A            H&L=ADDR OF LAST MS ADDR IN RUN
375  05 00287  2B      A        DCX     H                  MOVE H&L POINTER BACK TO POINT
376  05 00288  2B      A        DCX     H                  AT THE BEGINNING OF THE LAST
377  05 00289  2B      A        DCX     H                  EVENT (OVER@RUN) & STORE IT
378  05 0028A  2264FD  N        SHLD    EV@PTR!            FOR MACH CLK INTERRUPT HANDLER
379  05 0028D  3E80    A        SFLG    TBLD@FIN           DENOTES PITCH TABLE IS COMPLETE
     05 0028F  325DF4  A
380  05 00292  C9      A        RET

382                    *
383                    *        SUBROUTINE TO CALCULATE REL DIFFERENCE BETWEEN
384                    *        2 EVENTS & MOVE REST OF TABLE TO RUN TABLE
385                    *
386  05 00293  3A5EF4  A  TBLD@UPD IF!  FLG,TBLD@1ST,T     THIS IS THE FIRST EVENT
     05 00296  07      A
     05 00297  D2AF02  N
387  05 0029A  AF      A          CFLG    TBLD@1ST           YES, CLR FLAG TO KEEP OUT
     05 0029B  325EF4  A
388  05 0029E  7E      A          MOV     A,M                A= LS OF 1ST EVENT ABS CLK CNT
389  05 0029F  3251FA  N          STA     EV@1@TIM           USED AT PITCH RESET
390  05 002A2  5F      A          MOV     E,A                E=LS OF 1ST EVENT ABS CLK CNT
391  05 002A3  23      A          INX     H                  H&L=ADDR OF MS ABS CLK CNT
392  05 002A4  56      A          MOV     D,M                D=MS OF 1ST EVENT ABS CLK CNT
393  05 002A5  EB      A          XCHG                       D&E= ADDR OF MS ABS CLK CNT
394  05 002A6  2256FB  N          SHLD    LCLK@CNT           STORE ABS CLK OF 1ST EVENT
395  05 002A9  21E8FE  N          LXI     H,EV@BASE!         H&L = ADDR OF RUN TABLE
396  05 002AC  C3D802  N        ELSE!
397  05 002AF  5E      A          MOV     E,M                E=LS CLK CNT OF NEW EVENT
398  05 002B0  23      A          INX     H                  H&L= ADDR OF MS ABS CLK CNT
399  05 002B1  56      A          MOV     D,M                D=MS CLK CNT OF NEW EVENT
400  05 002B2  E5      A          PUSH    H                  SAVE ADDR OF MS ABS CLK CNT
401  05 002B3  2A56FB  N          IF!     XWRD,LCLK@CNT,GE,D IS LAST CLK CNT GE NEW CLK CNT
     05 002B6  CD0000  N
     05 002B9  DAC502  N
402  05 002BC  23      A            INX     H                H&L= LAST CLK CNT + 1
403  05 002BD  2256FB  N            SHLD    LCLK@CNT         STORE IT FOR NEXT TIME
404  05 002C0  3E01    A            MVI     A,1              PUT THIS EVENT AT THE NEXT CLK
405  05 002C2  C3CC02  N          ELSE:
406  05 002C5  45      A            MOV     B,L              B=LS CLK CNT OF LAST EVENT
407  05 002C6  EB      A            XCHG                     H&L=ABS CLK CNT OF NEW EVENT
408  05 002C7  2256FB  N            SHLD    LCLK@CNT         STORE IT FOR THE NEXT TIME
409  05 002CA  7D      A            MOV     A,L              A=LS CLK CNT OF NEW EVENT
```

```
05 002C8    90       A                SUB       B              FIND DIFF (ONLY NEED LS IF CLK
                                  ENDIF                        CNTS BETWEEN EVENTS <256)
05 002CC    D1       A            POP       D                  D&E=ADDR OF MS OF CLK OF NEW EV
05 002CD    2A58FB   N            LHLD      P0TBL0A            H&L= ADDR OF END OF LAST RUN EV
05 002D0    2B       A            DCX       H                  MOVE H&L POINTER
05 002D1    2B       A            DCX       H                  TO REL DIFF OF LAST
05 002D2    2B       A            DCX       H                  EVENT IN RUN TABLE
05 002D3    77       A            MOV       M,A                MOVE REL DIFF TO RUN TABLE
05 002D4    23       A            INX       H                  INCREMENT RUN TABLE
05 002D5    23       A            INX       H                  POINTER OVER LAST
05 002D6    23       A            INX       H                  EVENT
05 002D7    23       A            INX       H
                              ENDIF
05 002D8    23       A        INX       H                      H&L= ADDR OF SR# IN RUN TABLE
05 002D9    13       A        INX       D                      D&E= ADDR OF SR#
05 002DA    1A       A        LDAX      D                      MOVE SR# FROM TABLE TO
05 002DB    77       A        MOV       M,A                    RUN TABLE
05 002DC    23       A        INX       H                      MOVE POINTERS TO LS 8 BITS
05 002DD    13       A        INX       D                      OF EVENT ADDR
05 002DE    1A       A        LDAX      D                      MOVE LS 8 BITS OF ADDR
05 002DF    77       A        MOV       M,A
05 002E0    23       A        INX       H                      MOVES POINTER TO MS 8 BITS
05 002E1    13       A        INX       D                      OF EVENT ADDR
05 002E2    1A       A        LDAX      D                      MOVES MS 8 BITS OF ADDR
05 002E3    77       A        MOV       M,A
05 002E4    2258FB   N        SHLD      P0TBL0A                STORE ADDR OF RUN TABLE
05 002E7    13       A        INX       D                      POINTER TO LS * BITS OF CLK CNT
05 002E8    EB       A        XCHG                             H&L= ADDR OF LS 8 BITS OF CLK
05 002E9    C9       A        RET

                     *
                     *        SUBROUTINE TO DETERMINE IF MODIFIED F0 ON EVENT
                     *        CLK COUNT IF CLK COUNT RESULTS ARE NEGATIVE OR 0
                     *
05 002EA    7C       A ON0MOD MOV       A,H                   .A= MS PART OF ABS CLK COUNT
05 002EB    07       A        RLC                              CARRY= SIGN OF ABS CLK COUNT
05 002EC    D20203   N        IF:       CC,C,S                 IS THE ABS CLK CNT NEG
05 002EF    119603   A            LXI       D,BASE0CNT         YES,ADD # CLK COUNTS PER PITCH
05 002F2    19       A            DAD       D                  TO NEG #
05 002F3    118E03   A            IF!       XWRD,H,GE,SAFE0CNT IS RESULTS GE SAFE # CLK/PITCH
05 002F6    CD0000   N
05 002F9    DAFF02   N
05 002FC    210100   A                LXI       H,1            YES,MOVE TO TURN ON LATER
                                  ENDIF
05 002FF    C30E03   N        ORIF!     XWRD,H,EQ,0            IF RESULTS = 0, MOVE LATER IN
05 00302    110000   A
05 00305    CD0000   N
05 00308    C20E03   N
05 0030B    210100   A            LXI       H,1                PITCH BECUASE FVENT MUST BE > 0
                              ENDIF
05 0030E    C9       A        RET
                              END

CONTROL SECTION SUMMARY: 01 00000   PT 0    02 00000   PT 0    03 00000   PT 0    04 OFFD8   PT 2
                         05 0030F   PT 1

* NO UNDEFINED SYMBOLS
*    ERROR SEVERITY LEVEL: 0
* NO ERROR LINES
```

TABLE VIII

```
                     *
                     * PITCH RESET INTERRUPT HANDLER
                     *

06 000F9    FB       A  RSET!   EI                                  RE-ENABLE INTERRUPTS
06 000FA    F5       A          PUSH      PSW                       SAVE A-REG & CONDITION BITS
06 000FB    3A5DF4   A          IF!       FLG,TBLD0FIN,T            IS PITCH TABLE BUILD FINISHED
06 000FE    07       A
06 000FF    D26201   N
06 00102    E5       A              PUSH      H                     SAVE H&L
                                    IF:       FLGS,SR0DONE,;        YES, IS THERE A NEW SR VALUE
06 00103    3A4DF4   A                        AND,9100DONE,T        YES, DID 910 EVENT GET DONE
06 00106    216FF4   A
06 00109    A6       A
06 0010A    F25501   N
06 0010D    AF       A                  CFLG      9100DONE          YES, RESET & MACH CLK TIMING OK
06 0010E    326FF4   A
06 00111    324DF4   A                  MODFLG    SR0DONE           CLR FLAG UNTIL NEXT SR EVENT
06 00114    2163FD   A                  LXI       H,ADR(DATA,SR0PTR!)  LOAD RELATIVE
06 00117    7E       A                  MOV       A,M                          PNTR TO SR #0
06 00118    C60F     A                  MODBYT    A,ADD,15          MOVE PNTR BACK
06 0011A    E66F     A                  MODBYT    A,AND,SR0ADJ!                 BY 1 (CIRCULAR)
06 0011C    77       A                  MOV       M,A               SAVE NEW REL SR PNTR IN SR0PTR!
06 0011D    26FE     A                  MVI       H,HADR(DATA,SHIFTREG) H&L= ABS ADDR
06 0011F    6F       A                  MOV       L,A                          OF SR #0
06 00120    3A69FD   A                  LDA       ADR(DATA,SR0VALU!)  A= NEW SR VALUF FROM SRSK
06 00123    77       A                  MOV       M,A               UPDATE CONTENTS OF SR#0
06 00124    3A51FA   A                  LDA       ADR(DATA,EV010TIM)  INIT MCLK!CNT
06 00127    326EFD   A                  STA       ADR(DATA,MCLK!CNT)            TO 1ST EVENT TIME
06 0012A    21E8FE   A                  LXI       H,ADR(DATA,EV0BASE!)  INIT EV0PTR!
06 0012D    2264FD   A                  SHLD      ADR(DATA,EV0PTR!)             TO 1ST EVENT ADDR
                                        IF!       FLGS,NORM0DN!,;   IS NORMAL SHUTDOWN REQUESTED
                                                  AND,CYCL0DN!,;    NO, IS CYCLE-DOWN REQUESTED
06 00130    3AABF4   A                            AND,SD100LY,F     NO, IS PROC DEAD CYCLING
06 00133    21AAF4   A
06 00136    B6       A
06 00137    21AFF4   A
06 0013A    B6       A
06 0013B    FA5201   N
```

```
06 0013E   2166FD   A                  LXI       H,ADR(DATA,CYCUPCT!) NO, LOAD CYCLE-UP CNTR
06 00141   7E       A                  IF!       XBYT,M,NE,5        IS PROC IN CYCLE-UP MODE
06 00142   FE05     A
06 00144   CA5201   N
06 00147   FE04     A                    IF!       XBYT,A,EQ,4      YES, IS IT RDY TO MAKE 1ST IMG
06 00149   C25101   N
06 0014C   3E80     A                      SFLG      IMGMADE!       YES, SIGNAL 1ST IMAGE MADE
06 0014E   32ADF4   A
                                         ENDIF
06 00151   34       A                    INR       M                INCRM CYCLE-UP CNTR (UNTIL= 5)
                                       ENDIF
                                     ENDIF
06 00152   C36101   N              ELSE!                               NEW SR VALUE NOT AVAILABLE
06 00155   3E80     A                SFLG      IMEDSDN!               REQUEST AN IMED SHUTDOWN
06 00157   32A9F4   A
06 0015A   2132FD   A                SFBIT,P   ESPRSFLT               SIGNAL EARLY PITCH RESET FAULT
06 0015D   3E40     A
06 0015F   B6       A
06 00160   77       A
                                   ENDIF
06 00161   E1       A              POP       H                        RESTORE H&L
                                 ENDIF
06 00162   3EFE     A            MVI       A,RSETFF!                   RESET PITCH RESET
06 00164   3200E6   A            STA       ADR(EQU,RSINTFF!)                            INT FLIP-FLOP
06 00167   F1       A            POP       PSW                         RESTORE A-REG & CONDITION BITS
06 00168   C9       A            RET                                   RETURN TO INTERRUPTED ROUTINE
```

TABLE IX

```
                              *
                              * MACHINE CLOCK INTERRUPT HANDLER
                              *
        06 0002B                       ORIGIN    X'38'                INTERRUPT TRAP CELL LOCATION

06 00038   F5       A    MCLK!  PUSH      PSW                   SAVE A-REG & CONDITION CODES
06 00039   3A6EFD   A           LDA       ADR(DATA,MCLK!CNT)    IS THERE
06 0003C   3D       A           DCR       A                              A PITCH
06 0003D   C26600   N           IF!       CC,Z,S                                  EVENT TO DO
06 00040   E5       A             PUSH      H                   YES, SAVE
06 00041   D5       A             PUSH      D                            ALL REMAINING
06 00042   C5       A             PUSH      B                                        REGS
06 00043   2A64FD   A             LHLD      ADR(DATA,EVSPTR!)   H&L= 1ST LOC OF NEXT PE TO DO
06 00046   7E       A             MOV       A,M                 SAVE RELATIVE DIFFERENTIAL TO
06 00047   326EFD   A             STA       ADR(DATA,MCLK!CNT)   NEXT EVENT (#.CLOCK COUNTS)
06 0004A   23       A             INX       H                   MOVE PNTR TO REL SR IN TABLE
06 0004B   3A63FD   A             LDA       ADR(DATA,SRSPTR!)   LOAD REL POSITION OF SR #0
06 0004E   86       A             MODBYT    A,ADD,M             C= LS PORTION OF ADDR OF THE
06 0004F   E66F     A             MODBYT    A,AND,SRSADJ!        REQUESTED SHIFT REGISTER
06 00051   4F       A             MOV       C,A                  POSITION (FOR USE WITHIN PE)
06 00052   06FE     A             MVI       B,HADR(SHIFTREG)    B&C= ADDR REQUESTED SR POSITION
06 00054   0A       A             LDAX      B                   A= <REQUESTED SR POSITION>
06 00055   23       A             INX       H                   E= LS PORTION OF ADDR OF THE
06 00056   5E       A             MOV       E,M                  REQUESTED PITCH EVENT
06 00057   23       A             INX       H                   D= MS PORTION OF ADDR OF THE
06 00058   56       A             MOV       D,M                  REQUESTED PITCH EVENT
06 00059   23       A             INX       H                   SAVE PNTR TO
06 0005A   2264FD   A             SHLD      ADR(DATA,EVSPTR!)               NEXT PITCH EVENT
06 0005D   CD0000   N             CALL      DE!IND              VECTOR TO REQUESTED PITCH EVENT
06 00060   C1       A             POP       B                   RESTORE
06 00061   D1       A             POP       D                             SAVED
06 00062   E1       A             POP       H                                 REGISTERS
06 00063   C37000   N           ELSE!
06 00066   326EFD   A             STA       ADR(DATA,MCLK!CNT)  NO PE; SAVE DECRM'D 'MCLK!CNT'
06 00069   0F       A             RRC                           IS IT TIME FOR
06 0006A   D27000   N             IF!       CC,C,S                          A REFRESH
06 0006D   3202E6   A               REFRESH                     YES, REFRESH REMOTES (1 MSEC)
                                  ENDIF
                                ENDIF
06 00070   FB       A           EI                            RE-ENABLE INTERRUPT SYSTEM
06 00071   3EFD     A           MVI       A,MCLKFF!           RESET MCLK
06 00073   3200E6   A           STA       ADR(EQU,RSINTFF!)              INTERRUPT FLIP-FLOP
06 00076   F1       A           POP       PSW                 RESTORE A-REG & CONDITION CODES
06 00077   C9       A           RET                           RETURN TO INTERRUPTED ROUTINE
```

TABLE X

```
                               *
                               * REAL TIME CLOCK INTERRUPT HANDLER
                               *
06 00081   FB       A    RTC!   EI                            RE-ENABLE INTERRUPTS
06 00082   F5       A           PUSH      PSW                 SAVE A-REG & CONDITION BITS
06 00083   3EF7     A           MVI       A,RTCFF!            RESET RTC
06 00085   3200E6   A           STA       ADR(EQU,RSINTFF!)            INTERRUPT FLIP-FLOP
06 00088   D5       A           PUSH      D                   SAVE D&E REGS
06 00089   E5       A           PUSH      H                   SAVE H&L REGS
06 0008A   C5       A           PUSH      B                   SAVE 'B' REGISTER
                               *
06 0008B   2150FD   N           DECBYT    GLB!TIMR            DECREMENT THE CLOCK CELL
06 0008E   35       A
06 0008F   7E       A           MOV       A,M                 A = <GLB!TIMR>  ( 0 TO 255 )
06 00090   23       A           INX       H                   MEM. PTR. TO SR!ROST BYTE
06 00091   E601     A           IF!       XBYT,A,AND,X'01',NZ IS IT 20 MSEC TIME YET
06 00093   CA9D00   N
```

```
06 00096   7E       A        MODBYT    M,OR,10:RQST!20!RQST        YES - BOTH 10 AND 20 BKGD
06 00097   F6C0     A
06 00099   77       A
06 0009A   C3A100   N     ELSE:
06 0009D   7E       A        MODBYT    M,OR,10!RQST                NO - 10 BKGD ONLY
06 0009E   F680     A
06 000A0   77       A
                          ENDIF
06 000A1   23       A     INX       H                              MEM. PTR. TO DIVD!10 CNTR
06 000A2   35       A     DCR       M                              DECREMENT 10 TO 0 COUNTER
06 000A3   C2AD00   N     IF:,      CC,Z,S                         HAS 100 MSEC PASSED
06 000A6   360A     A        MVI       M,10                        YES - RESET THE 10 TO 0 COUNTER
06 000A8   2B       A        DCX       H                           MEM. PTR. BACK TO SB!RQST
06 000A9   7E       A        MODBYT    M,OR,100!RQST               ADD 100 BKGD TO REQUEST BYTE
06 000AA   F620     A
06 000AC   77       A
                          ENDIF
                          REPEAT                                   NOW CHECK FOR TIME OUTS
06 000AD   2150FD   N        LXI       H,GLB:TIMR                  LOAD 'B' WITH QUANTITY TO LOOK
06 000B0   46       A        MOV       B,M                         FOR (CLOCK CELL VALUE)
06 000B1   16FB     A        MVI       D,COUNT:                    SET 'D' FOR TABLE TO SEARCH
06 000B3   CD0000   N        CALL      FIND:LOC                    GO LOOK IN ACTIVE LIST
06 000B6   CAF000   N        IF:       CC,Z,C                      HAS A MATCH BEEN FOUND
06 000B9   E5       A           PUSH      H                        YES - SAVE LOCATION ON STACK
06 000BA   26FC     A           MVI       H,ID:                    SEGWAY MEM PTR TO ID: TABLE
06 000BC   5E       A           MOV       E,M                      NOW ASSEMBLE
06 000BD   1600     A           MVI       D,0                      ADDRESS OF TIMER
06 000BF   21C8F4   A           LXI       H,TMR!FLGS               FLAG INTO THE
06 000C2   19       A           DAD       D                        MEMORY POINTER
06 000C3   0600     A           MVI       B,0                      GET SET TO CLEAR THE FLAG
06 000C5   F3       A           DI                                 NO INTERRUPTIONS NOW, PLEASE
06 000C6   7E       A           MOV       A,M                      GET FLAG
06 000C7   07       A           RLC                                INTO THE CARRY BIT
06 000C8   D2EC00   N           IF:       CC,C,S                   IS FLAG SET
06 000CB   70       A              MOV       M,B                   YES - RESET AND NOW
06 000CC   FB       A              EI                              EVERYBODY CAN INTERRUPT AGAIN
06 000CD   E1       A              POP       H                     LOCATION FROM STACK TO MEM PTR
06 000CE   26FD     A              MVI       H,LS:ADDR             SEGWAY MEM PTR TO LS: TABLE
06 000D0   5E       A              MOV       E,M                   GET LS TIME-OUT ADDRESS
06 000D1   24       A              INR       H                     SEGWAY MEM PTR TO MS: TABLE
06 000D2   56       A              MOV       D,M                   GET MS TIME-OUT ADDRESS
06 000D3   45       A              MOV       B,L                   LOCATION TO 'B' TEMPORARILY
06 000D4   2A5FFD   N              LHLD      INPTR:                STUFF TIME-OUT ADDRESS INTO
06 000D7   73       A              MOV       M,E                   INTO TABLE OF TIME-OUT
06 000D8   23       A              INX       H                     ADDRESSES THAT IS CHECKED
06 000D9   72       A              MOV       M,D                   FOR ENTRIES EVERY 10 MSECONDS
06 000DA   23       A              INX       H                     BY THE STATE CHECKER
06 000DB   7D       A              MODBYT    L,AND,TIME!MSK        FORCE A CIRCULAR TABLE
06 000DC   E62F     A
06 000DE   6F       A
06 000DF   225FFD   N              SHLD      INPTR:                SAVE NEW ADDRESS LOCATION
06 000E2   58       A              MOV       E,B                   LOCATION BACK TO 'E'
06 000E3   CD0000   N              CALL      DEACTIV:              TAKE OUT OF ACTIVE TIMER LIST
06 000E6   CD0000   N              CALL      PUT:                  AND MAKE LOCATION AVAILABLE
06 000E9   C3EE00   N           ELSE:                              * * * FLAG IS NOT SET SO
06 000EC   FB       A              EI                                 LET INTERRUPTIONS OCCUR
06 000ED   E1       A              POP       H                        MAKE THE STACK RIGHT AND
                                ENDIF                                 FORCE NON-ZERO CONDITION TO
06 000EE   F601     A           MODBYT    A,OR,1                      STAY IN UNTIL LOOP
                             ENDIF                                 * * * NO MATCH - RTC COMPLETE
06 000F0   C2AD00   N     UNTIL:    CC,Z,S                         WILL FALL THROUGH THIS CRACK
                      *
06 000F3   E1       A     POP       H                              RESTORE THE
06 000F4   44       A     MOV       B,H                            'B' REGISTER
06 000F5   E1       A     POP       H                              RESTORE H&L REGS
06 000F6   D1       A     POP       D                              RESTORE D&E REGS
06 000F7   F1       A     POP       PSW                            RESTORE A-REG & CONDITION CODES
06 000F8   C9       A     RET                                      RETURN TO 'FLOAT' BACKGROUND
                      *
```

TABLE XI

```
                      *************************************************************
                      * STAND-BY FRONT PANEL SWITCH SCAN (NOT READY & READY STATES) *
                      *************************************************************

05 00000   3A57FA   N     IF:       XBYT,MINIBYTE,EQ,0
05 00003   FE00     A
05 00005   C22600   N
05 00008   1E05     A        MVI       E,5                         E= # INPUTS TO READ (6 BYTES)
05 0000A   2168FC   N        LXI       H,PREV@IN+6                 H&L= 'PRIOR READ' TABLE (+1)
05 0000D   E5       A        PUSH      H                           SAVE ADDR ON STACK
                             REPEAT                                LOOP 'UNTIL' 6 BYTES TESTED
05 0000E   7B       A           MOV       A,E                      A= 5, 4, 3, 2, 1, OR 0
05 0000F   07       A           RLC                                MULTIPLE
05 00010   07       A           RLC                                      A-REG
05 00011   07       A           RLC                                            BY 8
05 00012   C607     A           MODBYT    A,ADD,X'07'              A= X'2F TO 07' (LOW INPUT ADDR)
05 00014   6F       A           RIBYT     A                        READ PROPER FRONT PANEL IN BYTE
05 00015   CD0000   N
05 00018   E1       A           POP       H                        H&L= ADDR OF 'PRIOR READ' BYTE
05 00019   2B       A           DCX       H                        MOVE TO NEXT BYTE IN TABLE
05 0001A   E5       A           PUSH      H                        SAVE FOR NEXT TIME AROUND LOOP
05 0001B   CD7D00   N           CALL      SWS@SCAN
05 0001E   1D       A           DCR       E                        DECRM LOOP CNTR(5 TO-1)
05 0001F   F20E00   N        UNTIL:    CC,S,S
05 00022   E1       A        POP       H
```

```
                              ****************************************
                              * PRINT STATE FRONT PANEL SWITCH SCAN *
                              ****************************************

       05 00156               PRT@SWS  EQU      $
       05 00156               RUNN@SWS EQU      $
05 00156   3A57FA     N                IF!      XBYT,MINIBYTE,EQ,0
05 00159   FEC0       A
05 0015B   C28301     N
05 0015E   2ECC       A                RIBYT    KYBD#BY2-3              READ CLEAR(D7),,STOP PRT,
05 00160   CD0000     N
05 00163   E6A3       A                MODBYT   A,AND,X'A3'             START PRT, AS A BYTE
05 00165   07         A                RLC
05 00166   5F         A                MOV      E,A                     SAVE TEMPORARILY IN E-REG
05 00167   2E27       A                RIBYT    KYBD#BYT4               READ 'ADH#SNGL' & 'ADH#MULT'
05 00169   CD0000     N
05 0016C   0F         A                RRC                              MERGE WITH
05 0016D   E630       A                MODBYT   A,AND,X'30'                    1ST BYTE
05 0016F   B3         A                MODBYT   E,OR,A                                 READ
05 00170   5F         A
05 00171   2E16       A                RIBIT    AX#TRAY                 READ 'AX#TRAY' BIT
05 00173   CD0000     N
05 00176   78         A                MOV      A,E                      AND MERGE WITH 2
05 00177   17         A                RAL                               PREVIOUS BYTE READS
05 00178   1EE6       A                SWSPOINT  48
05 0017A   2162FC     N                LXI      H,PREV@IN               H&L= ADDR 'PRIOR READ' BYTE
05 0017D   CD7D00     N                CALL     SWS@SCAN                &INPUT SW BYTE DECODE SUBR

                              ******************************************************************************
                              * COMMON SWITCH SCAN SUBR- ENTER WITH SWITCH BYTE IN A-REG (FROM BIT OR BYTE *
                              *   FILTERING SUBROUTINES), ADDR OF PRIOR SWITCH CONDITION BYTE IN MEMORY (H&L *
                              *   REGS), AND E-REG SET TO SWITCH BYTE (AND 'CASE!' GROUP) NUMBER (5 TO 0).   *
                              ******************************************************************************

05 0007D   47         A       SWS@SCAN MOV      B,A                     B= LATEST 'READ' DATA
05 0007E   7E         A                MOV      A,M                     A= PRIOR 'READ' DATA
05 0007F   70         A                MOV      M,B                     UPDATE 'PRIOR' TO 'LATEST'
05 00080   A8         A                MODBYT   A,XOR,B                 A= 1 WHERE SWS JUST CHANGED
05 00081   A0         A                IF!      XBYT,A,AND,B,NZ         WERE ANY SWS JUST PUSHED
05 00082   CA5501     N
05 00085   26FF       A                   MVI      H,X'FF'              YES, INIT BIT POSITION CNTR
                                          REPEAT                        LOOP 'UNTIL' NO BITS= 1 IN BYTE
05 00087   24         A                      INR      H                 H= POSITION OF SW (D0 TO D7)
05 00088   17         A                      RAL                        PUT SW INFO INTO 'C' BIT
05 00089   D25101     N                      IF:      CC,C,S            HAS THIS SW JUST BEEN PUSHED
05 0008C   F5         A                         PUSH     PSW            YES, SAVE
05 0008D   D5         A                         PUSH     D                        REGS OVER
05 0008E   E5         A                         PUSH     H                               'CASE!'
05 0008F   7B         A                         MOV      A,E            RELOAD 'BYTE #' CNTR
05 00090   E61F       A                         ANI      X'1F'          ELLIM.POSS.OF POSITIVE #
05 00092   07         A                         RLC                     MULTIPLE
05 00093   07         A                         RLC                           A-REG
05 00094   07         A                         RLC                                 BY 8
05 00095   84         A                         CASE:    XBYT,A,ADD,H   USE BYTE # & BIT # AS A PNTR
05 00096   114E01     N
05 00099   FE58       A
05 0009B   CD0000     N

                              *****************************************************
                              * ACTIVE SWITCHES FOR STAND-BY (NOT READY & READY STATES) *
                              *****************************************************
05 0009E   0000       N                            C,00     DIGIT@IN     DIGIT 1
05 000A0   0000       N                            C,01     DIGIT@IN     DIGIT 2
05 000A2   0000       N                            C,02     DIGIT@IN     DIGIT 3
05 000A4   0000       N                            C,03     DIGIT@IN     DIGIT 4
05 000A6   0000       N                            C,04     DIGIT@IN     DIGIT 5
05 000A8   0000       N                            C,05     DIGIT@IN     DIGIT 6
05 000AA   0000       N                            C,06     DIGIT@IN     DIGIT 7
05 000AC   0000       N                            C,07     DIGIT@IN     DIGIT 8
                              *
05 000AE   0000       N                            C,08     DIGIT@IN     DIGIT 9
05 000B0   0000       N                            C,09     KYBD@0       DIGIT 0
05 000B2   0000       N                            C,10     RECALL@
05 000B4   0000       N                            C,11     @CLEAR       CLEAR
05 000B6   0000       N                            C,12     IMAG@SFT     IMAGE SHIFT
05 000B8   9301       N                            C,13     SPARE
05 000BA   0000       N                            C,14     STRT@PRT     START PRINT
05 000BC   0000       N                            C,15     STOP@PRT     STOP PRINT
                              *
05 000BE   0000       N                            C,16     VAR@DENS     VARIABLE DENSITY
05 000C0   0000       N                            C,17     AX@TRAY      AUX TRAY
05 000C2   9301       N                            C,18     SPARE
05 000C4   9301       N                            C,19     SPARE
05 000C6   9301       N                            C,20     SPARE
05 000C8   0000       N                            C,21     PEC@ON       PASTE UP SUPPRESSION
05 000CA   0000       N                            C,22     2SD@CPY      2 SIDED COPY
05 000CC   9301       N                            C,23     SPARE
                              *
05 000CE   9401       N                            C,24     RX
05 000D0   9401       N                            C,25     RX
05 000D2   9401       N                            C,26     RX
05 000D4   9401       N                            C,27     RX
05 000D6   0000       N                            C,28     98@REDN      98% REDUCTION
05 000D8   0000       N                            C,29     74@REDN      74% REDUCTION
05 000DA   0000       N                            C,30     65@REDN      65% REDUCTION
05 000DC   0000       N                            C,31     RX@ZOOM      RANK ZOOM LENS
                              *
05 000DE   0000       N                            C,32     ADH@JREC     ADH JOB RECOVERY
05 000E0   0000       N                            C,33     ADH@MULT     ADH MULTIPLE FEED
```

```
05 000E2   0000     N                              C,34    ADH@SGNL     ADH SINGLE FEED
05 000E4   9401     N                              C,35    RX
05 000E6   0000     N                              C,36    SRT@J0BS     S0RTER J0B SUPPLEMENT
05 000E8   0000     N                              C,37    SRT@SETS     S0RTER SETS
05 000EA   0000     N                              C,38    SRT@STKS     S0RTER STACKS
05 000EC   9301     N                              C,39    SPARE
                        *
05 000EE   9301     N                              C,40    SPARE
05 000F0   9301     N                              C,41    SPARE
05 000F2   9301     N                              C,42    SPARE
05 000F4   9301     N                              C,43    SPARE
05 000F6   0000     N                              C,44    SERVICE      TECH REP KEY SWITCH
05 000F8   0000     N                              C,45    FAULT@CD     DISPLAY FAULT C0DE
05 000FA   0000     N                              C,46    LVDGNPRG     LEAVE DIAGN0STIC PR0GRAM
05 000FC   9301     N                              C,47    SPARE

                        **********************************
                        * ACTIVE SWITCHES F0R PRINT STATE *
                        **********************************
05 000FE   0000     N                              C,48    RECALL@      RECALL QUANTITY
05 00100   0000     N                              C,49    ADH@PMUL     ADH MULTIPLE FEED
05 00102   0000     N                              C,50    ADH@PSIN     ADH SINGLE FEED
05 00104   9301     N                              C,51    SPARE
05 00106   0000     N                              C,52    SMPL@CPY     SAMPLE C0PY (START PRINT)
05 00108   0000     N                              C,53    PRT@ST0P     ST0P PRINT
05 0010A   0000     N                              C,54    CNTR@RST     DIAGN0STIC C0UNTER RESET
05 0010C   0000     N                              C,55    AX@PRNT      AUX TRAY

05 00151   B7       A          UNTIL:   XBYT,A,0R,A,Z                  END WHEN N0 BITS IN THIS BYTE
05 00152   C28700   N
                            ENDIF
05 00155   C9       A       RET                                        RETURN T0 STDBY 0R PRINT BKGND
```

TABLE XII

```
                        *
                        *       CALLED BY STANDBY SWITCH SCAN WHEN ST0P PRINT BUTT0N PUSHED
                        *
05 00045   AF       A   ST0P@PRT CFLG     STRT@SET                   CANCEL S0RTER AUT0 START
05 00046   325CF4   A
05 00049   C9       A            RET
                        ******************************************************************************
                        * IMPR0PER ENTRY SUBR0UTINE IS CALLED BY SWITCH SCAN WHEN THE PRINT BUTT0N IS *
                        * PUSHED. IF A LEGAL SELECTI0N IS PRESENT THE SYSTEM G0ES INT0 PRINT. IF AN   *
                        * IMPR0PER ENTRY IS PRESENT AN APPR0PRIATE FAULT FLAG IS SET                 *
                        ******************************************************************************

05 0004A   3AB0F4   A   STRT@PRT IF:      FLG,ADH@SELC,F             IS IT MANUAL PLATEN
05 0004D   07       A
05 0004E   DAE000   N
05 00051   110101   A          IF:     XWRD,QTY@SEL,GE,X'101'      IS QTY@SEL GT 100
05 00054   2A6EFC   N
05 00057   CD0000   N
05 0005A   DA7000   N
05 0005D   3A41F4   A          ANDIF:  FLG,2SD@FLAG,T              IS 2 SIDED C0PYING SELECTED
05 00060   07       A
05 00061   D27000   N
05 00064   2135FD   A             SFBIT    ENT@FLT1              CAN N0T RUN J0B SET FAULT
05 00067   3EC1     A
05 00069   F3       A
05 0006A   B6       A
05 0006B   77       A
05 0006C   F8       A
05 0006D   C3D000   N          0RIF:   XWRD,H,GE,X'51'             IS QTY@SEL GT 50
05 00070   115100   A
05 00073   CD0000   N
05 00076   DA9200   N
05 00079   3A55F4   A             IF:      FLG,SRT@SETF,F        IS S0RTER IN SETS M0DE
05 0007C   07       A
05 0007D   DA8600   N
05 00080   CD0000   N                CALL     PRT@0K             N0, START PRINT
05 00083   C38F00   N             ELSE:
05 00086   2135FD   A                SFBIT    ENT@FLT2           YES,CAN N0T RUN J0B SET FAULT
05 00089   3E02     A
05 0008B   F3       A
05 0008C   B6       A
05 0008D   77       A
05 0008E   F8       A
                                  ENDIF
05 0008F   C3DD00   N          0RIF:   XWRD,H,GE,X'26'             IS QTY@SEL GT 25
05 00092   112600   A
05 00095   CD0000   N
05 00098   DADA00   N
05 0009B   3A55F4   A             IF:      FLG,SRT@SETF,F        IS S0RTER IN SETS M0DE
05 0009E   07       A
05 0009F   DAAB00   N
05 000A2   CD0000   N                CALL     PRT@0K             N0, START PRINT
05 000A5   C3D700   N             ELSE:
05 000A8   2E99     A                IF:      IBIT,SRT#LFUL,F
05 000AA   CD0000   N
05 000B0   2E9B     A                ANDIF:   IBIT,SRT#UFUL,F
05 000B2   CD0000   N
05 000B5   DABE00   N
```

```
136   05 000B8   CD0000   N                    CALL      PRT@OK        SORTER EMPTY, START PRINT
137   05 000BB   C30700   N                 ELSE:
138   05 000BE   3A51F4   A                    IF:       FLGS,SRT@JOBF,AND,JB@INCMP,F JOB SUPLEMENT NO
      05 000C1   2132F4   A
      05 000C4   B6       A
      05 000C5   FAD400   N
139                            *                                       AT THE START OF JOB
140   05 000C8   2135FD   A                       SEBIT     ENT@FLT3   NOT ENOUGH SORTER CAPACITY
      05 000CB   3EC4     A
      05 000CD   F3       A
      05 000CE   B6       A
      05 000CF   77       A
      05 000D0   F8       A
141   05 000D1   C3D700   N                    ELSE:
142   05 000D4   CD0000   N                       CALL      PRT@OK
143                                            ENDIF
144                                         ENDIF
145                                      ENDIF
146   05 000D7   C3DD00   N               ELSE:                           QTY@SEL LT 25
147   05 000DA   CD0000   N                  CALL      PRT@OK             START PRINT
148                                       ENDIF
149   05 000DD   C3E300   N            ELSE:                              ADH IS SELECTED
150   05 000E0   CD0000   N               CALL      PRT@OK                START PRINT
151                                    ENDIF
152   05 000E3   C9       A            RET
```

TABLE XIII

```
1128                           *
1129                           *NAR
1130                           *
1131                           *       PRT@OK    SUBROUTINE
1132                           *
1133                           *       SUBROUTINE TO DO FINAL CHECK OF REQUIRED CONDITIONS BEFORE
1134                           *       GOING TO PRINT.  IF ALL IS OK START PRINT FLAG IS SET.
1136                           *
1137  05 0062B   CD9402   N    PRT@OK  CALL      RDYTEST!                 LAST CHANCE TO FIND NRDY FLAGS
1138  05 0062E   D24E06   N            IF:       CC,C,S                   ARE ALL READY FLAGS OK
1139  05 00631   3A70FC   N            ANDIF:    XBYT,QS@DIGIT,AND,1,NZ   YES, AND IS QTY SELECT .NE. 0
      05 00634   E601     A
      05 00636   CA4E06   N
1140  05 00639   3AEBFF   A            ANDIF:    OBIT,DOC$CVR,F           YES, AND IS DOC DOOR CLOSED
      05 0063C   E601     A
      05 0063E   C24E06   N
1141  05 00641   2EC8     A            ANDIF:    IBIT,STOP#PRT,F          YES, AND IS STOP PRINT RELEASED
      05 00643   CD0000   N
      05 00646   DA4E06   N
1142  05 00649   3E80     A               SFLG      STRT:PRT              YES, TELL 'RDY:' TO GO TO PRINT
      05 0064B   325BF4   A
1143                                   ENDIF
1144  05 0064E   C9       A            RET                                RETURN TO SWITCH SCAN ROUTINE

1146                           *
```

TABLE XIV

```
67    05 00000   3E80     A    FLT@CTRL SFLG     FLT@RDY                  ASSUME THE BEST AT THE START
      05 00002   328AF7   A
68    05 00005   3260F4   A             MODFLG   DR@DMUX                  ASSUME NO DOORS WILL BE OPEN
69    05 00008   2120F9   A             LXI      H,ADR(FBYT,TS@SLOW1)
70    05 0000B   7E       A             MOV      A,M
71    05 0000C   24       A             INR      H                        MOVE TO ADR(FBYT,TS@SLOW2)
72    05 0000D   B6       A             MODBYT   A,OR,M                   SAVE STATUS PANEL
73    05 0000E   F5       A             PUSH     PSW                                  LAMP INFO
74    05 0000F   2121FB   A             LXI      H,ADR(FBYT,ON@OFF3)
75    05 00012   7E       A             MOV      A,M
76    05 00013   2B       A             DCX      H                        MOVE TO ADR(FBYT,TS@SLOW3)
77    05 00014   B6       A             MODBYT   A,OR,M
78    05 00015   47       A             MOV      B,A
79    05 00016   24       A             INR      H                        MOVE TO ADR(FBYT,TS@SLOW4)
80    05 00017   7E       A             MOV      A,M
81    05 00018   E67D     A             MODBYT   A,AND, MSK(TS@DOCNM,DGNOPRT@) DIS-REGARD THESE BLINKING LAMPS
82    05 0001A   B0       A             MODBYT   B,OR,A
      05 0001B   47       A
83    05 0001C   23       A             INX      H                        MOVE TO ADR(FBYT,ON@OFF4)
84    05 0001D   7E       A             MOV      A,M
85    05 0001E   E66E     A             MODBYT   A,AND, MSK(ON@XMHO,SRT@1FUL,ON@DOCNM) DIS-REGARD THESE ON'S
86    05 00020   B0       A             IF:      XBYT,A,OR,B,NZ
      05 00021   CA2800   N
87    05 00024   AF       A                CFLG     FLT@RDY
      05 00025   328AF7   A
88                                      ENDIF
89    05 00028   2120FA   A             CFBIT,P  TS@CSTAT
      05 0002B   3EBF     A
      05 0002D   A6       A
      05 0002E   77       A
90    05 0002F   2121FA   A             CFBIT,P  ON@CSTAT,ON@CDOOR
      05 00032   3EAF     A
      05 00034   A6       A
      05 00035   77       A
```

```
05 00036   F1        A          P0P       PSW                  RESTORE STATUS PANEL LAMP INF0
05 00037   CA4100    N          IF:       CC,Z,C
05 C003A   AF        A             CFLG      FLT0RDY
05 C003B   328AF7    A
05 0003E   CD7501    N             CALL      STAT0PNL
                                ENDIF
05 00041   AF        A          CFLG      PRIM0FLT             ASSUME N0 PRIMARY C0DES
05 00042   3265F4    A
05 00045   32A9FC    A          STA       ADR(DATA,CK0SUM)     CLR CHECK SUM F0R NEW TABL BILD
05 00048   32A8FC    A          STA       ADR(DATA,TABL0END)   INIT FLT TABLE T0 0
05 0004B   2131FD    A          LXI       H,ADR(FBYT,SERV:1)   P0INT T0 1ST FAULT FLAG BYTE
05 0004E   16CF      A          MVI       D,DR:0PN2-SERV:1     D= # FAULT FLAG BYTES T0 SCAN

                     *
                     * L00P T0 TEST ALL FAULT FLAGS 1 BYTE AT A TIME.  WHEN A N0N-ZER0 BYTE IS F0UND,
                     *   A SEC0NDARY L00P IS ENTERED WHERE THE 8 FLAGS ARE TESTED INDIVIDUALLY.
                     *   THE B-REG= BIT P0SITI0N 0F FAULT FLAG PLUS 1 (E.G.  D0= 1, D7= 8).
                     *
                                REPEAT
05 00050   AF        A             XRA       A
05 00051   47        A             M0V       B,A
05 00052   7E        A             M0V       A,M
                                   REPEAT
05 00053   1F        A                RAR
05 00054   04        A                INR       B
05 00055   D28D00    N                IF:       CC,C,S
05 00058   F5        A                   PUSH      PSW
05 00059   58        A                   M0V       E,B
05 0005A   D5        A                   PUSH      D
05 0005B   E5        A                   PUSH      H
05 0005C   7A        A                   CASE:     VBYT,D
05 0005D   118500    N
05 00060   FE10      A
05 00062   CD0000    N
                     *   SEC0NDARY STATUS C0DES (DISPLAYED 0NLY UP0N DEMAND)
05 00065   5301      N                           C,0       DR00PN2      E29-E31
05 00067   4D01      N                           C,1       DR00PN1      E21-E28
05 00069   0000      N                           C,2       RETURN:      ***** N0 PASS FINISHER
05 0006B   45C1      N                           C,3       XE0PN        E13-E19
05 0006D   3AC1      N                           C,4       PAP02        D28-29,D18-19
05 0006F   3201      N                           C,5       PAP01        D20-D27
05 00071   2A01      N                           C,6       ADH0F3       A18-A25
05 00073   22C1      N                           C,7       ADH0F2       A10-A17

                     *   PRIMARY STATUS C0DES (DISPLAYED IMMEDIATELY UP0N ENTERING STANDBY)
05 00075   1A01      N                           C,8       DR0FLT2      E09-E11
05 00077   12C1      N                           C,9       DR0FLT1      E01-E08
05 C0079   0A01      N                           C,10      MISC02       F01-F08
05 0007B   0201      N                           C,11      MISC01       B01-B08
05 0007D   F7C0      N                           C,12      ADH0F1       A01-A08
05 0007F   EFC0      N                           C,13      SERV03       C17-C24
05 00081   E700      N                           C,14      SERV02       C09-C16
05 00083   DF00      N                           C,15      SERV01       C01-C08
                     *
                                         ENDCASE
05 C0085   AF        A                   CFLG      FLT0RDY         SIGNAL A FLT WAS F0UND
05 00086   328AF7    A
05 00089   E1        A                   P0P       H               REST0RE
05 0008A   D1        A                   P0P       D                          ALL
05 0008B   43        A                   M0V       B,E                             SAVED
05 0008C   F1        A                   P0P       PSW                                  REGISTERS
                                      ENDIF
05 0008D   B7        A             UNTIL:    XBYT,A,0R,A,Z        L00P UNTIL FLG BYTE= 0
05 0008E   C25300    N
05 00091   23        A             INX       H                    M0VE T0 NEXT FLT FLAG BYTE
05 00092   15        A             DCR       D                    DECRM L00P CNTR
05 00093   F25000    N          UNTIL:    CC,S,S               L00P UNTIL ALL FLT BYTES TESTED

                     *
                     * THIS SECTI0N USES THE CALCULATED CHECK SUM F0R THE ENTIRE TABLE 0F FAULTS AND
                     *   C0MPARES IT T0 THE PREVI0US SUM. IF A CHANGE IS DETECTED, THE FR0NT PANEL
                     *   DISPLAY IS UPDATED.
                     *
05 00096   21A6FC    A          LXI       H,ADR(DATA,PREV0SUM)  PREVI0US CHECKSUM BYTE
05 00099   46        A          M0V       B,M                   B= CHECK SUM 0F ENTIRE FLT TBL
05 C009A   3AA9FC    A          LDA       ADR(DATA,CK0SUM)      A= CHECKSUM FR0M CURRENT PASS
05 C009D   77        A          M0V       M,A                   UPDATE PRI0R T0 PRESENT VALUE
05 0009E   B8        A          IF:       XBYT,A,NE,B           HAS THERE BEEN CHG IN # 0F FLTS
05 0009F   CADE00    N
05 C00A2   23        A             INX       H                  YES, M0VE T0 'DSPL0PTR' BYTE
05 000A3   3AA8FC    N             IF:       VBYT,TABL0END,NZ   IS # 0F FLTS N0W= 0
05 000A6   A7        A
05 000A7   CAD300    N
05 000AA   3A65F4    A                IF:       FLG,PRIM0FLT,T    N0, SH0ULD A FLT BE DISPLAYED
05 C00AD   07        A
05 000AE   D2C000    N
05 000B1   3A1CF4    A                   IF:       FLG,DSPL0FLT,F   YES, IS 0NE PRESENTLY DISPLAYED
05 000B4   07        A
05 000B5   DABA00    N
05 000B8   3600      A                      MVI       M,0        N0, DSPL HIGHEST PRIMARY FLT
                                            ID:CLR    DSPL0PTR
                                         ENDIF
05 C00BA   CD1F02    N                   CALL      RFRS0STK     RE-SHUFFLE DISPLAY
05 000BD   C30000    N                0RIF:     TIMR,FLT0TIMR,NZ  N0T PRIMARY; IS FLT DSPL'D N0W
05 000C0   3AE8F4    A
05 000C3   07        A
05 000C4   D2CD00    N
05 000C7   CD1F02    N                   CALL      RFRS0STK     YES, UPDATE DISPLAY UNTIL ST0P
05 000CA   C30000    N                ELSE:
05 000CD   CD5202    N                   CALL      ST0PDSPL     N0, ST0P DSPL; 0NLY 2ND-ARY
                                      ENDIF
05 000D0   C3DE00    N             ELSE:
```

```
05 C00D3    CD5202   N          CALL     STØPDSPL                  RELEASE DIGITAL DISPLAY
05 000D6    77       A          MØV      M,A                       SET 'DSPLØPTR' BACK TØ 1ST LØC
                                ID:ALTR  DSPLØPTR
05 000D7    21C9E2   A          LXI      H,ADR(NVRIT,NVØIMED,NVØFJAM) NVM IMEDØDN: & FDR JAMS
05 000DA    7E       A          MØDBYT   M,AND, MSK(NVØIMED,NVØFJAM) CLR PRØCESSØR & FDR JAMS
05 000DB    E6FC     A
05 000DD    77       A
                                ID:CLR   NVØIMED,NVØFJAM
                             ENDIF
                         ENDIF
05 000DE    C9       A       RET                                   RETURN TØ STATE CHECKER
```

Figure 40A:
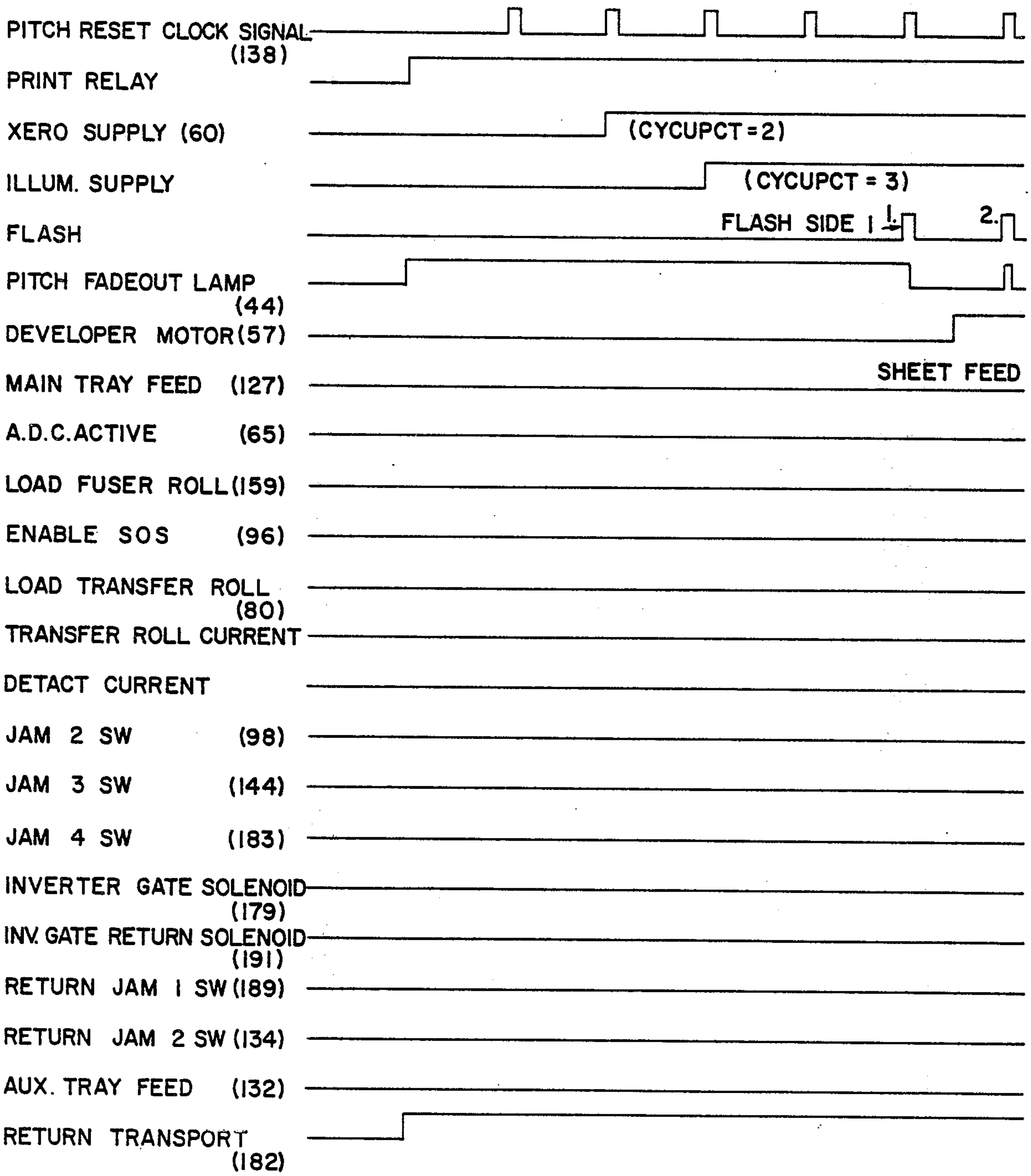
FIG. 40*a*, 40*b*, 40*c* are a timing chart of the principal operating components of the host machine in an exemplary copy run.
Figure 40B:
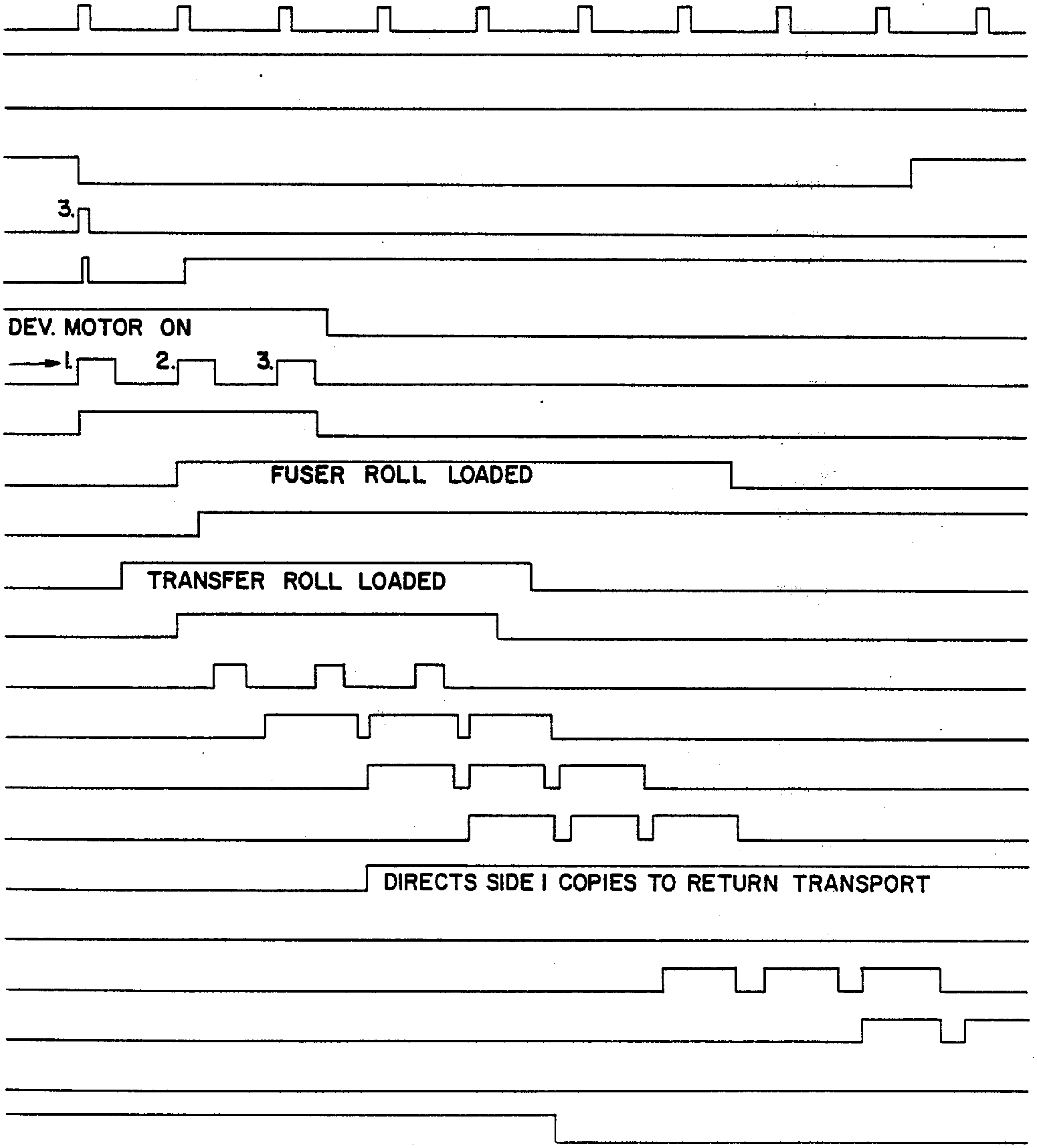
Figure 40C:
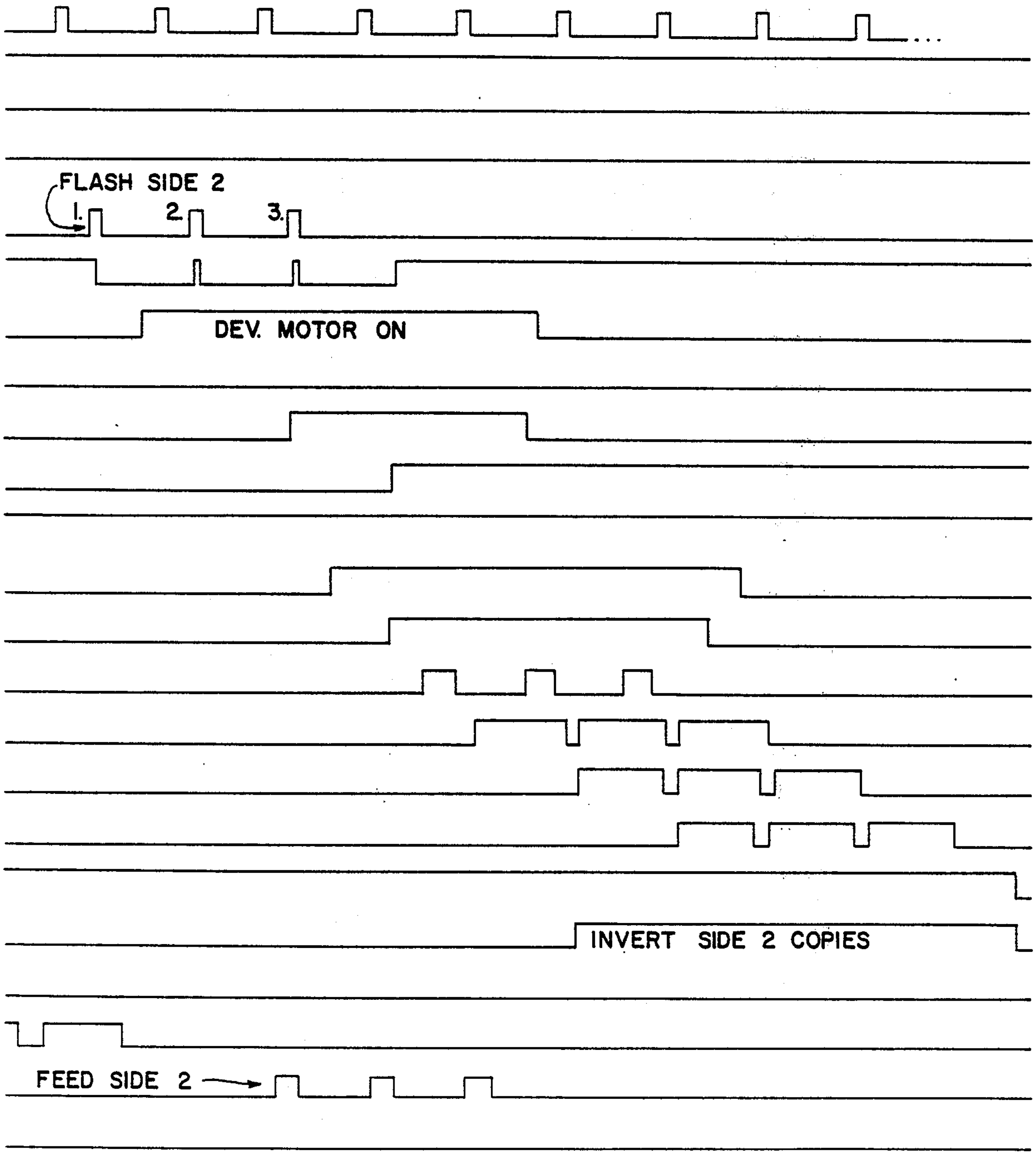

Referring particularly to the timing chart shown in FIG. 40, an exemplary copy run wherein three copies of each of two simplex or one-sided originals in duplex mode is made. Referring to FIG. 32, the appropriate button of copy selector 808 is set for the number of copies desired, i.e. 3 and document handler button 822, sorter select button 825 and two sided (duplex) button 811 depressed. The originals, in this case, two simplex or one-sided originals are loaded into tray 233 of document handler 16 (FIG. 14) and the Print button 805 depressed. On depression of button 805, the host machine 10 enters the PRINT state and the Run Event Table for the exemplary copy run programmed is built by controller 18 and stored in RAM section 546. As described, the Run Event Table together with Background routines serve, via the multiple interrupt system and output refresh (through D.M.A.) to operate the various components of host machine 10 in integrated timed relationship to produce the copies programmed.

Figure 41:
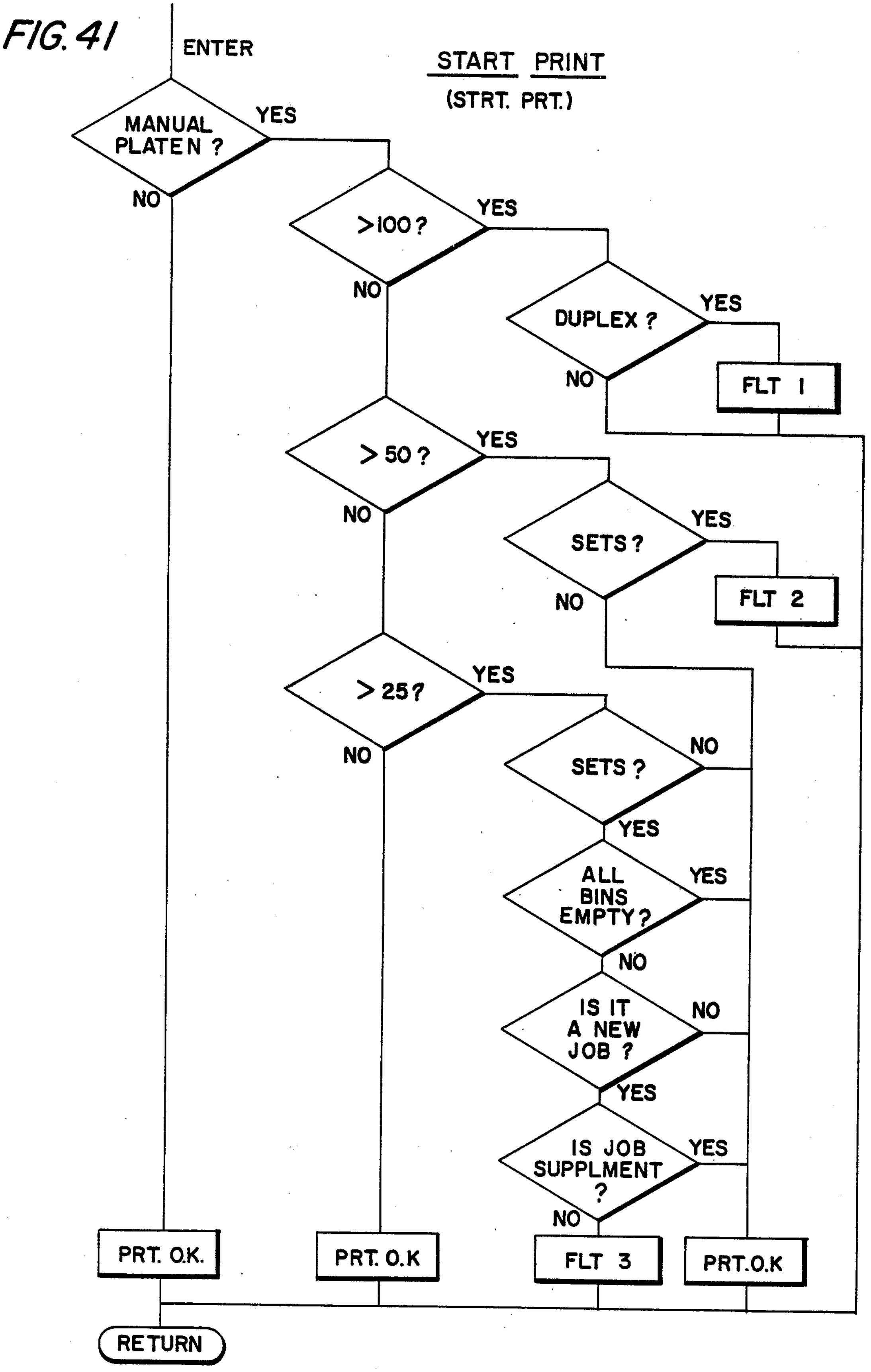
FIG. 41 is a flow chart of the start print routine effective on actuation of the machine start print control to check the copy run program and determine if the program can be carried out.

During the run, the first original is advanced onto platen 35 by document handler 16 where, as seen in FIG. 41, three exposures (1ST FLASH SIDE 1) are made producing three latent electrostatic images on belt 20 in succession. As described earlier, the images are developed at developing station 28 and transferred to individual copy sheets fed forward (1ST FEED SIDE 1) from main paper tray 100. The sheets bearing the images are carried from the transfer roll/belt nip by vacuum transport 155 to fuser 150 where the images are fixed. Following fusing, the copy sheets are routed by deflector 184 (referred to as an inverter gate in the tables) to return transport 182 and carried to auxiliary tray 102. The image bearing sheets entering tray 102 are aligned by edge pattern 187 in preparation for refeeding thereof.

Following delivery of the last copy sheet to auxiliary tray 102, the document handler 16 is activated to remove the first original from platen 35 and bring the second original into registered position on platen 35. The second original is exposed three times (FLASH SIDE 2), the resulting images being developed on belt 20 at developing station 28 and transferred to the opposite or second side of the previously processed copy sheets which are now advanced (FEED SIDE 2) in timed relationship from auxiliary tray 102. Following transfer, the side two images are fused by fuser 150 and routed, by gate 184 toward stop 190, the latter being raised for this purpose. Abutment of the leading edge of the copy sheet with stop 190 causes the sheet trailing edge to be guided into discharge chute 186, effectively inverting the sheet, now bearing images on both sides. The inverted sheet is fed onto transport 181 and into an output receptacle such as sorter 14 where, in this example, the sheets are placed in successive ones of the first three trays 212 of either the upper of lower arrays 210, 211 respectively depending on the disposition of deflector 220.

The machine background tasks of the State Checker Routine (STCK) in Table I, includes calls for the Switch Scan routine of Table XI. The Switch Scan routine is performed in either the Not Ready State (NRDY SWS) or Ready State (RDY SWS) of the State Checker Routine (STCK) of Table I. Switch Scan, when called, scans the various switches (Active Switches for Stand-By - Table XI) that comprise console 800 to identify those switches on console 800 that have been activated and store the information in RAM 546 for future use. An improper entry routine (STRT PRT) is called by Switch Scan on depression of Start/-Print (PRINT) button 805 (FIG. 32) to determine if a legal selection is present.

Referring particularly to Table XII and FIG. 41 of the drawings, the Start Print (STRT PRT) routine checks to determine whether or not the copy run programmed by the operator through console 800 can be carried out by the reproduction machine 10. In other words, is the run program legal or illegal.

As will be understood, the reproduction machine 10, as in the case with any other machine, has certain inherent limitations on what the machine can do and cannot do. While such machine limitations are normally respected in the design of the machine controller such as the control module 800 of reproduction machine 10, there may occur situations where either by design or happenstance, the controller's programming capability is greater than the machine ability. The latter of course, may be either a permanent situation or a temporary situation brought about by the present operational state of the machine.

The reproduction machine 10 includes both multiple bin sorter 14 and automatic document handler 16. Use of either sorter 14 or document handler 16 is optional. In the case where sorter 16 is not used, deflector 198 is set to route finished copies onto discharge transport 196 and into output tray 195. See FIG. 1.

Referring particularly to FIG. 32, operator console 800 includes document handler selector buttons 822 (ADH MULTIPLE FEED) and 823 (ADH SINGLE FEED). In the event neither button 822 or 823 is actuated, the operational mode vis-a-vis document handler 16 is manual (MANUAL PLATEN).

In the manual mode (MANUAL PLATEN), documents 2 to be copied are manually disposed in copying position on platen 35. For this purpose, cover 35' together with platen feed belt assembly 270 (FIGS. 2 and 14) are raised to expose platen 35. To accommodate manual handling of original documents 2, the entire platen cover/platen feed belt assembly pivots or swings about the axis of feed roll 271 as seen in FIG. 2.

Copies may be processed in sorter 14 either in sets or stacks. Where copies are processed in sets, a single copy of each page of a multi-page document is deposited in each tray as required to make up the number of pages of the original document. For example, if five (5) copies of a ten (10) page original sorted in sets are desired, one copy of page 1 would be placed in each of the first 5 bins of sorter 14, followed by a copy of page 2 in the same 5 bins of sorter 14, followed by page 3, etc up until the last copy of page 10 is deposited in the fifth sorter bin. Completed sets of the document, totalling five in number, would therefore appear in each of the five bins of sorter 14.

Where copies are processed in stacks, multiple copies of each page are deposited in individual bins. Using the example given above, in a stack operation, five copies of page 1 would be deposited in the first bin of sorter 14, five copies of page 2 in the second sorter bin, five copies of page 3 in the third bin, etc. This would continue until five copies of page 10 are deposited in the tenth sorter bin.

Referring to FIG. 13 particularly, it will be understood that the capacity of sorter 14 is limited in terms of the total number of bins available. For purposes of explanation, it is presumed that upper and lower modules 210, 211 of sorter 14 each comprise 25 bins 212. Accordingly, copy runs that exceed the capacity of sorter 14, i.e. a copy run requiring 51 sorter bins, may create an unfavorable situation if the machine is permitted to operate.

It will also be understood that the capacity of sorter 14 is also dependent on the existing operational state of the sorter. For example, if the lower sorter module 211 is occupied with copies, only the upper sorter module 210 is available for the next copy run. The sorter capacity and the copy run that may be programmed is in that type of situation, further limited.

As described heretofore, reproduction machine 10 is capable of processing automatically duplex or two-sided copies. In this mode of operation (2 SIDED COPY) and referring particularly to FIG. 12, the first side copies are routed by deflector 184, roll 185 and feed roll pairs 192 onto return transport 182. Return transport 182 deposits the copies in auxiliary tray 102 for subsequent re-feeding when making the second side copies. As will be understood, the sheet capacity of auxiliary tray 102 is limited. For purposes of explanation herein, the capacity of auxiliary tray 102 in the duplex mode is presumed to be 100 sheets.

Referring to the Start Print (STRT PRT) routine of Table XII and drawing FIG. 41, a check is made initially to determine if document handler 16 is in manual (MANUAL PLATEN) mode. If so, a check is made to determine if the number of copies selected is greater than 100 (the exemplary copy sheet capacity of auxiliary paper tray 102 when operating in duplex) and if two sided or duplex selector push button 811 (2 SIDED COPY) has been depressed.

As described earlier, the sheet capacity of auxiliary paper tray for previously imaged copy sheets is limited. In the exemplary arrangement described, the capacity of tray 102 in this mode of operation is presumed to be 100 sheets.

In the circumstances described, a copy run of more than 100 cannot be carried out since the sheet capacity of the auxiliary paper tray is less than the number of copies programmed. As a result, initiation of the print cycle is not permitted. A fault flag (FLT 1) is instead set which is identified during the final check of conditions before going from the ready (RDY) state to the print (PRT) state by the ready test (RDY TEST) routine of Table I and FIG. 43.

The start print (STRT PRT) routine also checks to determine if the quantity selected is greater than 50 and if the sorter is in the sets mode. If the answer to both of the above queries is affirmative, initiation of the print cycle is not permitted but instead a fault flag (FLT 2) is set.

In this situation, the job cannot be run since the bin capacity of the sorter is exceeded. In the example discussed, the sorter bin capacity was presumed to the 50 bins (25 bins in upper module 210, 25 bins in lower module 211), and hence a copy run, in the sets mode, in excess of 50 cannot be made.

Figure 42:
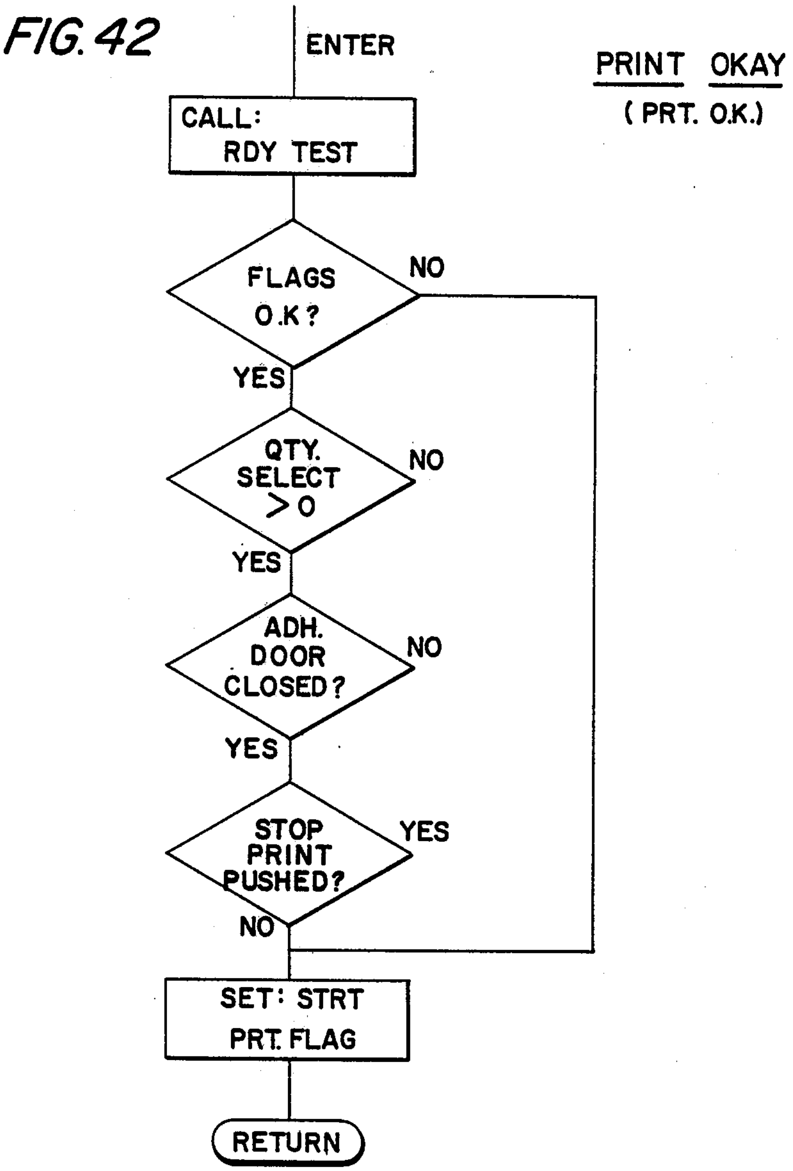
FIG. 42 is a flow chart of the print okay routine for determining if the machine is programmed and ready to print.

If the answer is negative, the Print Okay (PRT OK) routine of Table XIII and FIG. 42 is called to do a final check of conditions before print.

A check is also made to determine if the quantity selected is greater than 25 and if the sorter is in sets mode. If so, a check is made to see if all the sorter modules are empty. If empty, the Print Okay (PRT OK) routine of Table XIII is called. If not and if sorter job supplement and job incomplete flags (SRT JOB, JB INCMP) are not set, initiation of the print cycle is not permitted and a fault flag (FLT 3) is set identifying the fault.

In the situation where document handler 16 is selected through actuation of push button 822 or 823, i.e., no manual platen, the various routines governing operation of the document handler incorporate operational controls designed to accommodate the aforedescribed situations. For example, in the case where the quantity selected is greater than 100 and duplex mode is selected, the job is run until 100 copies are made at which point document handler 16 is cycled to bring forward the next document (i.e. page 2). Copies totalling 100 are then run with sheets fed from the auxiliary tray 102. The process is then repeated by cycling the document handler 16 to return page 1 to the platen and making the additional copies required.

Figure 43:
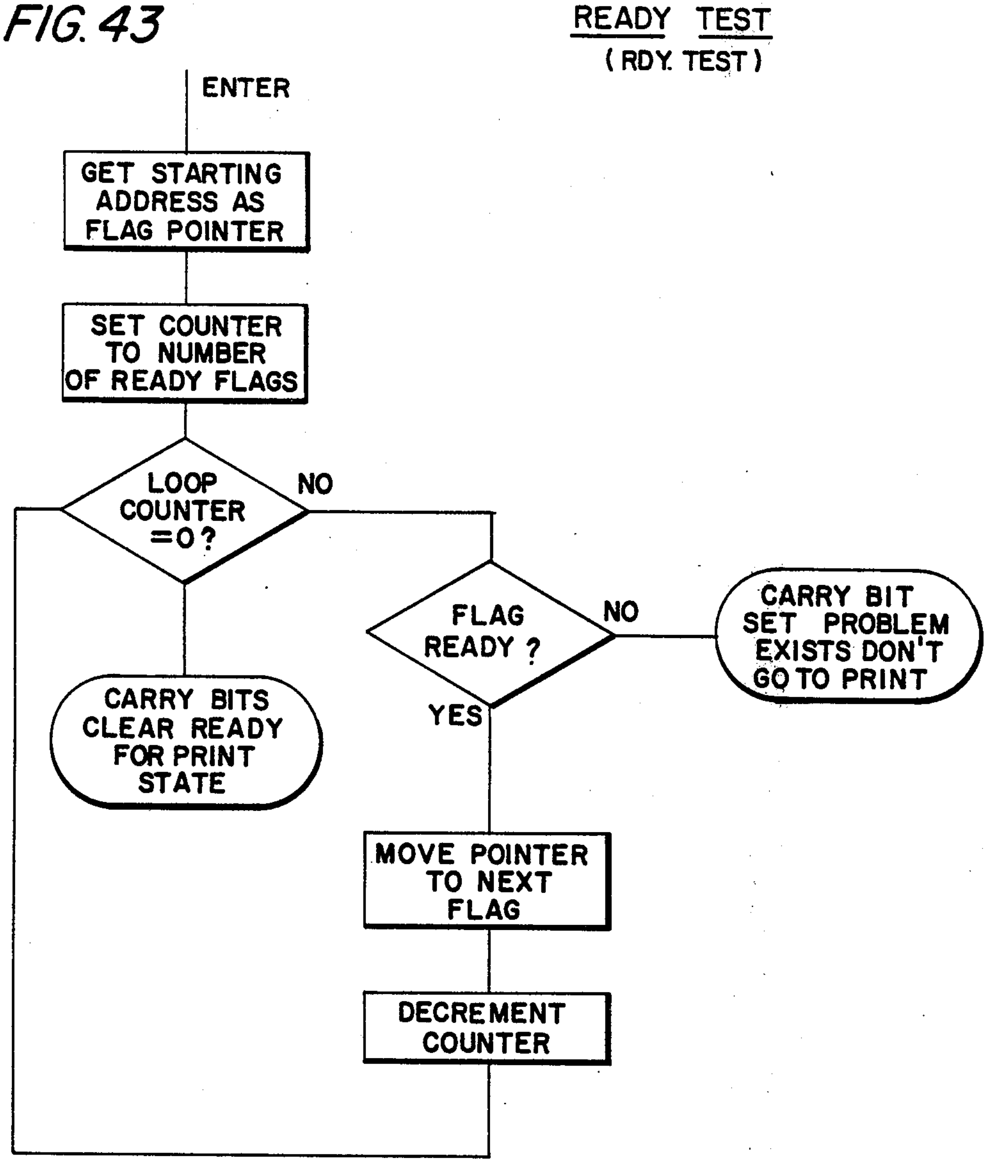
FIG. 43 is a flow chart of the ready test routine for checking certain program flags to determine flag status.

Referring particularly to Table I and FIG. 43, the subroutine Ready Test (RDY TEST) is called in both the Not Ready (NRDY) and Ready (RDY) states prior to entry into the next state. It is understood that from the Not Ready (NRDY) state, entry is made to the Ready (RDY) state and that from the Ready (RDY) state, entry is made to the Print (PRT) state.

The subroutine Ready Test (RDY TEST) which is set out in Table I at the end of the Not Ready (NRDY) state description, scans various flags including the fault flags. If a fault flag (i.e. FLT 1, FLT 2, or FLT 3) is set, the system is held in or returned to the Not Ready (NRDY) state, the latter being effected by means of the change state subroutines (NRDY:RDY) found in Table I.

If no flag is set, change is made from the Not Ready (NRDY) to the Ready (RDY) state. If the system was in the Ready (RDY) state, conditions are cleared for change to the Print (PRT) state when print/start (PRINT) button 805 is actuated.

In the event a fault flag is detected by the Ready Test (RDY TEST) routine, return made to the Not Ready (NRDY) state. The Not Ready (NRDY) state program includes a periodic call to the fault control (FLT CTRL) routine of Table XIV and FIGS. 44(*a*) and 44(*b*). This routine identifies the particular fault by coded display on operator console 800 using the program display 830. Presuming that the copy run programmed was illegal, the appropriate fault (FLT 1, FLT 2, or FLT 3) would be identified and displayed to the operator in the form of a coded number on display 830. From the coded number, the operator, using a chart, can identify the particular fault. With this information, the operator could re-program the copy run to avoid copy demands that cannot be carried out by the machine such as those described herein.

In the event the Start Print (STRT PRT) routine of Table XII finds the copy run programmed legal, a call is made to the Print Okay (PRT OK) routine of Table XIII and FIG. 42. This routine performs a final check of machine conditions prior to going into Print state. Included in this routine is a call to the Ready Test (RDY TST) routine previously discussed to again check the various flags. In addition, checks are made to determine that a quantity, i.e. at least one copy has been programmed, that the cover (not shown) of document handler tray 233 is closed, and that stop print button 806 on console 800 has not been actuated. Presuming that the foregoing tests are passed, the Start Print (STRT PRT) flag is set indicating that the machine 10 is ready to print.

While certain examples of illegal copy run programs have been illustrated, other copy run situations and programs of a similar nature may be envisioned.

While the invention has been described with reference to the structure disclosed, it is not confined to the details set forth, but is intended to cover such modifications or changes as may come within the scope of the following claims.

What is claimed is:

1. In a reproduction machine for producing impressions of an original, the reproduction machine having a photosensitive member and a plurality of discrete operating components cooperable with one another and the photosensitive member to electrostatically produce the impressions on support material, the method of checking for an improper copy run instruction entry to the reproduction machine comprising the steps of:

inputting instructions to the reproduction machine for a copy run to be accomplished by the photosensitive member and the plurality of discrete operating components, the instruction depending upon at least one predetermined operating condition of one of the machine operating components, checking said one operating component to determine the readiness of the operating condition, setting a fault indicator if said condition has not been satisfied, and inhibiting operation of the machine when the fault indicator has been set.

2. The method of claim 1 including the step of identifying the particular fault by a coded display on the operator console.

3. The method of claim 1 wherein the discrete operating components include a machine document handling apparatus and a copy sorting apparatus, the step of determining the operational readiness of the machine document handling apparatus and the copy sorting apparatus in view of the copy run instruction to determine if the copy run instruction can be accomplished.

4. In a reproduction machine for producing impressions of an original, the reproduction machine having a photosensitive member and a plurality of discrete operating components including a machine document handling apparatus and a copy sorting apparatus, cooperable with one another and the photosensitive member to electrostatically produce the impressions on support material, the method of checking for an improper copy run instruction entry to the reproduction machine comprising the steps of:

inputting instructions to the reproduction machine for a copy run to be accomplished by the photosensitive member and the plurality of discrete operating components, the instruction depending upon the operating condition of the document handling and copy sorting apparatus, determining the operational condition of the machine document handling apparatus and the copy sorting apparatus in view of the copy run instruction, setting a fault indicator if said condition has not been satisfied, identifying the particular fault by a coded display on the operator console, inhibiting operation of the machine when the fault indicator has been set.

* * * * *